US009896547B2

(12) United States Patent
Dong et al.

(10) Patent No.: US 9,896,547 B2
(45) Date of Patent: Feb. 20, 2018

(54) POLYMERIZATION METHOD AND POLYMERS FORMED THEREWITH

(71) Applicant: The Scripps Research Institute, La Jolla, CA (US)

(72) Inventors: Jiajia Dong, Shanghai (CN); Valery Fokin, Oceanside, CA (US); Larisa Krasnova, San Diego, CA (US); Luke R. Kwisnek, San Diego, CA (US); James S. Oakdale, San Diego, CA (US); K. Barry Sharpless, La Jolla, CA (US)

(73) Assignee: The Scripps Research Institute, La Jolla, CA (US)

( * ) Notice: Subject to any disclaimer, the term of this patent is extended or adjusted under 35 U.S.C. 154(b) by 0 days.

(21) Appl. No.: 15/484,523

(22) Filed: Apr. 11, 2017

(65) Prior Publication Data

US 2017/0218127 A1    Aug. 3, 2017

Related U.S. Application Data

(63) Continuation of application No. 15/269,468, filed on Sep. 19, 2016, now Pat. No. 9,624,344, which is a continuation of application No. 14/649,428, filed as application No. PCT/US2013/072871 on Dec. 3, 2013, now Pat. No. 9,447,243.

(60) Provisional application No. 61/732,727, filed on Dec. 3, 2012.

(51) Int. Cl.
*C08G 75/00* (2006.01)
*C08G 64/06* (2006.01)
*C08G 65/40* (2006.01)
*C08G 64/24* (2006.01)

(52) U.S. Cl.
CPC ............ *C08G 75/00* (2013.01); *C08G 64/06* (2013.01); *C08G 64/24* (2013.01); *C08G 65/40* (2013.01)

(58) Field of Classification Search
None
See application file for complete search history.

*Primary Examiner* — Robert S Loewe
(74) *Attorney, Agent, or Firm* — Olson & Cepuritis, Ltd.

(57) ABSTRACT

Condensation of fluoro-substituted and silyl-substituted monomers provides polymers suitable for use, e.g., as engineering polymers. A monomer composition is condensed in the presence of a basic catalyst. The monomer composition contains a compound of formula F—X—F and a compound of formula $(R^1)_3Si$—Z—$Si(R^1)_3$, and forms an alternating X—Z polymer chain and a silyl fluoride byproduct. X has the formula -A(—$R^2$-A)n-; each A is $SO_2$, C(=O), or Het; $R^2$ is an organic moiety; n is 0 or 1; Het is an aromatic nitrogen heterocycle; Z has the formula -L-$R^3$-L; each L is O, S, or N($R^4$); and each $R^3$ is an organic moiety, and $R^4$ comprises H or an organic moiety.

25 Claims, 14 Drawing Sheets

C  F—X-Z—Si  Monomers

Each R independently = alkyl, aryl, arylalkyl, etc.

The R, R', R", and R'" groups can be alkyl or aryl; R' and R" optionally can be linked together in a ring

POLYMERIZATION METHOD AND POLYMERS FORMED THEREWITH

CROSS-REFERENCE TO RELATED APPLICATIONS

This application is a continuation of U.S. patent application Ser. No. 15/269,468, filed on Sep. 19, 2016, which is a continuation of U.S. patent application Ser. No. 14/649,428, filed on Jun. 3, 2015, now U.S. Pat. No. 9,447,243, which is a U.S. National Stage of PCT/US2013/072871, filed on Dec. 3, 2013, which claims the benefit of U.S. Provisional Application No. 61/732,727, filed on Dec. 3, 2012, each of which is incorporated herein by reference in its entirety.

GOVERNMENT SUPPORT

This invention was made with government support under CHE0848982 and CHE1302043 awarded by the National Science Foundation, and GM087620 awarded by the National Institutes of Health. The government has certain rights in the invention.

FIELD OF THE INVENTION

The present invention relates to polymers and methods of producing polymers. More particularly, the invention relates to methods of producing polymers via condensation of fluorinated and silylated monomers in the presence of a basic catalyst, and polymers obtainable by the methods.

BACKGROUND

Polymeric materials play an important role in modern materials science. Synthetic condensation polymers (e.g., materials having organosulfone, organosulfate, organocarbonate, organocarbamate, organourea, or organic ester-type polymeric backbones) are utilized in a variety of products and industries, including, for example, packaging, high performance engineering materials, medical prostheses and implants, optics, and consumer plastic goods. There is an ongoing need for new methods of preparing polymeric materials, particularly solid polymers (e.g., plastics), including materials for high value, specialty applications (e.g., medical prostheses and implants, engineering materials, or optics). The polymerization methods and polymers described herein address these needs.

A handful of reactions are at the core of multimillion-ton polymer industry. Most commodity polymers are synthesized from olefins by forming carbon-carbon backbones, whereas engineering polymers are commonly prepared via condensation reactions of monomers containing an activated carbonyl group or its equivalent and a suitable nucleophile, thus forming carbon-heteroatom linkages. Polyesters, polyamides, polyurethanes, and polyimides are produced in this manner. Despite the variety of backbone structures, polymers containing sulfur(VI) "—$SO_2$—" connectors are virtually absent from the literature and barely used in industrial applications, with the exception of polysulfones, in which the sulfone group is already present in the monomers (see e.g., Garbassi, in *Kirk-Othmer Encyclopedia of Chemical Technology*; Fifth Edition; John Wiley & Sons: 2007; Vol. 10).

Unsurprisingly, most reported attempts to synthesize sulfur(VI)-containing polymers relied on reactions mimicking carbonyl group-based condensations, i.e. reactions of sulfonyl chlorides with nucleophiles (see e.g., (a) Goldberg et al., U.S. Pat. No. 3,236,808; (b) Firth, U.S. Pat. No. 3,895,045; (c) Thomson et al., *J. Pol. Sci., Part A* 1964, 2: 1051; (d) Worket et al., *Polym. Sci., Part A: Polym. Chem.* 1968, 6: 2022; (e) Schlott et al., in *Addition and Condensation Polymerization Processes*; American Chemical Society: 1969; 91:703-716) and, to a much lesser extent, Friedel-Crafts sulfonylations (see e.g., Cudby et al., *Polymer* 1965, 6:589). Despite the attractive properties of polymers obtained by those methods, such as good thermal and hydrolytic stability and mechanical resilience (see Thompson et al., id.; Worket et al., id.; and Schlott et al., id.), the unselective reactivity of sulfur(VI) chlorides, which are susceptible to hydrolysis and participate in facile redox transformations, especially chlorinations, significantly limit utility of these methods and materials.

Reactions of many silylated and fluorinated compounds are known in organic synthesis and also in polymer chemistry. In 1983, Kricheldorf introduced the "silyl method" for the synthesis of polyaryl ethers, taking advantage of the strength of the Si—F bond and the innocuous nature of the silyl fluoride byproducts (Kricheldorf et al., *J. Pol. Sci.: Pol. Chem. Ed.* 1983, 21:2283; Bier et al., U.S. Pat. No. 4,474,932). In 2008, Gembus demonstrated that sulfonyl fluorides (R—$SO_2$F) react with silyl ethers in the presence of a catalytic amount of DBU, producing aryl sulfonates (Gembus et al., *Synlett.* 2008, 1463).

Sulfur(VI) fluorides, in particular sulfuryl fluoride ($SO_2F_2$) and its monofluorinated derivatives, sulfonyl ($RSO_2$—F) fluorides, sulfamoyl ($R_2NSO_2$—F) fluorides, and fluorosulfates ($ROSO_2$—F), in which R is an organic moiety, stand in stark contrast to other sulfur(VI) halides. These sulfur oxofluorides are much more hydrolytically stable, redox silent, and do not act as halogenating agents. Nevertheless, their selective reactivity can be revealed when an appropriate nucleophile is presented under the right conditions. In the early 1970s, Firth prepared poly(arylsulfate) bisphenol A (BPA) polymers from fluorosulfates of BPA (obtained from BPA and $SO_2F_2$), and disodium salts of bisphenols (see, e.g., Firth, *J. Pol. Sci., Part B* 1972, 10:637; and Firth, U.S. Pat. No. 3,733,304). The polymerization required prolonged heating and produced a significant quantity of byproduct (12 to 22%) which Firth indicated to be cyclic oligomers. Removal of the byproduct required repeated precipitation of the polymer from dimethylformamide (DMF) into methanol.

There is an ongoing need for new polymerization methods that are versatile and capable of producing a wide variety of polymer structures, including materials formally considered to be condensation polymers, under relatively mild and scalable conditions. There also is a need for new polymers, e.g., for structural, packaging, and fiber applications, and for polymers from processes that tolerate monomers bearing extra, non-interfering groups, which can be functionalized for specialty applications. The methods and polymer described herein address these needs. In addition to providing a practical route to polymers with useful properties, the exceptionally facile synthesis of organosulfates described herein highlights the underappreciated potential of the sulfate connector, in particular, in organic chemistry, as well as unique reactivity features of sulfur(VI) oxofluorides. The polymers and methods described herein should find immediate applications across different disciplines.

SUMMARY

Polymerization methods described herein provide a straightforward synthesis of relatively high molecular weight polymers by catalyzed polymerization of activated fluoro-substituted and silyl-substituted monomers under mild reaction conditions. Polymers with surprisingly high molecular weights are achieved under unexpectedly robust conditions of stoichiometry, temperature, and solvent environment. Fluorosulfate, fluorosulfonate, carbonyl fluoride, and certain heterocyclic fluoride monomers react with silyl ether, silyl amine (particularly with C(=O)F monomers), and silyl sulfide monomers under mild conditions to form a wide variety of polymeric materials, including, e.g., polysulfates, polycarbonates, polysulfonates and related materials. The selectivity of the present method is demonstrated by the successful formation of polymers and copolymers containing technologically useful building blocks found in many packaging and engineering polymers. In one preferred embodiment, polysulfate polymers are prepared from aryl bis-fluorosulfates and aryl bis-silyl ethers under mild reactions conditions, which are amenable to bulk (i.e., solvent-free) polymerization. The polymer can be substantially linear or in some embodiments can include or consist of cyclic polymer chains in which the end groups of a single polymer chain have bonded together to form a large ring.

A monomer composition containing fluoro-substituted and silyl-substituted monomers is condensed in the presence of a basic catalyst to form a polymer chain and a silyl fluoride byproduct that is readily separable from the polymer product. The monomer composition comprises at least one compound of formula F—X—F and at least one compound of formula $(R^1)_3Si$—Z—$Si(R^1)_3$. Each $R^1$ independently is a hydrocarbyl group; X has the formula -A(—$R^2$-A)n-; each A independently is $SO_2$, C(=O), or Het, preferably $SO_2$; $R^2$ comprises a first organic moiety; n is 0 or 1; Het is an aromatic heterocycle comprising at least two carbon atoms and at least one nitrogen atom in a heteroaromatic ring thereof (preferably 1,3,5-triazine), and when A is Het, the F substituent is attached to a carbon atom of the heteroaromatic ring thereof; Z has the formula -L-$R^3$-L-; each L independently is O, S, or N($R^4$), preferably O; $R^3$ comprises a second organic moiety, and $R^3$ preferably comprises at least one aryl or heteroaryl moiety; each L group preferably is directly bonded to an aryl or heteroaryl moiety of $R^3$; and each $R^4$ independently is H or a third organic moiety. Alternatively, the monomer composition can comprise at least one compound of formula F—X—Z—$Si(R^1)_3$ in addition to, or in place of, the combination of F—X—F and $(R^1)_3Si$—Z—$Si(R^1)_3$.

During polymerization, the respective A and L groups of the monomers together form an X—Z polymer chain, and the F and $(R^1)_3Si$ substituents form a silyl fluoride byproduct of formula $(R^1)_3Si$—F, which is ready separable from the polymer product and can be recycled. In preferred embodiments, the polymers include relatively stable fluoro-substituted end groups, which can be modified under selective reaction conditions, if desired. The basic catalyst can be an amidine, a guanidine, a phosphazene, a nitrogen-heterocyclic carbene, a tertiary alkoxide, a fluoride salt, or a combination of two or more of the foregoing. Surprisingly, the mixtures of the bis-silyl and bis-fluoro monomers are unreactive, even at elevated temperatures, in the absence of the basic catalyst.

The polymerization methods are particularly useful for preparing aryl polysulfates, such as bisphenol polysulfates, under mild, high yielding conditions, to afford polymers with molecular weights and physical properties suitable for e.g., materials applications such as engineering materials, packaging materials, and the like. One advantage of the polymers produced by the methods described herein, including the aryl polysulfates, is that in many cases the end groups of the polymers include fluoro groups that can be separately reacted to functionalize the ends of the polymer chains in a manner not readily achievable by prior methods. In the case of the aryl polysulfates, the —$OSO_2F$ and —$SO_2F$ end groups are surprisingly stable, but can be selectively coaxed into reactions with phenolic OH groups and amino groups or hydrolyzed to —OH and —$SO_3^-$ groups, respectively, under readily controllable conditions, as described herein.

The silyl fluoride byproduct can be recycled by reaction with a salt (e.g., a sodium or potassium salt) of a phenolic monomer precursor (e.g., bisphenol A) to form a useful bis-silylated monomer (e.g., a bis-silyl bisphenol A) and a fluoride salt (e.g., sodium fluoride). The bis-silylated monomer can be utilized in another polymerization reaction.

One embodiment of the polymerization method described herein involves reacting a bis-fluorinated first monomer with a bis-silylated second monomer in the presence of a basic catalyst to form a polymer chain and a silyl fluoride byproduct. The fluoro substituents of the first monomer are attached to an electron deficient group such as a sulfonyl, carbonyl or heteroaryl activating group (preferably sulfonyl), and the silyl substituents of the second monomer are linked to an organic core moiety via an oxygen, sulfur, or nitrogen atom (preferably an oxygen atom). When the first and second monomers are combined with the catalyst, the fluoride substituents of the first monomer react with the silyl substituents of the second monomer to form a silyl fluoride, and the electron deficient activating groups of the first monomer condense with the linking atoms of the second monomer to form a polymer chain. The first monomer optionally can include an organic core group, as well.

In some embodiments, the method comprises the step of reacting a first monomer composition comprising at least one compound of formula F—X—F (preferably $FSO_2F$) with a second monomer composition comprising at least one compound of formula $(R^1)_3Si$—Z—$Si(R^1)_3$, in the presence of a basic catalyst, to form an alternating X—Z polymer chain and a silyl fluoride byproduct of formula $(R^1)_3Si$—F. The X portion of the first monomer has the formula -A(-$R^2$-A)n-, wherein each A independently is $SO_2$, C(=O), or Het, preferably $SO_2$; $R^2$ comprises a first organic moiety; n is 0 or 1; and Het is an aromatic heterocycle comprising at least two carbon atoms and at least one nitrogen atom in a heteroaromatic ring thereof (preferably a 1,3,5-triazine), in which each F is attached to a carbon atom of the heteroaromatic ring. Each $R^1$ of the second monomer independently is a hydrocarbyl group (e.g., linear or branched alkyl, phenyl, and the like); Z has the formula -L-$R^3$-L-, wherein each L independently is O, S, or N($R^4$), preferably O; $R^3$ comprises a second organic moiety and $R^3$ preferably comprises at least one aryl or heteroaryl moiety; each L group preferably is directly bonded to an aryl or heteroaryl moiety of $R^3$; and $R^4$ is H or a third organic moiety. During polymerization, the respective F and $(R^1)_3Si$ substituents of the first and second monomers form the silyl fluoride, while the respective A and L groups of the first and second monomers alternately condense to form the alternating X—Z polymer chain. When n is 0, each F substituent of the first monomer is attached to the same A group.

The basic catalyst used in the polymerization methods described herein comprises at least one material selected from the group consisting of an amidine, a guanidine, a phosphazene, a nitrogen-heterocyclic (N-heterocyclic) carbene, a tertiary alkoxide, and a fluoride salt. For example, the basic catalyst can comprise an amidine base (e.g., 1,8-diazabicyclo[5.4.0]undec-7-ene (DBU), and the like), a guanidine (e.g., 1,1,3,3-tetramethylguanidine (TMG), 1,5,7-triazabicyclo[4.4.0]dec-5-ene (TBD), and 7-methyl-1,5,7-triazabicyclo-[4.4.0]dec-5-ene (MTBD) and the like), a phosphazene base (e.g., 2-tert-butylimino-2-diethylamino-1,3-dimethylperhydro-1,3,2-diazaphosphorine (BEMP), 1-tert-butyl-4,4,4-tris-(dimethylamino)-2,2-bis[tris(dimethylamino)-phosphoranylidenamino]-2$\lambda^5$,4$\lambda^5$-catenadi(phosphazene) (P$_4$-t-Bu), and the like), a nitrogen-heterocyclic carbene (e.g., an imidazole-2-ylidene, a 1,2,4-triazole-5-ylidene, a thiazole-2-ylidene, an imidazolin-2-ylidene, and the like), a tertiary alkoxide (e.g., potassium tert-butoxide and the like), or a fluoride-containing salt (e.g., CsF, CsFHF, KF, tetrabutylammonium fluoride (TBAF), tris(dimethylamino)sulfonium-difluorotrimethylsilicate (TASF), and the like), or a combination of two or more thereof. Preferably, the base comprises an amidine, a phosphazene, or both. If desired, a combination of catalysts can be added as a mixture or sequentially.

Preferably, the first and second monomers are reacted in approximately equimolar amounts or with an excess (e.g., 0.01 up to about 10 mol % excess) of the first (i.e., fluorinated) monomer. The first and second monomers can be contacted with one another in neat (solventless or bulk) form, or in a solvent (e.g., a halogenated hydrocarbon, acetonitrile, pyridine, N-methylpyrrolidone, and the like), a combination of solvents (e.g., together or sequentially added), or a combination of solventless and solvent conditions (e.g., sequentially). Typically, the polymerization is performed at a temperature in the range of about 20 to about 200° C. for about 0.5 to about 48 hours. The polymerization reaction is surprisingly facile, and typically exhibits a relatively modest heat of reaction. Additionally, the reaction conditions and monomers are surprisingly tolerant of a large variety of organic moieties and substituents. This translates into an unprecedented freedom of selection of "AA" and "BB" monomer components, including groups that are known to interfere with normal acid-base reactions, and the ability to tailor the functionality of the resulting polymer to a very high degree.

The first monomer can be a single compound conforming to the formula F—X—F or a mixture of compounds having different X groups. Similarly, the second monomer may be a single compound conforming to the formula $(R^1)_3Si$—Z—$Si(R^1)_3$ or a mixture of compounds having different $R^1$ groups, Z groups, or both. Such mixtures of monomers can be formulated in any desired proportion and with any desired X and Z groups to impart desired properties to the resulting polymer, such as a desired molecular weight, a desired molecular weight distribution, desirable physical or mechanical properties (e.g., glass transition temperature, hydrolytic stability, tensile strength, impact resistance, ductility, resilience, plasticity, and the like), or biodegradability, for example.

In one embodiment, the first monomer has the formula F-A-F. In this embodiment, the first monomer can be, for example, $FSO_2F$, $FC(O)F$, or F-Het-F (preferably $FSO_2F$). As described herein, Het is an aromatic heterocycle comprising at least two carbon atoms and at least one nitrogen atom in a heteroaromatic ring thereof, in which each F is attached to a carbon atom of the heteroaromatic ring. An exemplary heterocycle is 1,3,5-triazine, and the F substituents are covalently bonded to a carbon atom at two or more of positions 2, 4, and 6. When a gaseous monomer such as $FSO_2F$ is utilized, the reaction can be performed in a reactor capable of operating at pressures greater that one atmosphere, if desired.

In other embodiments, the first monomer is a material of formula F-A-$R^2$-A-F. $R^2$ is a first organic moiety, which can comprise or consist of an organic core material, such as a hydrocarbon, a heterocycle, a carbohydrate, an amino acid, a polypeptide, a peptide analog, and the like, or any combination of two or more thereof, while the A groups are selected from sulfonyl, carbonyl, or heteroaryl (Het), preferably $SO_2$, as described above. In some embodiments, $R^2$ can be represented by the formula -$L^1$-$R^5$-$L^1$-, in which each $L^1$ independently is selected from the group consisting of O, S, and N($R^4$), preferably O; each $R^5$ independently comprises the first organic moiety: and each $R^4$ independently comprises H or a third organic moiety. Alternatively, or in addition, $R^2$ can be represented by the formula -$L^1$-$R^5$—, in which each $L^1$ and $R^5$ are as defined above.

A polymer produced by the present methods comprises a polymer chain that can be represented by Formula (I): (-A(-$R^2$-A)n-L-$R^3$-L)x-, in which each A independently is $SO_2$, C(=O), or Het, preferably $SO_2$; each $R^2$ independently comprises the first organic moiety; each n independently is 0 or 1; each Het independently is an aromatic heterocycle comprising at least two carbon atoms and at least one nitrogen atom in a heteroaromatic ring thereof; each L independently is O, S, or N($R^4$), preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and x is the average number of repeating units in the polymer and has a value of at least 10 (e.g., 10 to 100,000 or more). The polymer chain includes at least one end group that is derived from the first monomer, i.e., an end group including a moiety of formula E-A-, such as E-A(-$R^2$A)n-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^1$ independently is an organic moiety. When A is Het, each L group is attached to a carbon atom of the heteroaromatic ring thereof.

Alternatively, or in addition, the polymer includes a polymer chain that can be represented by Formula (II): (-A-$R^2$-A-L-$R^3$-L)y-, wherein each A independently is $SO_2$, C(=O), or Het, preferably $SO_2$; each $R^2$ independently comprises the first organic moiety; each Het independently is an aromatic heterocycle comprising at least two carbon atoms and at least one nitrogen atom in a heteroaromatic ring thereof (preferably 1,3,5-triazine); each L independently is O, S, or N($R^4$), preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and y is the average number of repeating units in the polymer and has a value of at least 10 (e.g., 10 to 100,000 or more). The polymer chain includes at least one end group that is derived from the first monomer, i.e., an end group including a moiety of formula E-A-, such as E-A-$R^2$-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het, each L group is attached to a carbon atom of the heteroaromatic ring thereof.

In some other embodiments, the polymer includes a polymer chain that can be represented by Formula (III): $(-A-L^1-R^5-L^1-A-L-R^3-L)z-$, wherein each A independently is $SO_2$, $C(=O)$, or Het, preferably $SO_2$; each $R^5$ independently comprises the first organic moiety; each Het independently is an aromatic heterocycle comprising at least two carbon atoms and at least one nitrogen atom in a heteroaromatic ring thereof, preferably 1,3,5-triazine; each L and $L^1$ independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and z is the average number of repeating units in the polymer and has a value of at least 10 (e.g., 10 to 100,000 or more). The polymer chain includes at least one end group that is derived from the first monomer, i.e., an end group including a moiety of formula E-A-, such as $E-A-L^1-R^5-L^1-A-$, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het, each L and $L^1$ group is attached to a carbon atom of the heteroaromatic ring thereof.

In yet other embodiments, the polymer includes a polymer chain that can be represented by Formula (IV): $(-A-L^1-R^5-A-L-R^3-L)m-$, wherein each A independently is $SO_2$, $C(=O)$, or Het, preferably $SO_2$; each $R^5$ independently comprises a first organic moiety; each Het independently is an aromatic heterocycle comprising at least two carbon atoms and at least one nitrogen atom in a heteroaromatic ring thereof; each L and $L^1$ independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ independently is H or a third organic moiety; and m is the average number of repeating units in the polymer and has a value of at least 10 (e.g., 10 to 100,000 or more). The polymer chain includes at least one end group that is derived from the first monomer, i.e., an end group including a moiety of formula E-A-, such as $E-A-L^1-R^5-A-$, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het (e.g., 1,3,5-triazine), each L and $L^1$ group is attached to a carbon atom of the heteroaromatic ring thereof.

In some other embodiments, the polymer includes a polymer chain that can be represented by Formula (V): $(-A-L-R^3-L)p-$, wherein each A independently is $SO_2$, $C(=O)$, or Het, preferably $SO_2$; each Het independently is an aromatic heterocycle comprising at least two carbon atoms and at least one nitrogen atom in a heteroaromatic ring thereof; each L independently is O, S, or $N(R^4)$, preferably O; each $R^3$ comprises a second organic moiety and $R^3$ preferably comprises at least one aryl or heteroaryl moiety; each L group preferably is directly bonded to an aryl or heteroaryl moiety of $R^3$; each $R^4$ is H or another organic moiety; and p is the average number of repeating units in the polymer and has a value of at least 10 (e.g., 10 to 100,000). The polymer chain includes at least one end group that is derived from the first monomer, i.e., an end group including a moiety of formula E-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. When A is Het (e.g., 1,3,5-triazine), each L group is attached to a carbon atom of the heteroaromatic ring thereof.

In yet other embodiments, the polymer can be represented by the Formula (VI): $(-A-R^2-A-L-R^3-L)a-(-A-L^1-R^5-L^1-A-L-R^4-L)b-(-A-L^1-R^5-A-L-R^3-L)c-(-A-L-R^3-L)d-$, wherein a, b, c, and d represent the average number of the respective repeating units in the polymer, and any of a, b, c, and d can be 0 or greater, so long as the sum of a, b, c, and d has a value of at least 10 (e.g., 10 to 100,000 or more), and the polymer includes at least one end group that is derived from the first monomer, i.e., an end group of formula E-A-, $E-A-L^1-R^5-A-$, $E-A-L^1-R^5-L^1-R^5-L^1-A-$, $E-A-R^2-A-$, or $E-A(-R^2-A)n-$, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety. Each of A, L, $L^1$, $R^2$, $R^3$, and $R^5$ independently are defined as they are for the other polymer and monomer embodiments described herein.

In some embodiments, at least a portion of the first monomer includes a branching monomer of the formula F—X—F in which X includes an additional F substituent on a sulfonyl, carbonyl or heteroaryl activating group, such that the additional F substituent also reacts with a silyl substituent on an oxygen, sulfur or nitrogen atom linking group of the second monomer to form the silyl fluoride, and the activating group of the first monomer condenses with the linking group of the second monomer to introduce at least one branch point in the polymer. Alternatively, or in addition, the second monomer can include a branching monomer in which Z includes an additional silyl substituent attached to an oxygen, sulfur or nitrogen atom linking group, such that the additional silyl substituent reacts with a fluoro substituent on a sulfonyl, carbonyl, or heteroaryl activating group of the first monomer to form the silyl fluoride, and the linking group of the second monomer condenses with the activating group of the first monomer to introduce at least one branch point into the polymer.

In any of the polymerization methods and polymers described herein, each of the organic moieties of the monomers, e.g., $R^1$, $R^2$, $R^3$, $R^4$, $R^5$, and $R^8$ independently can be selected from the group consisting of consisting of a hydrocarbon, a heterocycle, a carbohydrate, an amino acid, a polypeptide, a peptide analog, and a combination of two or more thereof. In some embodiments, $R^2$, $R^3$, $R^4$, $R^5$, and $R^8$ can include one of more substituent, e.g., hydroxyl, halogen, nitro, $—C(O)R^6$, $—C(O)OR^6$, $—C(O)N(R^6)_2$, $—CN$, $—SO_vR^6$, $—SO_vN(R^6)_2$, $R_6SO_vN(R_6)—$, $—N(R^6)SO_vR^6$, $SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

The present invention also provides polymers prepared by the methods described herein. The polymers comprise a polymeric chain having a formula selected from the group consisting of:

$(-A(-R^2-A)n-L-R^3-L)x-;$      Formula (I):

$(-A-R^2-A-L-R^3-L)y-;$      Formula (II):

$(-A-L^1-R^5-L^1-A-L-R^3-L)z-;$      Formula (III):

$(-A-L^1-R^5-A-L-R^3-L)m-;$      Formula (IV):

$(-A-L-R^3-L)p-;$ and      Formula (V):

$(-A-R^2-A-L-R^3-L)a-(-A-L^1-R^5-L^1-A-L-R^3-L)b-(A-L^1-R^5-A-L-R^3-L)c-(-A-L-R^3-L)d-$, and      Formula (VI):

at least one end group derived from the first monomer, as described above, i.e., including at least one functional group "E-A-" in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety.

In the forgoing Formulas (I), (II), (III), (IV), (V), and (VI), each A independently is $SO_2$, C(═O), or Het, preferably $SO_2$; each $R^2$ and $R^5$ independently comprises a first organic moiety; each Het independently is an aromatic heterocycle comprising at least two carbon atoms and at least nitrogen atom in a heteroaromatic ring thereof (preferably 1,3,5-triazine); each L and $L^1$ independently is O, S, or $N(R^4)$, preferably O; each $R^3$ and $R^5$ independently comprises a second organic moiety; each $R^4$ independently is a third organic moiety; each of x, y, z, m, a, b, c, and d is the average number of respective repeating units in the polymer chain; each of x, y, z, m, and p has a value of at least 10 (e.g., 10 to 100,000 or more); and each of and a, b, c, and d can be 0 or greater, so long as the sum of a, b, c, and d has a value of at least 10 (e.g., 10 to 100,000 or more). Each of A, L, $L^1$, $R^2$, $R^3$, and $R^5$ independently are defined as described above for the monomer formulas.

In any of the polymers described herein each of the organic moieties, e.g., $R^2$, $R^3$, $R^4$, $R^5$, and $R^8$, independently can be selected from the group consisting of consisting of a hydrocarbon, a heterocycle, a carbohydrate, an amino acid, a polypeptide, a peptide analog, and a combination of two or more thereof. Additionally, $R^2$, $R^3$, $R^4$, $R^5$, and $R^8$ can be substituted with one or more functional group. Non-limiting examples of such functional groups include e.g., hydroxyl, halogen, nitro, $—C(O)R^6$, $—C(O)OR^6$, $—C(O)N(R^6)_2$, $—CN$, $—SO_xR^6$, $—SO_xN(R^6)_2$, $R^6SO_xN(R^6)—$, $—N(R^6)SO_xR^6$, $—SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, a polypeptide; wherein each $R^6$ independently is H, alkyl, or aryl, and v is 0, 1, or 2.

In some embodiments, preferred monomers include bisphenol fluorosulfates (e.g., bisphenol A fluorosulfate, bisphenol Abisphenol AF fluorosulfate, bisphenol S fluorosulfate, and related monomers with two phenolic groups tethered together) and bisphenol silyl ethers (e.g., bisphenol A silyl ether, bisphenol Abisphenol AF silyl ether, bisphenol S silyl ether, and related monomers with two phenolic groups tethered together).

The polymers described herein typically are thermoplastic materials that are readily moldable and thermoformable into a wide variety of mechanical parts and structural components. The poly(bisphenol A sulfate) polymers are resistant to hydrolysis, have relatively high dielectric constant, good impact resistance, as well as tensile strength, modulus of elasticity, and elongation similar to polycarbonates. Such polymers can be fabricated into sheets and films for use in packaging materials, construction materials, and the like, and can be used in applications such as automotive and aircraft components (e.g., windscreens and the like), medical prostheses, safety goggles, and containers (e.g., cups, bottles, and the like).

DETAILED DESCRIPTION

The present polymerization method can provide a wide variety of monomer structures, functional substituents, and monomer-to-monomer linkages. In some embodiments, the polymerization method comprises, consists essentially of, or consists of contacting at least one a bis-fluorinated first monomer, F—X—F, with at least one bis-silylated second monomer, $(R^1)_3Si$—Z—$Si(R^1)_3$, in the presence of a basic catalyst. The fluoro substituents of the first monomer are attached to a sulfonyl, carbonyl, or heteroaryl portion of X, and the silyl groups of the second monomer are attached to an oxygen, sulfur or nitrogen atom of Z. In the presence of the basic catalyst, a fluoro substituent of the first monomer reacts with a silyl substituent of the second monomer to form a silyl fluoride compound. At the same time, a sulfonyl, carbonyl, or heteroaryl group of the first monomer condenses with an oxygen, sulfur or nitrogen atom of the second monomer to which the silyl groups was attached, to thereby form a linear alternating polymer chain with X—Z repeating units.

As described in detail herein, the first monomer can be represented by the formula F-A(-$R^2$-A)n-F, wherein each A independently is $SO_2$, C(=O), or Het; $R^2$ comprises a first organic moiety; n is 0 or 1; and Het is an aromatic heterocycle comprising at least two carbon atoms (e.g., 2 to 4) and at least one (e.g., 1 to 4) nitrogen atoms in a heteroaromatic ring thereof. When A is Het, each F is attached to a carbon atom of the heteroaromatic ring. A particularly preferred A group is $SO_2$. When n is 0, the first monomer can be represented by the formula F-A-F (i.e., $FSO_2F$, FC(O)F, and F-Het-F). When n is 1, the first monomer can be represented by the formula F-A-$R^2$-A-F. In some embodiments, first organic moiety, $R^2$, can be represented by the formula -$L^1$-$R^5$-$L^1$-, in which in which each $L^1$ independently is selected from the group consisting of O, S, and N($R^4$); $R^5$ comprises a first organic moiety, and $R^4$ is H or a third organic moiety. In some other embodiments, the first organic moiety, $R^2$, can be represented by the formula -$L^1$-$R^5$—, in which in which $L^1$ independently is selected from the group consisting of O, S, and N($R^4$); $R^5$ comprises a first organic moiety, and $R^4$ is H or a third organic moiety.

The second monomer, $(R^1)_3Si$—Z—$Si(R^1)_3$, can be represented by the formula $(R^1)_3Si$-L-$R^3$-L-$Si(R^1)_3$, in which each L independently is O, S, or N($R^4$); $R^3$ comprises a second organic moiety; and $R^4$ is H or a third organic moiety.

Figure 1:
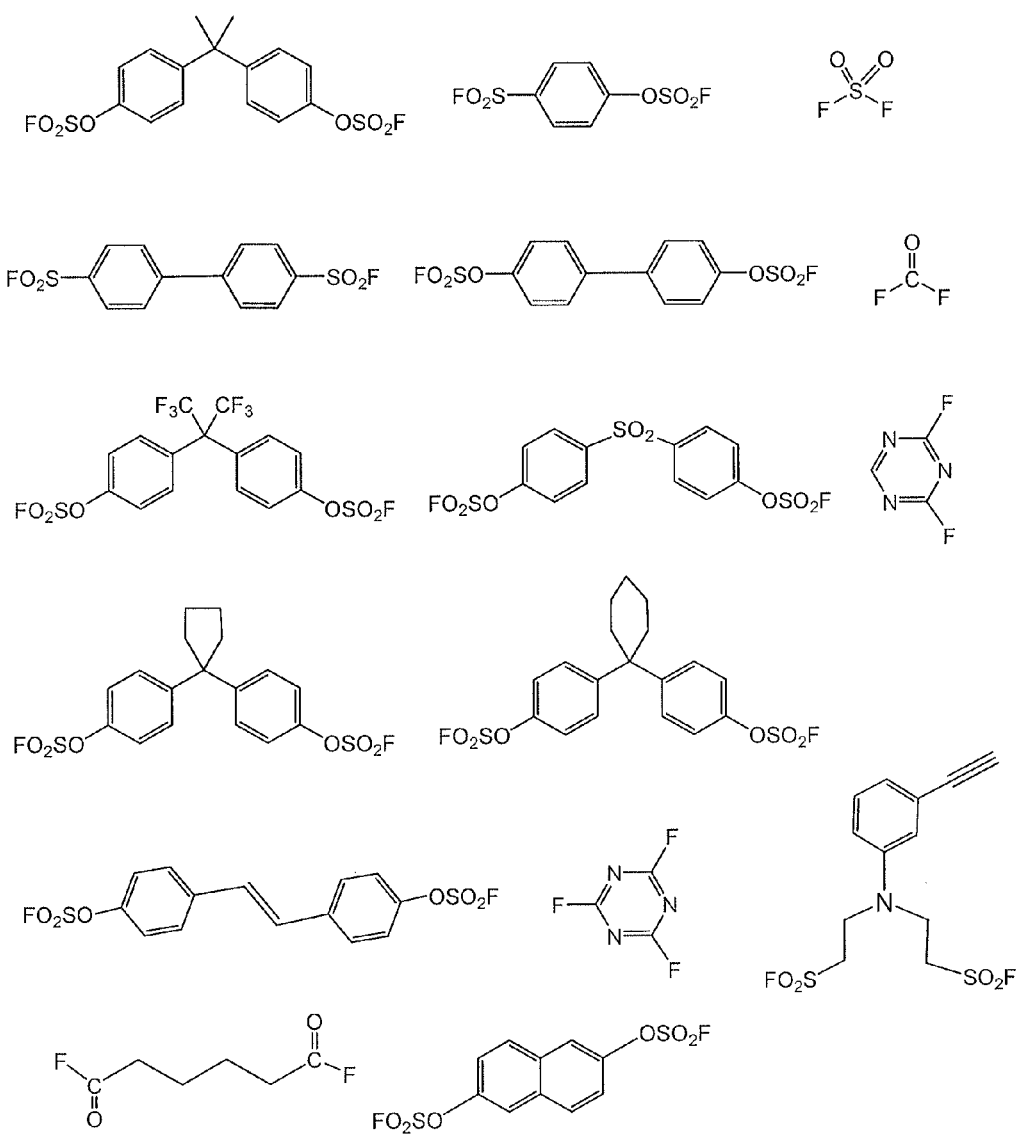
FIG. 1 illustrates non-limiting examples of (A) fluorinated monomers, (B) silylated monomers, and (C) monomers comprising both fluoro and silyl groups, which can be utilized in the polymerization methods described herein.
Figure 1:
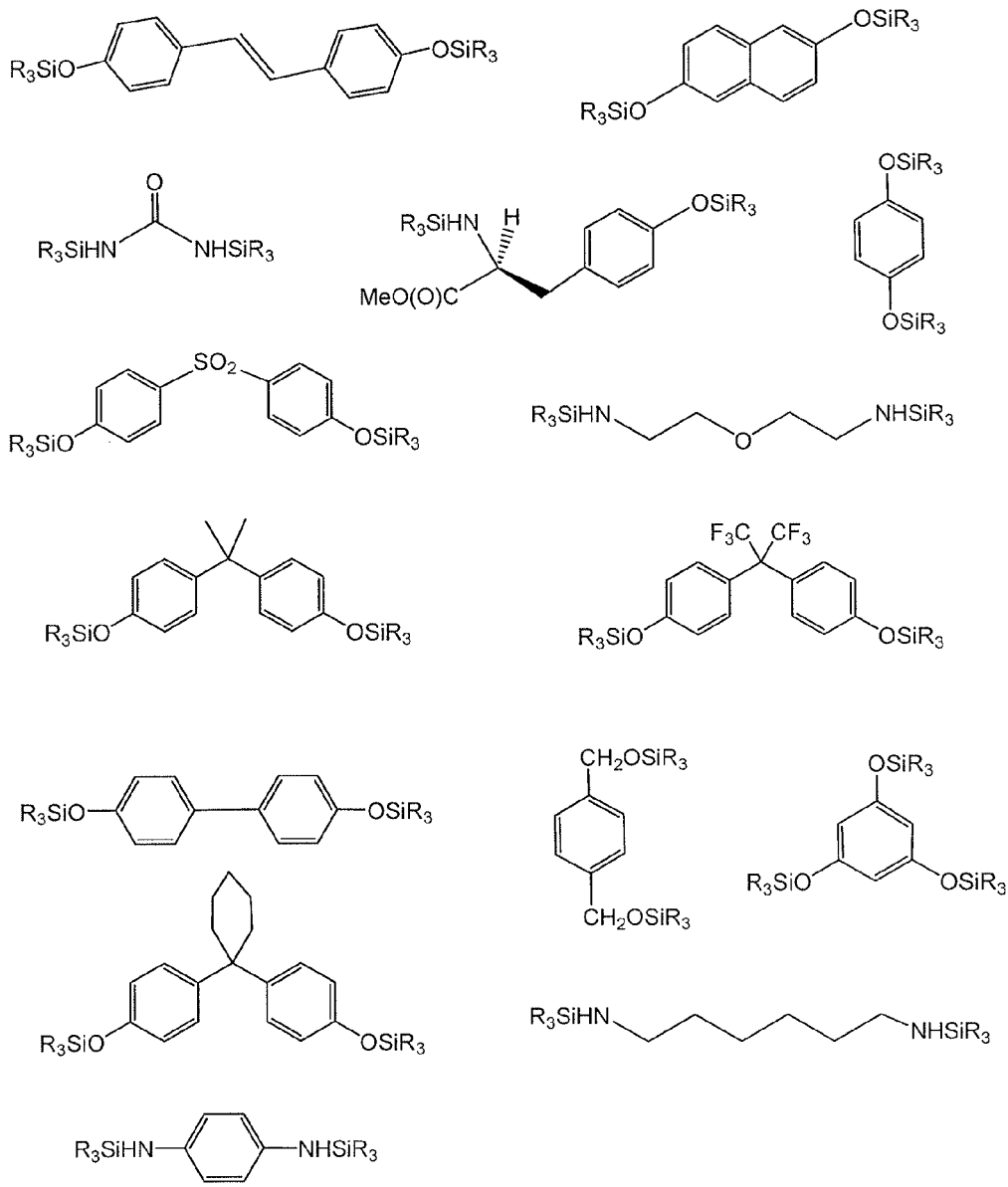
Figure 1:
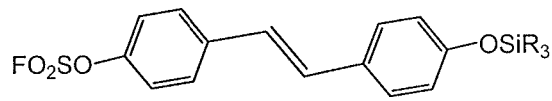
Figure 1:
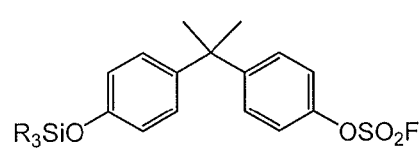
Figure 1:
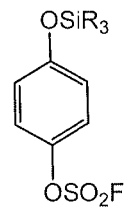
Figure 1:
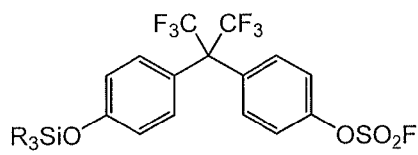
Figure 1:
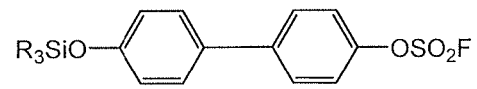

FIG. 1 illustrates non-limiting examples of (A) fluorinated monomers, (B) silylated monomers, and (C) monomers comprising both fluoro and silyl groups, which can be utilized in the polymerization methods described herein.

The X and Z portions of the polymer chain are connected to each other through a linkage such as —$SO_2$-L-, —C(=O)-L-, -Het-L-, -$L^1$-$SO_2$-L-, -$L^1$-C(=O)-L-, or -$L^1$-Het-L-, in which each L and $L^1$ independently is selected from the group consisting of O, S, and N($R^4$); and each $R^4$ independently comprises H or an organic moiety. As described herein, Z comprises an organic moiety bearing the oxygen, sulfur or nitrogen atoms, and X can be the sulfonyl, carbonyl, or heteroaryl activating group, or alternatively, X can comprise an organic core group bearing the sulfonyl, carbonyl, or heteroaryl activating groups. In some polymer embodiments, the sulfonyl, carbonyl, and heteroaryl activating groups of X are attached directly to a carbon atom of the first organic moiety (if present) in X. Alternatively, or in addition, the sulfonyl, carbonyl, and heteroaryl groups of X can be attached to the organic moiety thereof through a sulfur, oxygen, or nitrogen atom.

The heteroaryl groups (also referred to herein as heteroaromatic groups, or "Het") to which the fluoro substituents of the first monomer can be attached include any heterocyclic moiety that comprises at least one nitrogen atom (e.g., 1 to 4 nitrogen atoms), and at least two carbon atoms (e.g., 2 to 4 carbon atoms) in an aromatic ring (e.g., a 5-membered aromatic ring or 6-membered aromatic ring), and the fluoro substituents are attached to carbon atoms in the aromatic ring.

Non-limiting examples of suitable heteroaryl groups, Het, comprising a 6-membered heteroaromatic ring include azabenzene heterocyclic groups such as a pyridine, a diazine (e.g., a 1,2-diazine, a 1,3-diazine or a 1,4-diazine), and a triazine (e.g., a 1,3,5-triazine); azanaphthalene groups such as a 1-azanaphthalene (also known as a quinoline), a 2-azanaphthalene (also known as an isoquinoline), a 1,2-diazanaphthalene (also known as a cinnoline), a 2,3-diazanaphthalene (also known as a phthalazine), a 1,3-diazanaphthalene (also known as a quinazoline), a 1,4-diazanaphthalene (also known as a quinoxaline), a 1,5-diazanaphthalene, a 1,6-diazanaphthalene, a 1,7-diazanaphthalene, a 1,8-diazanaphthalene, a 1,3,5-triazanaphthaline, a 1,3,8-triazanaphthalene, and a 1,3,5,8-tetraazanaphthaline (also known as a pteridine), azaphenanthroline groups such as a 1,10-diazaphenanthroline; and the like. Non-limiting examples of suitable heteroaryl groups, Het, comprising a 5-membered heteroaromatic ring include a pyrrole, an imidazole, an oxazole, a thiazole, a pyrazole, an isoxazole, an isothiazole, as well as condensed 5- and 6-membered heterocycles such as an indole, an isoindole, a benzothiazole, a benzoxazole, a purine, and the like.

As described herein, the Z portion of the second monomer, and optionally, the X portion of the first monomer can comprise any organic moiety (e.g., $R^2$, $R^3$, $R^4$ and $R^5$) groups in the formulas described herein, since the reactivity of the monomers toward polymerization primarily is controlled by the basic catalyst, and the combination of the activating sulfonyl, carbonyl, and heteroaryl groups of the first monomer, the oxygen, sulfur and nitrogen atoms in the second monomer, and the formation of the thermodynamically stable silyl fluoride byproduct from the respective fluoro and silyl substituents of the first and second monomers.

Non-limiting examples of bis-fluorinated and bis-silylated monomers that can be utilized in the methods described herein, are shown in FIG. 1. Panel A of FIG. 1 illustrates selected fluorinated monomers; Panel B of FIG. 1 illustrates selected silyl monomers; while Panel C of FIG. 1 illustrates selected monomers including both fluoro and silyl substituents.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

As used herein, the term "organic" and grammatical variations thereof, in reference to a group or moiety, refer to a material comprising carbon, typically in combination with at least some hydrogen, and optionally including one or more other element, such as oxygen, sulfur, nitrogen, phosphorous, a halogen, or another non-metal or metalloid element from groups II-A (e.g., B), IV-A (e.g., Si), V-A (e.g., As), VI-A (e.g., Se) of the periodic table. The term "organic" also refers to materials traditionally described as organometallic materials (e.g., comprising one or more main group of or transition metal atoms covalently bound to a carbon atom), as well as materials that include metallic elements in a complex or as a salt with an organic moiety. Non-limiting examples of organic moieties or groups include, hydrocarbons, heterocycles (including materials comprising at least one saturated, unsaturated and/or aromatic ring comprising at least one carbon atom, and one or more other elements), carbohydrates (including sugars and polysaccharides), amino acids, polypeptides (including proteins and other materials comprising at least two amino acid groups bound together via a peptide bond), peptide analogs (including materials comprising two or more amino acids linked by a bond other than a peptide bond, e.g., ester bonds), and a combination of two or more thereof.

Additionally, the organic moieties $R^2$, $R^3$, $R^4$, $R^5$ and $R^8$ can be substituted with one or more functional group. Non-limiting examples of such functional groups include e.g., hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$SO$_v$N($R^6$)—, —N($R^6$)SO$_v$$R^6$, —SO$_3$$R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, a polypeptide; wherein each $R^6$ independently is H, alkyl, or aryl, and v is 0, 1, or 2.

The term "hydrocarbon" and grammatical variations thereof is well known in the art and refers to an organic compound consisting entirely of hydrogen and carbon. Hydrocarbons can be saturated (contain no multiple bonds), unsaturated (containing at least one double or triple bond, or aromatic (containing an aromatic ring system such as a benzene ring, or a condensed aromatic ring system such as a naphthalene, anthracene, and similar systems). Hydrocarbons can include of linear chains of carbons atoms, branched chains of carbon atoms, rings of carbon atoms, or any combination thereof. Non-limiting examples of hydrocarbons include alkanes, alkenes, alkynes, cycloalkanes and alkyne-based compounds.

The term "hydrocarbyl" and grammatical variations thereof refers to univalent groups formed by removing a hydrogen atom from a hydrocarbon, e.g. ethyl, phenyl.

The term "carbohydrate" and grammatical variations thereof is well known in the art refers to, for example, polyhydroxylated compounds that formally have an empirical elemental formula (CH$_2$O)x in which x is >1. Non-limiting examples of carbohydrates include sugars (e.g., glucose, maltose), polysaccharides (e.g., starches, cellulose), and modified versions of sugars and polysaccharides (e.g., comprising one or more functional group in place of or in addition to hydroxyl groups, such as amino, ethers, esters), as well as deoxy sugars and deoxy polysaccharides (i.e., sugars and polysaccharides in which an OH has been replaced by an H), and the like. The carbohydrates can be naturally occurring materials, synthetic materials, or a combination thereof.

The term "amino acid" and grammatical variations thereof is well known in the art and refers to, for example, organic compounds comprising at least one amino group, and at least one carboxylic acid group. Examples of amino acids include natural or synthetic alpha-amino acids (e.g., the common proteogenic amino acids, as well as non-proteogenic amino acids such as ornithine, which can be chiral materials, e.g., levo or dextro stereoisomers, or mixtures thereof, or achiral materials, depending on the structure), as well as compounds in which the amino group and carboxylic acid group are separated by more than one carbon.

The term "polypeptide" and grammatical variations thereof is well known in the art and refers to, e.g., materials including two or more amino acids (generally alpha-amino acids) joined together by peptide (amide) bonds between the carboxylic acid group (typically an alpha-carboxylic acid group) of one amino acid and the amino group (typically the alpha-amino group) of another amino acid. As used herein, the term polypeptide also encompasses proteins, as well as materials having a polypeptide core structure with additional functional or protecting groups appended to the polypeptide backbone. The term "peptide analog" and grammatical variations thereof refers to polypeptide-like materials in which one or more peptide bond is replaced by a non-peptide linkage, such as an ester, an ether, and the like.

Molecular weight values such as number average molecular weight ($M_n$) and weight average molecular weight ($M_w$), as well as polydispersity index values ("PDI", i.e., $M_w/M_n$) used herein are based on either gel permeation chromatography (GPC) versus polystyrene standards, or GPC coupled with multiangle light scattering (MALS), as described, e.g., in Example 11, below, unless otherwise specified. Molecular weight parameters for which there is no explicit description or contextual implication of being GPC or MALS values should be interpreted as GPC-derived values. The molecular weight values are reported in units of g/mol (also referred to as Daltons, "Da") or Kg/mol (also referred to as kDa).

Surprisingly, the polymerization methods described herein can be performed under a variety of relatively mild reaction conditions. The reaction routinely can be run at temperatures ranging from ambient room temperature (e.g., about 20 to 25° C.) to about 200° C. When the polymerizations are performed without solvent (neat), a temperature sufficient to melt the monomers may be desired. Preferably, the first and second monomers are reacted in approximately equimolar amounts (based on the moles of F and silyl substituents present) or with an excess (e.g., 0.01 up to about 10 mol % excess) of the fluorinated first monomer.

As described herein, the first and second monomers can be contacted with one another neat or in a solvent. Non-limiting examples of suitable solvents include a halogenated hydrocarbons (e.g., dichloromethane, chloroform, carbon tetrachloride, perchloroethane, chlorofluorocarbons, fluorocarbons, and the like), ethers (e.g., diethyl ether, tetrahydrofuran, dimethoxyethane, and the like), esters (e.g., ethyl acetate), nitriles (e.g., acetonitrile, and the like), ketones (e.g., acetone, methylethylketone), pyridines (e.g., pyridine, picolines, and the like), amides (e.g., N-methylpyrrolidone, acetamide, dimethylacetamide, and the like), sulfoxides (e.g., dimethylsulfoxide, and the like), and sulfones (e.g., sulfolane, dimethylsulfone, and the like). Preferably, the solvent is non-aqueous and aprotic. If desired, mixed solvent systems can be used, or the polymerization reaction can be performed sequentially in different solvents or in a combination of solventless and solution conditions (e.g., beginning in one solvent (or solventless) and completing the polymerization in another solvent).

The silyl fluoride byproduct of the polymerization is readily separable from the polymer product by any of a number of methods that are well-known to those of ordinary skill in the chemical arts. For example, the silyl fluoride can be removed by distillation or evaporation either at ambient atmospheric pressure or reduced pressure, depending of the boiling point of the silyl fluoride. Alternatively, or in addition, silyl fluoride byproducts, which tend to be relatively nonpolar, can be removed from the polymer product by washing with a solvent that will dissolve the silyl fluoride but not the polymer product (e.g., a hydrocarbon solvent). The silyl fluoride byproduct also can be recycled by reaction with a salt of a bis-phenolic monomer precursor (e.g., bisphenol A) to form a bis-silyl ether-type monomer.

The polymeric materials obtained from the methods described herein preferably have a degree of polymerization (i.e., average number of monomer units) of at least about 10 and more preferably greater than 10 (e.g., 10 up to about 100, 200, 300, 400, 500, 1,000, 10,000, 100,000 or greater).

In the methods described herein, the first and second monomers can each comprise a single monomeric material, or a combination to two or more monomeric materials, either as a mixture or added sequentially to the polymerization reactions. For example, the first monomer, F—X—F, can comprise a combination of two or more monomeric materials with different X groups. Similarly, the second monomer, $(R^1)_3Si-Z-Si(R^1)_3$, can comprise a combination of two or more monomeric materials having different $R^1$ groups, different Z groups, or both. Such combinations of monomers can be formulated in any desired proportion, as described herein, or can be separately added to the polymerization mixture. The polymers resulting from such combinations of monomeric materials can include randomly distributed repeating units or can include blocks of repeating monomer units of the same structure, or both random and block segments, depending on the relative reactivity of the various monomers, as well as on whether the different monomeric materials were mixed together initially, or were contacted in a serial fashion, or some combination of mixed and serial addition.

As a non-limiting example, a mixture of first monomers can include 90 mole percent (mol %) of F—$SO_2$—F and 10 mol % of F—$SO_2$—$CH_2$-Ph-$SO_2$—F. Reaction of this mixture of first monomers with a second monomer of formula $Me_3Si$—O-Ph-$CMe_2$-Ph-O—$SiMe_3$, would then provide a polymer of empirical formula: —($SO_2$—O-Ph-$CMe_2$-Ph-O-)e-($SO_2$—$CH_2$-Ph-$SO_2$—O-Ph-$CMe_2$-Ph-O-)f-, and having an approximate ratio of e:f of about 9:1 with the $SO_2$—O-Ph-$CMe_2$Ph-O and $SO_2$—$CH_2$-Ph-$SO_2$—O-Ph-$CMe_2$-Ph-O repeating units likely distributed in a random manner throughout the polymer chain. Alternatively, block copolymers can be formed by contacting an amount (e.g., 9 moles) of a single first monomer composition, F—$SO_2$—F, and a greater molar amount (e.g., 10 moles) of single second monomer composition, $Me_3Si$—O-Ph-$CMe_2$-Ph-O—$SiMe_3$, to form a first uniform polymer chain segment, —($SO_2$—O-Ph-$CMe_2$-Ph-O—)e, and then an amount (e.g., 1 mole) of a different first monomer, F—$SO_2$—$CH_2$-Ph-$SO_2$—F, sufficient to react with the remaining amount of the second monomer to form a second polymer chain segment (e.g., —($SO_2$—$CH_2$-Ph-$SO_2$—-Ph-$CMe_2$-Ph-O-)f), resulting in a block copolymer having block segments in an approximate molar proportion of a:b (i.e., about 9:1 in this example). As will be understood by those of ordinary skill in the polymer art, the second monomer also or alternatively can comprise multiple compounds having different Z groups, to produce polymers having multiple combinations of repeating units, for example, a polymer of the general formula —$(X^1-Z^1)$g-$(X^1-Z^2)$h-$(X^2-Z^1)$i-$(X^2-Z^2)$ . . . —(X'—Z')w-, in which g, h, i, k, and w are proportional to the relative amounts of each different first and second monomer present in the polymerization reaction mixture.

In some embodiments, at least a portion of the first monomer includes a branching monomer of the formula F—X—F, in which X includes an additional F substituent on an activating group selected from $SO_2$, C(=O), and Het as defined elsewhere herein, such that the additional F substituent also reacts with a silyl substituent of the second monomer to form a silyl fluoride, and the additional activating group condenses with an L group of the second monomer to introduce at least one branch point in the polymer. For example, the first monomer can comprise or consist of a branching monomer having an organic core group, such as a phenyl group, substituted by three activated fluoro substituents, such as 1,3,5-tris-fluorosulfonylbenzene, or 2,4,6-trifluoro-1,3,5-triazine, in which the triazine is both the activating group (Het) and the organic core group. Additionally, or alternatively, the second monomer can include a branching monomer with an additional silyl substituent attached to an oxygen, sulfur or nitrogen atom. Reaction of the branching second monomer also results in the introduction of at least one branch point into the polymer, by condensation of the oxygen, sulfur or nitrogen atom with a sulfonyl, carbonyl or heteroaryl activating group of the first monomer, and concomitant reaction of the fluoro and silyl substituents to form a silyl fluoride, as described herein.

In any of the polymerization method embodiments described herein, the organic moieties, e.g., $R^2$, $R^3$, $R^4$, $R^5$ and $R^8$, can be selected from the group consisting of consisting of a hydrocarbon, a heterocycle, a carbohydrate, an amino acid, a polypeptide, a peptide analog, and a combination of two or more thereof. In some embodiments, $R^1$, $R^2$, $R^3$, $R^4$, and $R^5$, can include one of more substituent, e.g., hydroxyl, halogen, nitro, —C(O)$R^6$, —C(O)O$R^6$, —C(O)N($R^6$)$_2$, —CN, —SO$_v R^6$, —SO$_v$N($R^6$)$_2$, $R^6$SO$_v$N($R^6$)—, —N($R^6$)SO$_v R^6$, —SO$_3 R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, a polypeptide; wherein each $R^6$ independently is H, alkyl, or aryl, and v is 0, 1, or 2.

An interesting and useful feature of the polymerization methods described herein is that resulting product comprises polymer chains having at least one and generally both ends of the chain derived from the first (fluorinated) monomer, such that the as-prepared polymer comprises fluoro-substituted end groups (e.g., SO$_2$F, COF or HetF). The fluoro-substituted end groups can be used to functionally modify the ends of the polymer chain, e.g., by nucleophilic displacement of the F substituent by an oxygen, nitrogen, or sulfur-based nucleophile. This end group modification can be performed in the polymerization mixture at the end of the polymerization process (e.g., when the polymerization is performed in solution), or the resulting fluoro-capped polymer can be reacted with a nucleophile in a separate reaction after the initially formed polymer has been isolated. Non-limiting examples of suitable nucleophiles for displacement of the F substituent include hydroxy-substituted materials (e.g., alcohols and phenolic compounds), amines, azide, thiols, and the like.

In some embodiment, the polymers prepared by the methods described herein comprise a polymeric chain having a formula selected from the group consisting of:

| | |
|---|---|
| (-A(-$R^2$-A)n-L-$R^3$-L)x-; | Formula (I): |
| (-A-$R^2$-A-L-$R^3$-L)y-; | Formula (II): |
| (-A-$L^1$-$R^5$-$L^1$-A-L-$R^3$-L)z-; | Formula (III): |
| (-A-$L^1$-$R^5$-A-L-$R^3$-L)m-; | Formula (IV): |
| (-A-L-$R^3$-L)p-; and | Formula (V): |
| (-A-$R^2$-A-L-$R^3$-L)a-(-A-$L^1$-$R^5$-$L^1$-A-L-$R^3$-L)b-(A-$L^1$-$R^5$-A-L-$R^3$-L)c-(-A-L-$R^3$-L)d-. | Formula (VI): |

In the forgoing Formulas (I), (II), (III), (IV), (V),and (VI), each A independently is SO$_2$, C(=O), or Het, preferably SO$_2$; each $R^2$ and $R^5$ independently comprises a first organic moiety; each Het independently is an aromatic heterocycle comprising at least two carbon atoms and one to four nitrogen atoms in a heteroaromatic ring thereof, in which each L is attached to a carbon atom of the heteroaromatic ring; each L independently is O, S, or N($R^4$), preferably O; each $R^3$ independently comprises a second organic moiety; and each $R^4$ independently is H or a third organic moiety. In Formulas (I), (II), (III), (IV),and (V) each of x, y, z, m, and p is the average number of repeating units in the polymer and has a value of at least 10 (e.g., 10 up to about 100, 200, 300, 400, 500, 1,000, 10,000, 100,000 or more). In Formula (VI) each of a, b, c, and d is the average number of respective repeating units and independently can be 0 or greater, provided the sum of a, b, c, and d is at least 10 (e.g., 10 up to about 100, 200, 300, 400, 500, 1,000, 10,000, 100,000 or more). The polymer chains in Formulas (I), (II), (III), (IV),and (V) includes at least one end group, an preferably two end groups, which are derived from the first monomer, i.e., an end group including the moiety E-A-, in which E preferably is a fluoro substituent (F), or E is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, O$R^8$, NH$R^8$, N($R^8$)$_2$, azido, CN, or S$R^8$, and each $R^8$ independently is an organic moiety as described herein for $R^1$, $R^2$, $R^3$, $R^4$, and $R^5$.

An example of one class of polymers that can be produced by the methods described herein is a poly(organosulfate), such as a poly(bisphenol sulfate), as described in detail in the Examples herein. In one embodiment, the poly(bisphenol sulfate) is represented by Formula (IV) wherein each A is SO$_2$, and each L is O and each $R^3$ is a compound of formula: Ph-C($R^7$)$_2$-Ph-, in which each Ph is a 1,4-phenylene group, and each $R^7$ is H, (C$_1$-C$_4$) alkyl (e.g., methyl, ethyl, and propyl), or a halogenated (C$_1$-C$_4$) alkyl (e.g., trifluoromethyl).

In any of the polymers described herein the organic moieties, e.g., $R^2$, $R^3$, $R^4$, $R^5$, and $R^8$, can be selected from the group consisting of consisting of a hydrocarbon, a heterocycle, a carbohydrate, an amino acid, a polypeptide, and a combination of two or more thereof. Additionally, $R^2$, $R^3$, $R^4$, and $R^5$ can be substituted with at least one functional group. Non-limiting examples of such functional groups include e.g., hydroxyl, halogen, nitro, —C(O)$R^6$, —C(O)O$R^6$, —C(O)N($R^6$)$_2$, —CN, —SO$_v R^6$, —SO$_v$N($R^6$)$_2$, $R^6$SO$_v$N($R^6$)—, —N($R^6$)SO$_v R^6$, —SO$_3 R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

In a preferred embodiment, the first and second monomers can comprise a bisphenol-type compound in which two phenolic groups (capped with either a fluorosulfonyl or silyl group) are tethered together by a linking bond or linking group (e.g., oxygen, sulfur, nitrogen, carbonyl, or a saturated or unsaturated alkylene group, which can be substituted or unsubstituted), e.g., a first monomer of Formula VII and a second monomer of Formula VIII:

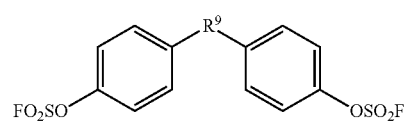

VII

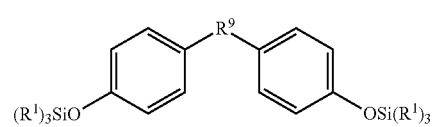

VIII wherein each $R^1$ independently is a hydrocarbyl group, and $R^9$ independently is a covalent bond, C(CH$_3$)$_2$, C(CF$_3$)$_2$, or SO$_2$.

A preferred polymer is a compound of Formula IX:

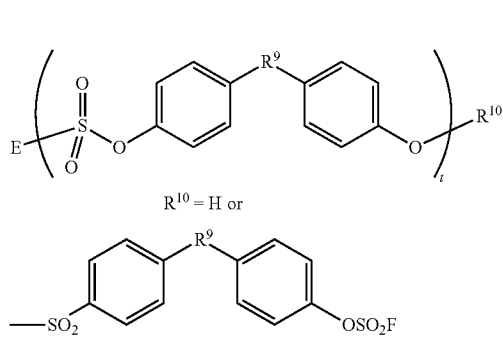

wherein t is the average number of monomer units and is at least 10 (e.g., 10 up to about 100, 200, 300, 400, 500, 1,000, 10,000, 100,000 or more), and E is F or is a functional group obtainable by nucleophilic displacement of F from the "A" moiety, such as azido, amino, alkylamino, arylamino, alkoxy, aryloxy, alkylthio, and similar groups. In some embodiments, E is selected from fluoro, $OR^8$, $NHR^8$, $N(R^8)_2$, azido, CN, or $SR^8$, and each $R^8$ independently is an organic moiety as described herein for $R^1$, $R^2$, $R^3$, $R^4$, and $R^5$.

Certain non-limiting embodiments of the methods and materials described herein are illustrated below.

Embodiment A is a polymerization method comprising the step of contacting a liquid monomer composition with a basic catalyst, wherein the monomer composition comprises at least one compound of formula F—X—F and at least one compound of formula $(R^1)_3Si$—Z—$Si(R^1)_3$; wherein: each $R^1$ independently is a hydrocarbyl group; X has the formula -A(-$R^2$-A)n-; each A independently is $SO_2$, C(=O), or Het; $R^2$ comprises a first organic moiety; n is 0 or 1; Het is an aromatic heterocycle comprising at least two carbon atoms and at least one nitrogen atom in a heteroaromatic ring thereof, and when A is Het, the F substituent is attached to a carbon atom of the heteroaromatic ring thereof; Z has the formula -L-$R^3$-L-; each L independently is O, S, or $N(R^4)$; $R^3$ comprises a second organic moiety; each $R^4$ independently is H or a third organic moiety; and wherein the F and $(R^1)_3Si$ substituents form a silyl fluoride byproduct of formula $(R^1)_3Si$—F as the respective A and L groups of the monomers condense to form an X—Z polymer chain; and wherein the basic catalyst comprises at least one material selected from the group consisting of an amidine, a guanidine, a phosphazene, a nitrogen heterocyclic carbene, a tertiary alkoxide, and a fluoride salt.

Embodiment B is the method of Embodiment A wherein: each $R^1$ independently is an alkyl or aryl group; X has the formula -A(-$R^2$-A)n-; each A is $SO_2$; $R^2$ comprises a first organic moiety; n is 0 or 1; Z has the formula -L-$R^3$-L-; each L independently is O; and $R^3$ comprises a second organic moiety comprising at least one aryl or heteroaryl group directly bonded to each L.

Embodiment C is the method of Embodiment A or B wherein the n is 0.

Embodiment D is the method of any one of Embodiments A to C wherein Het is a 1,3,5-triazine.

Embodiment E is the method of any one of Embodiments A to D wherein the monomer composition includes a compound in which X includes an additional F substituent on a sulfonyl, carbonyl, or heteroaryl activating group, A, such that the additional F substituent also reacts with a $(R^1)_3Si$ substituent on an oxygen, sulfur or nitrogen atom linking group, L, to form a silyl fluoride, and the activating group condenses with the linking group to introduce a branch point in the polymer.

Embodiment F is the method of any one of Embodiments A to E wherein the monomer composition includes a compound in which Z includes an additional silyl substituent, $(R^1)_3Si$, on an oxygen, sulfur or nitrogen atom linking group, L, such that the additional silyl substituent also reacts with a F substituent on a sulfonyl, carbonyl, or heteroaryl activating group, A, to form a silyl fluoride and the linking group condenses with the activating group to introduce a branch point in the polymer.

Embodiment G is the method of any one of Embodiments A to F wherein n is 1; $R^2$ is -$L^1$-$R^5$-$L^1$-; each $L^1$ independently is selected from the group consisting of O, S, and $N(R^4)$; and each $R^4$ independently is H or the third organic moiety, and $R^5$ comprises an organic moiety.

Embodiment H is the method of any one of Embodiments A to G wherein n is 1; $R^2$ is -$L^1$-$R^5$—; $L^1$ is selected from the group consisting of O, S, and $N(R^4)$; $R^4$ is H or the third organic moiety; and $R^5$ is an organic moiety.

Embodiment I is the method of any one of Embodiments A to H wherein the basic catalyst comprises 1,8-diazabicyclo[5.4.0]undec-7-ene (DBU).

Embodiment J is the method of any one of Embodiments A to I wherein the basic catalyst comprises at least one phosphazene selected from the group consisting of 2-tert-butylimino-2-diethylamino-1,3-dimethylperhydro-1,3,2-diazaphosphorine (BEMP) and 1-tert-butyl-4,4,4-tris-(dimethylamino)-2,2-bis[tris(dimethylamino)-phosphoranylidenamino]-$2\lambda^5,4\lambda^5$-catenadi(phosphazene) ($P_4$-t-Bu).

Embodiment K is the method of any one of Embodiments A to J wherein the basic catalyst comprises at least one fluoride salt selected from the group consisting of CsF, CsFHF, KF, tetrabutylammonium fluoride (TBAF) and tris(dimethylamino)sulfonium-difluorotrimethylsilicate (TASF).

Embodiment L is the method of any one of Embodiments A to K wherein the basic catalyst comprises at least one guanidine selected from the group consisting of 1,1,3,3-tetramethylguanidine (TMG), 1,5,7-triazabicyclo[4.4.0]dec-5-ene (TBD), and 7-methyl-1,5,7-triazabicyclo-[4.4.0]dec-5-ene (MTBD).

Embodiment M is the method of any one of Embodiments A to L wherein the basic catalyst comprises at least one nitrogen-heterocyclic carbene selected from the group consisting of an imidazole-2-ylidene, a 1,2,4-triazole-5-ylidene, a thiazole-2-ylidene, and an imidazolin-2-ylidene.

Embodiment N is the method of any one of Embodiments A to M wherein each A is $SO_2$.

Embodiment O is the method of any one of Embodiments A to N wherein each $R^2$ comprises an aryl or heteroaryl moiety either directly bonded to an A group or bonded to A via an oxygen atom attached to the aryl or heteroaryl moiety.

Embodiment P is the method of any one of Embodiments A to O wherein the polymer comprises a polymeric chain represented by a formula selected from the group consisting of:

   Formula (I):

   Formula (II):

   Formula (III):

   Formula (IV):

(-A-L-R³-L)p-; and　　　　　　　　　　　　　　　　Formula (V):

(-A-R²-A-L-R³-L)a-(-A-L¹-R⁵-L¹-A-L-R³-L)b-(A-
　　L¹-R⁵-A-L-R³-L)c-(-A-L-R³-L)d-;　　　　Formula (VI):

wherein: each A independently is SO₂, C(=O), or Het; each L and L¹ independently is O, S, or N(R⁴); each R² and R⁵ independently comprises a first organic moiety; each R³ comprises a second organic moiety; each R⁴ independently is H or a third organic moiety; each n independently is 0 or 1; each Het independently is an aromatic heterocycle comprising at least two carbon atoms and at least one nitrogen atom in a heteroaromatic ring thereof, and when A is Het, the F substituent is attached to a carbon atom of the heteroaromatic ring thereof; each of x, y, z, m, and p is the average number of repeating units in the polymer and has a value of at least 10; and each of a, b, c, and d is the average number of respective repeating units, and independently can be 0 or greater, provided the sum of a, b, c, and d is at least 10.

Embodiment Q is the method of any one of Embodiments A to P wherein one or more of the R², R³, R⁴, and R⁵, comprises a moiety selected from the group consisting of a hydrocarbon, a heterocycle, a carbohydrate, an amino acid, a polypeptide, a peptide analog, and a combination of two or more thereof.

Embodiment R is the method of any one of Embodiments A to Q wherein one or more of R¹, R², R³, R⁴, and R⁵ is substituted by at least one substituent selected from the group consisting of hydroxyl, halogen, nitro, —C(O)R⁶, —C(O)OR⁶, —C(O)N(R⁶)₂, —CN, —SO$_v$R⁶, —SO$_v$N(R⁶)₂, R⁶SO$_v$N(R⁶)—, —N(R⁶)SO$_v$R⁶, —SO₃R⁶, —N(R⁶)₂, —N(R⁶)OR⁶, —N(R⁶)C(O)R⁶, —N(R⁶)C(O)OR⁶, —N(R⁶)C(O)N(R⁶)₂, —OC(O)N(R⁶)₂, —OC(O)OR⁶, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each R⁶ independently is H, alkyl, or aryl, and v is 0, 1, or 2.

Embodiment S is the method of any one of Embodiments A to R wherein the monomer composition comprises (a) two or more different compounds of formula F—X—F, (b) two or more different compounds of formula (R¹)₃Si—Z—Si(R¹)₃, or (c) c combination of both (a) and (b).

Embodiment T is the method of Embodiment S wherein the two or more different compounds of formula (R¹)₃Si—Z—Si(R¹)₃ differ by the selection of R¹, Z, or both R¹ and Z.

Embodiment U is the method of any one of Embodiments A to T wherein the monomer composition comprises at least one compound of Formula VII and at least one compound of Formula VIII:

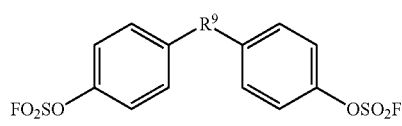

VII

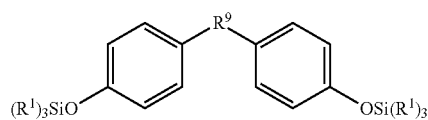

VIII wherein each R¹ independently is an alkyl or aryl group, and each R⁹ independently is a covalent bond, C(CH₃)₂, C(CF₃)₂, or SO₂.

Embodiment V is the method of any one of Embodiments A to U wherein the liquid monomer mixture comprises a mixture of the monomers dissolved in a solvent.

Embodiment W is the method of any one of Embodiments A to V wherein the liquid monomer mixture comprises a melted mixture of the monomers.

Embodiment X is the method of any one of Embodiments A to W wherein the F—X—F monomer comprises sulfuryl fluoride (FSO₂F).

Embodiment Y is the method of any one of Embodiments A to W wherein the F—X—F monomer comprises a bis-fluorosulfonyl monomer of formula F—SO₂—CH₂CH₂—N(R¹¹)—CH₂CH₂—SO₂—F, wherein R¹¹ comprises an organic moiety.

Embodiment Z is the method of Embodiment Y wherein R¹¹ comprises a moiety selected from the group consisting of a hydrocarbon, a heterocycle, a carbohydrate, an amino acid, a polypeptide, a peptide analog, and a combination of two or more thereof.

Embodiment AA is the method of Embodiment Y or Embodiment Z wherein R¹¹ is substituted by at least one substituent selected from the group consisting of hydroxyl, halogen, nitro, —C(O)R⁶, —C(O)OR⁶, —C(O)N(R⁶)₂, —CN, —SO$_v$R⁶, —SO$_v$N(R⁶)₂, R⁶SO$_v$N(R⁶)—, —N(R⁶) SO$_v$R⁶, —SO₃R⁶, —N(R⁶)₂, —N(R⁶)OR⁶, —N(R⁶)C(O)R⁶, —N(R⁶)C(O)OR⁶, —N(R⁶)C(O)N(R⁶)₂, —OC(O)N(R⁶)₂, —OC(O)OR⁶, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each R⁶ independently is H, alkyl, or aryl, and v is 0, 1, or 2.

Embodiment AB is a polymer comprising a polymeric chain having a formula selected from the group consisting of:

(-A(-R²-A)n-L-R³-L)x-;　　　　　　　　　　　　Formula (I):

(-A-R²-A-L-R³-L)y-;　　　　　　　　　　　　　Formula (II):

(-A-L¹-R⁵-L¹-A-L-R³-L)z-;　　　　　　　　　Formula (III):

(-A-L¹-R⁵-A-L-R³-L)m-;　　　　　　　　　　　Formula (IV):

(-A-L-R³-L)p-; and　　　　　　　　　　　　　　Formula (V):

(-A-R²-A-L-R³-L)a-(-A-L¹-R⁵-L¹-A-L-R³-L)b-(A-
　　L¹-R⁵-A-L-R³-L)c-(-A-L-R³-L)d-;　　　　Formula (VI):

wherein: each A independently is SO₂, C(=O), or Het; each L and L¹ independently is O, S, or N(R⁴); each R² and R⁵ independently comprises a first organic moiety; each R³ comprises a second organic moiety; each R⁴ independently is H or a third organic moiety; each n independently is 0 or 1; each Het independently is an aromatic heterocycle comprising at least two carbon atoms and at least one nitrogen atom in a heteroaromatic ring thereof, and when A is Het, the F substituent is attached to a carbon atom of the heteroaromatic ring thereof; each of x, y, z, m, and p is the average number of repeating units in the polymer and has a value of at least 10; and each of a, b, c, and d is the average number of respective repeating units, and independently can be 0 or greater, provided the sum of a, b, c, and d is at least 10; and the polymer includes a group of formula E-A- at one or both ends of the polymer chain, wherein each E independently is fluoro, OR⁸, NHR⁸, N(R⁸)₂, azido, CN, or SR⁸, and each R⁸ independently is an organic moiety.

Embodiment AC is the polymer of Embodiment AB wherein one or more of the organic moieties R², R³, R⁴, R⁵ and $R^8$ is selected from the group consisting of a hydrocarbon, a heterocycle, a carbohydrate, an amino acid, a polypeptide, a peptide analog, and a combination of two or more thereof.

Embodiment AD is the polymer of Embodiment AB or AC wherein one or more of $R^2$, $R^3$, $R^4$, $R^5$ and $R^8$ is substituted by at least one substituent selected from the group consisting of hydroxyl, halogen, nitro, $—C(O)R^6$, $—C(O)OR^6$, $—C(O)N(R^6)_2$, $—CN$, $—SO_vR^6$, $—SO_vN(R^6)_2$, $R^6SO_vN(R^6)—$, $—N(R^6)SO_vR^6$, $—SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

Embodiment AE is the polymer of Embodiment AB wherein the polymer comprises a compound of Formula IX:

IX

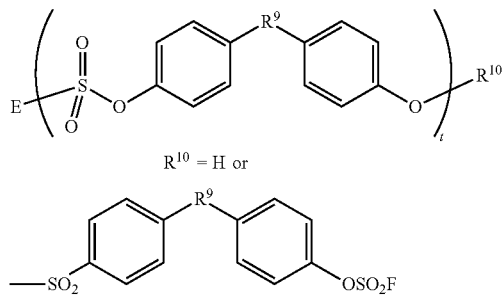

wherein t is the average number of monomer units and is at least 10, each E independently is fluoro, $OR^8$, $NHR^8$, $N(R^8)_2$, azido, CN, or $SR^8$, and each $R^8$ independently is an organic moiety.

Embodiment AF is the polymer of any one of Embodiments AB to AD wherein the polymer has the Formula (I): $(-A(-R^2-A)n-L-R^3-L)x—$, in which each A is $SO_2$, and each $R^2$ independently is $—CH_2CH_2—N(R^{11})—CH_2CH_2—$, wherein $R^{11}$ comprises an organic moiety.

Embodiment AG is the polymer of Embodiment AF wherein $R^{11}$ comprises a moiety selected from the group consisting of a hydrocarbon, a heterocycle, a carbohydrate, an amino acid, a polypeptide, a peptide analog, and a combination of two or more thereof.

Embodiment AH is the polymer of Embodiment AF or AG wherein $R^{11}$ is substituted by at least one substituent selected from the group consisting of hydroxyl, halogen, nitro, $—C(O)R^6$, $—C(O)OR^6$, $—C(O)N(R^6)_2$, $—CN$, $SO_vR^6$, $SO_vN(R^6)_2$, $R^6SO_vN(R^6)—$, $—N(R^6)SO_vR^6$, $—SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

Embodiment AI is the polymer of Embodiment AB wherein the polymer has a molecular weight polydispersity index (PDI) of less than about 2.2 based on gel permeation chromatography using polystyrene standards, and including less than about 5 percent by weight of cyclic oligomers.

Embodiment AJ is the polymer of Embodiment AI wherein the polymer is poly(bisphenol A sulfate).

Embodiment AK is a transparent, substantially colorless film or sheet comprising poly(bisphenol A sulfate).

Embodiment AL is a method of preparing the film or sheet of Embodiment AK comprising pelletizing poly(bisphenol A sulfate), and compressing the pellets at an elevated pressure at a temperature greater than the glass transition temperature thereof.

Embodiment AM is the method of Embodiment AL wherein the elevated pressure is at least about 25,000 pounds-per-square inch (psi) and the temperature is in the range of about 200 to 250° C.

In any of the embodiments described herein, one or more of the A groups (i.e., $SO_2$, $C(=O)$, or Het) of the fluorinated monomer, F—X—F, can be replaced with a group of formula $S(=O)(=NR^{12})$, i.e., to form a monomer with a $—S(=O)(=NR^{12})F$ functional group in place of an $SO_2F$, $C(=O)F$, or Het-F group.

Certain aspects and features of the methods and polymers described herein are further illustrated in the following, non-limiting examples.

Example 1. Exemplary Poly(Bisphenol A Sulfate) Preparations

Large scale preparation of propane-2,2-diylbis(4,1-phenylene) difluorosulfonate (2a). A 2-liter single-neck round-bottom flask was charged with bisphenol A (114.9 g, 0.5 mol), $CH_2Cl_2$ (DCM; 1 L) and triethylamine ($Et_3N$; 174 mL, 1.25 mol, 2.5 equivalents). The mixture was stirred at room temperature for 10 minutes (min). The reaction flask was then sealed with a septum, the atmosphere above the solution was removed with gentle vacuum, and $SO_2F_2$ gas (sulfuryl fluoride, VIKANE) was introduced by needle from a balloon filled with the gas. For large scale reactions such as this, depletion of the sulfuryl fluoride from the balloon was easily observed, and more reagent was introduced with a fresh balloon when required. For small scale reactions, $SO_2F_2$ was used in excess. These reactions can be easily followed by thin layer chromatography (TLC).

The reaction mixture was vigorously stirred at room temperature for 2-4 hours, monitoring by GC-MS and TLC. After completion, the solvent was removed by rotary evaporation, the residue was dissolved in ethyl acetate (EtOAc; 1 L), and the solution was washed with 1N HCl (2×500 mL) and brine (2×500 mL). The organic phase was dried over anhydrous $Na_2SO_4$ and concentrated. The resulting solid was dried under high vacuum at 60° C. overnight to give the desired compound as a white crystalline solid in quantitative yield (197.1 g, 100% yield). Melting point (mp) 48-49° C. $^1H$ NMR (400 MHz, $CDCl_3$) δ 7.34-7.32 (m, 2H), 7.28-7.26 (m, 2H), 1.72 (s, 3H); $^{13}C$ NMR (101 MHz, $CDCl_3$) δ 150.4, 148.2, 128.7, 120.5, 42.9, 28.4, 30.7; $^{19}F$ NMR (376 MHz, $CDCl_3$) δ +37.0; GC-MS ($t_R$): 7.2 min; EI-MS (m/z): 392 [M]+.

Large scale preparation of (propane-2,2-diylbis(4,1-phenylene))bis(oxy))bis(tert-butyldimethylsilane) (2c). In a 2 L flask, 88.4 grams (2.6 eq., 1.3 mol) of imidazole was adding to a solution of bisphenol A (114.2 gram, 0.5 mol) in DCM (1000 mL), this solution stirred at room temperature for 10 min. Next, 181 gram of t-butyldimethylsilyl chloride (TBSCl; 2.4 equivalents, 1.2 mol) was dissolved into 200 mL of DCM, and the resulting TBSCl solution was added to the bisphenol A over 30 minutes by addition funnel. the reaction was stirred at room temperature for 24 hours. And the reaction was monitored by TLC or GCMS. Then the DCM solvent and was removed by rotary evaporation, 1000 mL of EtOAc was added to re-dissolve the residue, the EtOAc solution was washed twice with 500 mL saturated sodium bicarbonate solution, twice with 500 mL brine, and then the organic phase was dried over anhydrous $Na_2SO_4$. Removed the solvents by rotary evaporation. The resulting product was dried under high vacuum at 70° C. for 24 hours. The pure bis-TBS bisphenol A compound was obtained as a white solid (225.2 grams, 98.5% yield) without need for further purification before polymerization reaction. mp 78-80° C.; $^1$HNMR: (400 MHz, $CDCl_3$, 23° C.): δ 7.10-7.07 (m, 4H), 6.76-6.73 (m, 4H), 1.65 (s, 6H), 1.01 (s, 18H), 0.22 (s, 12H). $^{13}$CNMR: (100 MHz, $CDCl_3$, 23° C.): δ 153.2, 143.7, 127.7, 119.2, 41.7, 31.1, 25.7, 18.2, −4.39. GCMS: 8.38 min, MS m/z 456.3 (M+).

Large Scale Bulk Polymerization (0.5 mol scale) of poly(bisphenol A sulfate). A 1,000 mL 3-necked round bottom flask equipped with a reflux condenser, two rubber septa (one of which contained a thermometer for internal measurements) and a Teflon-coated magnetic stir bar was charged with 2a (98.1 g, 0.25 mol) and 2c (114.5 g, 0.25 mol). The reaction vessel was placed into an oil bath and brought to 135° C. Once the monomers melted (internal temperature 120° C.), 1 mol % of BEMP as a 1M solution in hexanes (5 mL, 5 mmol) was added. Within 5 min, tert-butyldimethylfluorosilane (TBSF) was observed refluxing. After approximately 45 min, the reaction mixture solidified and stirring ceased. Heating at 120° C. was continued for an additional 45 min at which point the reflux condenser was replaced by a distillation head, and TBSF was distilled off (56 g isolated). DMF (300 mL) was then added to the solid crude BPA-polysulfate product, and heating was continued at 130° C. until stirring was restored and all the polymer had dissolved. The resulting clear, colorless DMF solution was allowed to cool to approximately 60° C. and was then slowly poured at a continuous and consistent rate into a beaker containing 3 L of vigorously stirred (overhead stirrer) methanol at ambient temperature, resulting in the formation of long, fibrous BPA-polysulfate strands. This material (144 g, 99.3%) was dried overnight at 80° C. in a vacuum oven, analyzed by GPC. PDI=1.7; $M_n$=120,000 Da referenced to polystyrene standards; $M_n$=58,000 determined by MALS; $T_g$=98° C.; $^1$H NMR (400 MHz, DMSO-$d_6$) δ 7.31 (app s, 8H), 1.61 (2, 6H); Calcd. For $(C_{15}H_{14}O_4S)_n$: C, 62.05; H, 4.86; S, 11.04. Found: C, 61.98; H, 4.80; S, 10.84; F, 0.33.

Figure 2:
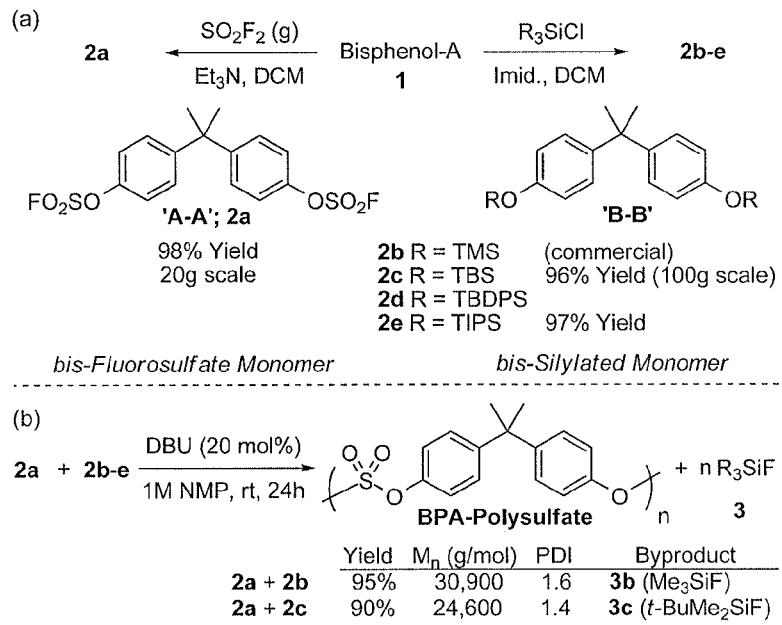
FIG. 2 schematically illustrates selected bisphenol A monomer syntheses in Panel (a), and syntheses of poly (bisphenol A sulfate) from the monomers in Panel (b).

The polymerization reactions described herein are extremely efficient, and when bis(arylfluorosulfate) 2a and bis(arylsilyl) ethers 2b-e are used, high molecular weight polymers are produced (FIG. 2). The reaction is catalyzed by organic bases, such as 1,8-diazabicyclo[5.4.0]undec-7-ene (DBU) or 2-tert-butylimino-2-diethylamino-1,3-dimethylperhydro-1,3,2-diaza-phosphorine (BEMP), or fluoride salts, such as CsF. It proceeds in essentially quantitative yields, is compatible with many functional groups, and does not require special equipment or precautions.

Both the fluorosulfate and the silyl ether monomers were readily obtained from BPA (FIG. 2, Panel (a)). Its treatment with $SO_2F_2$ gas in the presence of triethylamine generated the bis(fluorosulfate) 2a, which was isolated as a shelf-stable, white crystalline solid in high yield on mole scale following simple work-up procedures without the need for chromatographic purification. The bis(silyl ether) monomers, 2b-e are either commercially available (2b) or were easily prepared on a large scale following standard procedures (2c-e).

The initial examination of the reaction between monomers 2a and 2b in different solvents (1M in monomers) in the presence of 20 mol % of DBU identified N-methylpyrrolidone (NMP) and dimethylformamide (DMF) as optimal solvents for the preparation of polysulfates (FIG. 2, Panel (b)). Following precipitation from methanol, BPA-polysulfate (BPA-PS) was recovered as white powder in 95% yield (GPC $M_n$=30,900 g/mol, referenced to polystyrene standards). The results were similar when the TBS monomer (2c) was used (GPC $M_n$=24,600 g/mol); in the latter case, liquid tert-butylfluorodimethylsilane (3c, TBSF) byproduct was generated and removed by distillation.

Example 2. Catalyst Evaluation

A variety of organic and inorganic bases, nucleophiles, Lewis acids, and fluoride sources were evaluated using monofunctional fluorosulfate ($PhOSO_2F$) and TBS-protected phenol (PhOTBS) in acetonitrile. The results revealed that amidines, guanidines and phosphazenes are particularly useful catalysts. Additional active catalysts were fluoride, introduced through organic and inorganic sources, as well as non-nucleophilic tert-butoxide base (KOt-Bu).

Active catalysts were then applied to the polymerization of BPA-fluorosulfate monomer (2a) and both TMS (2b) and TBS (2c) protected BPA monomers at room temperature (see Table 1). The TMS monomer system, (2a+2b), offered BPA-polysulfate up to and around $M_n$ 30,000 to 35,000 g/mol (based on GPC), while the TBS monomer system (2a+2c) displayed a wider range of obtained $M_n$ values. Of the amidine catalyst, Entries 1-3 in Table 1, DBU was the most effective for generating polymer, as DBN and PMDBD provided mostly oligomers. Guanidines, Entries 4-6, were largely comparable if not superior to amidine catalysts in that MTBD gave BPA-polysulfate of twice the $M_n$ with half the catalyst loading, as compared to DBU (2a+2c system). Phosphazenes, Entries 7-8, displayed the greatest catalytic activity, as evidenced by polysulfate of 55,400 g/mol produced by BEMP. Finally, catalytic KOt-Bu (Entry 9) and fluoride (Entries 10-11) gave polysulfate only with the TBS system, whereas with TMS system yielded low molecular weight (MW) oligomers. From these and other initial studies it was apparent that 2c, with the more stable TBS protecting groups on the phenolic hydroxy substituents, offered the potential to prepare polysulfates of higher $M_n$ as compared to 2b, TMS system, which showed an apparent $M_n$ ceiling of about 35,000 g/mol. The difference between these two systems may be related to the much greater basic stability of TBS phenols as compared to TMS phenols.

TABLE 1

BPA-Polysulfate Catalyst Evaluation.

| | | 2a + 2b (TMS) | | 2a + 2c (TBS) | |
|---|---|---|---|---|---|
| Entry | Catalyst | $M_n$ | PDI | $M_n$ | PDI |
| 1 | DBU | 30,900[a,c,e] | 1.6 | 24,000[a,c,f] | 1.4 |
| 2 | DBN | oligomer[a,c,e] | | oligomer[a,c,f] | |
| 3 | PMDBD | oligomer[a,c,f] | | no precipitate[a,c,f] | |
| 4 | TMG | 30,300[a,c,e] | 1.7 | oligomer[a,c,f] | |
| 5 | TBD | 22,800[a,d,e] | 1.5 | oligomer[b,c,f] | |
| 6 | MTBD | 29,600[a,d,e] | 1.5 | 44,300[b,c,f] | 1.5 |
| 7 | BEMP | 33,900[a,d,e] | 1.5 | 55,400[b,c,f] | 1.5 |
| 8 | $P_4$-t-Bu | N/A | | 45,100[b,c,f] | 1.6 |
| 9 | KOt-Bu | oligomer[a,d,e] | | 29,700[a,c,e] | 1.4 |
| 10 | CsF | oligomer[a,d,e] | | 28,200[a,c,e] | 1.4 |
| 11 | TASF | oligomer[a,d,e] | | 48,100[a,d,f] | 1.7 |

In Table 1, polymerization conditions were: catalyst loading [a] 20 mol % or [b] 10 mol %; molarity NMP [c] about 1M or [d] about 0.5M; reaction time [e] 24 hours or [f] 48 hours. Material isolated from methanol precipitation and analyzed by GPC. $M_n$ in reference to polystyrene standards. Abbreviations: DBU=1,8-diazabicyclo[5.4.0]undec-7-ene; DBN=1,5-diazabicyclo[4.3.0]-non-5-ene; PMDBD=1,2,3,4,4a,5,6,7-octahydro-2,2,4a,7,7-pentamethylnaphthyridine; TMG=1,1,3,3-tetramethylguanidine; TBD=1,5,7-triazabicyclo[4.4.0]dec-5-ene; MTBD=7-methyl-1,5,7-triazabicyclo-[4.4.0]dec-5-ene; BEMP=2-tert-butylimino-2-diethylamino-1,3-dimethylperhydro-1,3,2-diazaphosphorine; $P_4$-t-Bu=1-tert-butyl-4,4,4-tris-(dimerthylamino)-2,2-bis[tris (dimethylamino)-phosphoranylidenamino]-$2\lambda^5,4\lambda^5$-catenadi(phosphazene); KOt-Bu, potassium tert-butoxide; CsF=cesium fluoride; TASF=tris(dimethylamino)sulfonium-difluorotrimethylsilicate.

Figure 3:
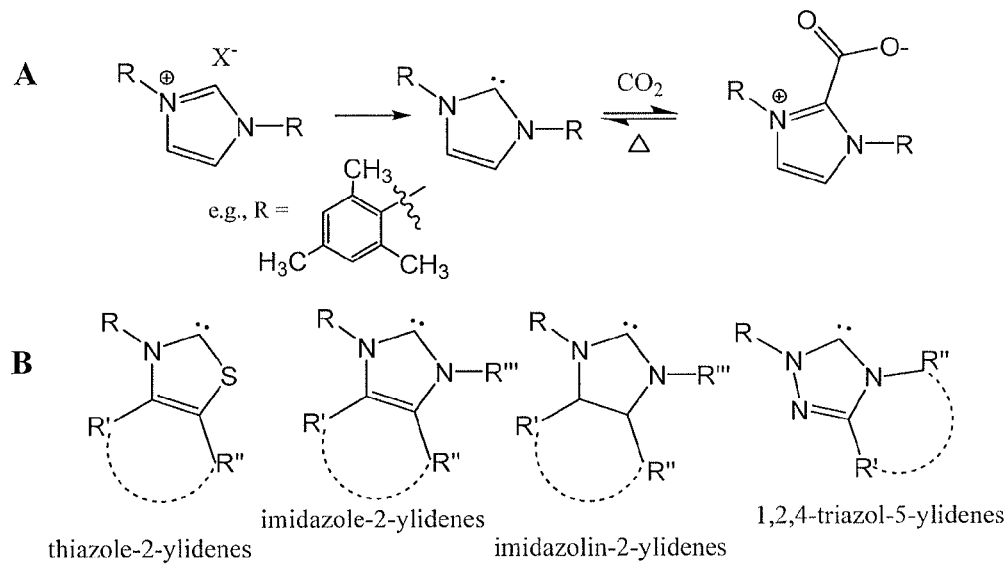
FIG. 3 illustrates (A) preparation of nitrogen-heterocyclic carbene-type basic catalysts from precursor materials and (B) the structures of various classes of nitrogen-heterocyclic carbenes.

Nitrogen-heterocyclic carbenes also can be used as catalysts in the polymerization methods described herein. FIG. 3 illustrates the preparation of nitrogen-heterocyclic carbenes from salt and zwitterion intermediates (Panel A), as well as some heterocyclic carbene classes (Panel B, which illustrates an imidazole-2-ylidene, a 1,2,4-triazole-5-ylidene, a thiazole-2-ylidene, and an imidazolin-2-ylidene). A representative carbene is 1,3-(di-(2,4,6-trimethylphenyl)-2,3-dihydro-1H-imidazol-2-ylidene. These carbene bases and their preparation are described in detail by Enders et al., *Chem. Rev.* 2007, 107:5606-5655, which is incorporated by reference herein in its entirety. The reaction of monomers 2a and 2c with the zwitterionic carboxylate precursor of 1,3-(di-(2,4,6-trimethylphenyl)-2,3-dihydro-1H-imidazol-2-ylidene (see FIG. 3) releases $CO_2$ upon heating and produces the active catalyst in situ. On a 2 mmol scale, the GPC $M_n$ of the resulting polymer was 56,000 Da (polystyrene standards), and the PDI was 1.4.

The mechanism of the catalysis is not yet understood. Preliminary investigations suggest that activation of silyl ethers with $F^-/F_2^-$ and their conversion to hypervalent silicon derivatives, may possibly be at least partially responsible for the observed reactivity of the silyl ethers with fluorosulfates. Interactions of DBU and similar catalysts with the fluorosulfonyl group may also or alternatively play a role in the reaction.

Example 3. Evaluation of Concentration, Temperature and Catalyst Loading

Figure 4:
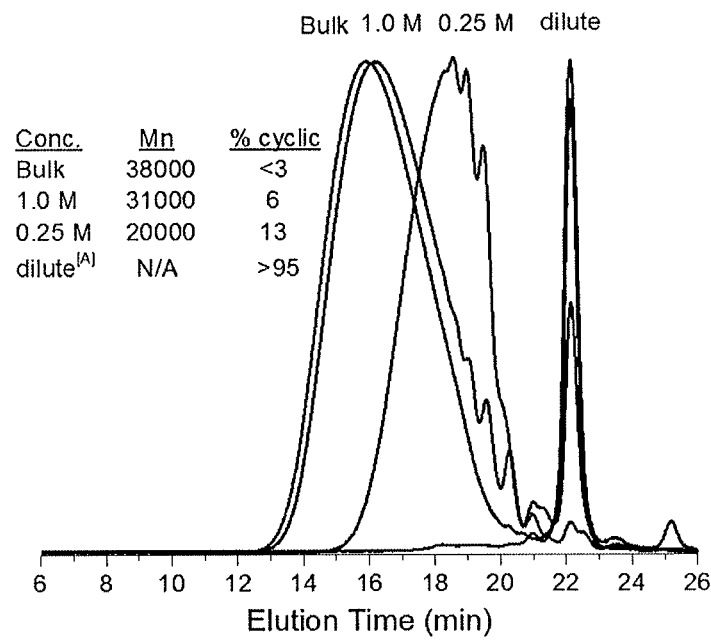
FIG. 4 provides normalized GPC traces of poly(bisphenol A sulfate) prepared at different monomer concentrations by polymerization of monomers 2a and 2b.

The effect of concentration was explored with the TMS system (2a+2b). Molecular weight was highest in bulk (at about 150° C., well above the $T_g$ of about 90 to 98° C.) and decreased as concentration decreased (see FIG. 4). Bulk polymerization also exhibited the lowest amount of what is believed to be a cyclic oligomer byproduct, shown eluting at approximately 23 minutes in the GPC. The narrow PDI and low $M_n$, as determined by GPC, indicate a cyclic topology for this byproduct. The cyclic oligomer was less soluble in organic solvents than the polymer. While the exact structure is not yet identified, the cyclic displays a symmetrical NMR and elemental analysis indicates a molecular formula of $(C_{15}H_{14}O_4S)_n$ (62.32% C, 1.89% H, 11.03% S). The amount of cyclic byproduct increased as concentration decreased. This increase in cyclic byproduct formation is expected due to the increased tendency towards intramolecular reaction at low concentration. A similar effect has been observed for BPA-polycarbonate. At low concentrations, accomplished by drop-wise addition of 2a and 2b to a dilute acetonitrile solution containing DBU, the product is almost purely cyclic oligomer. Other catalysts screen for activity under the bulk polymerization conditions described above included BEMP, CsF and potassium tert-butoxide. Similarly to the results described above, both BEMP and CsF provided greater $M_n$ than did DBU. Interestingly, potassium tert-butoxide was ineffective, despite showing activity in solution.

Figure 5:
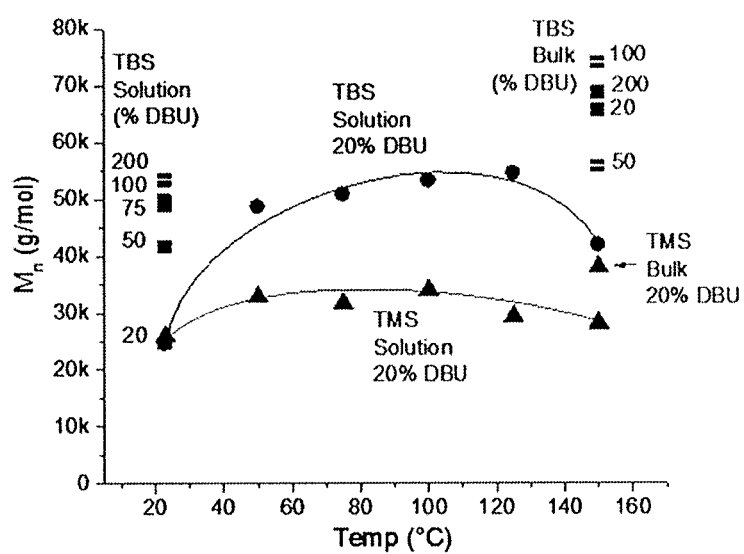
FIG. 5 illustrates the effect of temperature and catalyst loading on the solution polymerization of monomers 2a+2b (lower curve) and monomers 2a+2c (upper curve).

The effect of temperature on the solution-based polymerization in NMP was subsequently explored. Catalyst loading was held constant at 20% DBU. The TMS systems did not respond to heating as shown in FIG. 5 (lower curve), the GPC $M_n$ was roughly 35,000 g/mol. Bulk polymerization of this TMS system was anticipated to increase $M_n$ and did so but only slightly, about 40,000 g/mol. In contrast the TBS system (FIG. 5, upper curve) demonstrated a significant increase in $M_n$ when reaction temperature was increased from room temperature to 50° C. Further increases in temperature yielded slight increases in $M_n$: at these increased temperatures, $M_n$ was roughly 50,000 g/mol. At 150° C., the highest temperature explored, the $M_n$ decreased, likely due to degradation.

The effect of varying catalyst loading also was examined. At room temperature in NMP, the TMS system (2a+2b) exhibited essentially no change in GPC $M_n$ regardless of mol % DBU employed. In the TBS system, increasing DBU loading resulted in increased $M_n$. Like the first increase in temperature from room temperature (RT) to 50° C., the first increase in DBU loading from 20 to 50% gave a large jump in $M_n$. More DBU did increase the $M_n$ further but in a less pronounced manner with $M_n$ reaching around 50,000 to 55,000 g/mol. In bulk at 150° C., catalyst loading had no clear effect on $M_n$, which hovered around an apparent average of 65,000 to 70,000 g/mol.

The TBS system was more responsive to different conditions than the TMS system, which showed clear limitation in increasing GPC $M_n$. In bulk, the TBS system generated polymers of the highest molecular weight. Bulk polymerization also affords the least cyclic byproduct and is arguably a less wasteful and more eco-friendly process. For these reasons, the scope of bulk polymerization conditions was extended further.

Figure 6:
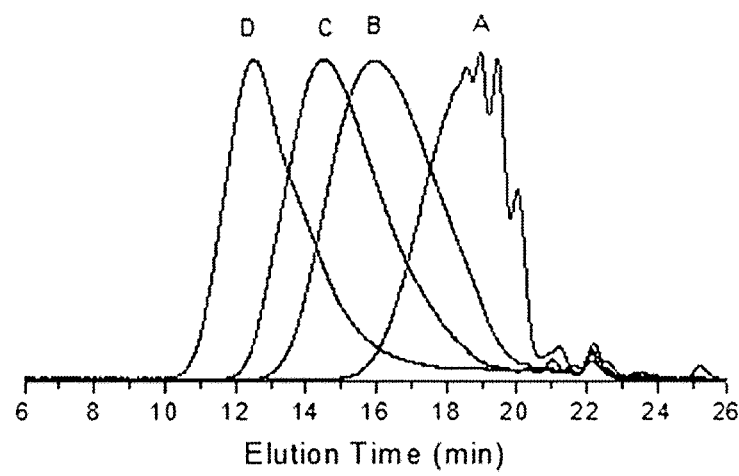
FIG. 6 provides selected GPC traces relating to the polymers in Table 2.

Further investigations showed that molecular weight of the polymers depended on the nature of the catalyst, its loading, and the nature of the silyl group (Table 2, FIG. 6). The TBS monomer 2c consistently produced the largest polymers, with GPC $M_n$ surpassing 100,000 g/mol when BEMP catalyst was used, (Table 2, entry 4-6). DBU generally resulted in less than 70,000 g/mol polymers and was ineffective at low loadings (cf. entries 4 and 7). Polymers obtained from the TMS monomer 2b, in contrast to TBS, never exceeded 40,000 g/mol regardless of polymerization conditions. TBDPS (2d) and TIPS (2e) BPA ethers also successfully polymerized in the bulk and produced polysulfates of variable $M_n$ (entries 11 and 13), although higher loadings of the BEMP catalyst were required (cf. entries 10 vs. 11). Thus, the TBS ether 2c has emerged as the "goldilocks" monomer, yielding large polymers with low catalyst loadings at different conditions. Finally, several samples were subjected to multiangle light scattering (MALS) analysis for absolute molecular weight determination. As has been reported for BPA-polycarbonates, polystyrene standards appear to significantly overestimate molecular weights of polysulfates. This was especially noticeable for the lower molecular weight polymers (Entries 1-3 in Table 2), with the error being reduced to approximately twofold for the higher molecular weight (cf. Entries 4 and 9). FIG. 6 provides representative GPC traces for the polymers labeled A, B, C and D in Table 2 (Entries 1, 3, 8, and 4, respectively).

TABLE 2

Comparison of bulk polymerization conditions.

| Entry | Monomers | Cat. | Mol % | $M_n^{MALS}$ | $M_n^{PS}$ | PDI |
|---|---|---|---|---|---|---|
| 1(A) | 2a + 2b(TMS) | BEMP | 1% | 2,500 | 17,000 | 1.3 |
| 2 | | | 10% | 8,800 | 34,000 | 1.4 |
| 3(B) | | DBU | 20% | 10,600 | 38,000 | 1.4 |
| 4(D) | 2a + 2c(TBS) | BEMP | 1% | 58,000 | 120,000 | 1.7 |
| 5 | | | 10% | n/d | 128,000 | 1.6 |
| 6 | | | 20% | n/d | 143,000 | 1.5 |
| 7 | | DBU | 1% | no polymer formation | | |
| 8(C) | | | 20% | 19,600 | 66,000 | 1.4 |
| 9 | | CsF | 20% | 38,300 | 93,000 | 1.5 |
| 10 | 2a + 2d(TBDPS) | BEMP | 1% | no polymer formation | | |
| 11 | | | 10% | n/d | 118,000 | 1.5 |
| 12 | 2a + 2e(TIPS) | BEMP | 1% | no polymer formation | | |
| 13 | | | 10% | n/a | 51,400 | 2.0 |

Notes
for Table 2: Polymerization conditions: solvent-free, 150° C., 2 hours (h).
Workup: dissolution in DMF followed by subsequent precipitation from methanol.
$M_n^{MALS}$ refers to $M_n$ determined by multiangle light scattering coupled with GPC.
$M_n^{PS}$ refers to $M_n$ determined by GPC in reference to polystyrene standards.
n/d = not determined.

Example 4. Poly(Bisphenol A Sulfate) Physical Property Characterization

The physical properties of the poly(bisphenol A sulfate) polymers obtained in the present examples were evaluated. Thermogravimetric analysis (TGA) measurements were made on polymers with MALS $M_n$ of about 2,500, 40,000 and 58,000 g/mol.

In particular, thermal decomposition of BPA-polysulfate samples were measured using a TA Q5000IR TGA with a heating rate of 10° C./min. The glass transition temperature ($T_g$) of various polymer samples was determined using a TA Q2000 differential scanning calorimetry (DSC) apparatus. A heat/cool/heat program ranging from 0° C. to 220° C. at 10° C./min was used. $T_g$ was taken from the second heating scan.

Figure 7:
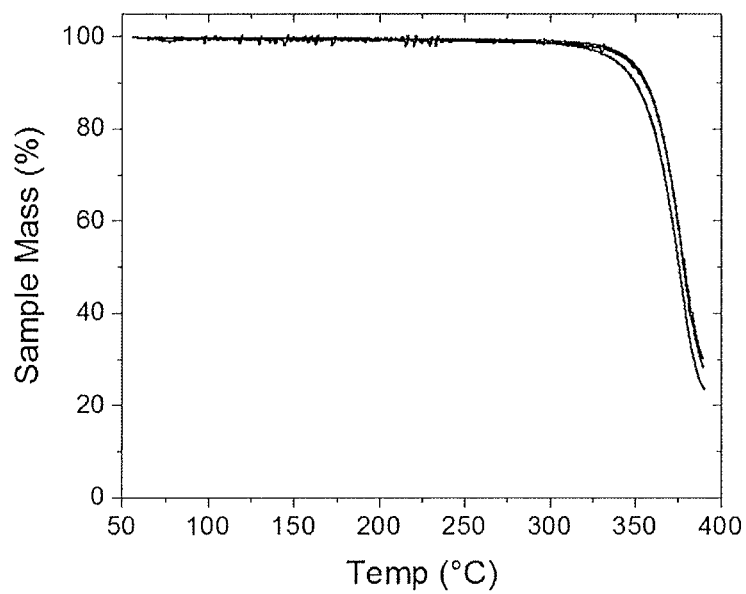
FIG. 7 provides Thermogravimetric Analysis (TGA) thermograms of representative poly(bisphenol A sulfate) polymer samples demonstrating consistent thermal decomposition properties for polymers prepared under different conditions and having different molecular weight characteristics, i.e., MALS $M_n$ values of 2.5 kDa (lowest curve), 40 kDa and 59 kDa (two overlapping upper curves).

The TGA results indicated that the polysulfates exhibited excellent thermal stability, with very similar degradation curves, as shown in FIG. 7, in which the curve for the 2,500 g/mol sample is the lowest curve, and the 40,000 and 58,000 g/mol samples are shown in the upper, overlapping curves. The thermal decomposition temperature increased only slightly as $M_n$ increased, but each material was thermally robust: only about 5% weight loss occurred at nearly 350° C.

Figure 8:
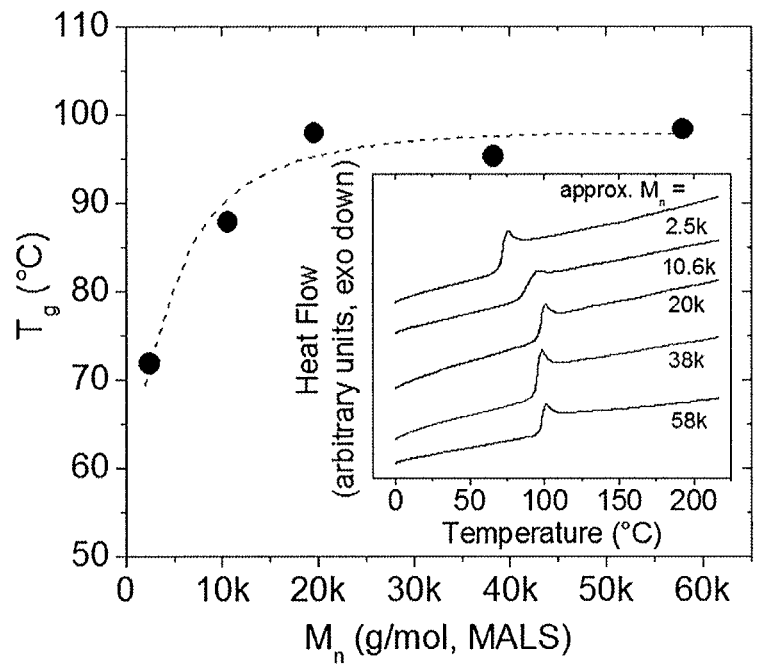
FIG. 8 provides differential scanning calorimetry (DSC) second-heating thermograms (inset) for representative poly (bisphenol A sulfate) polymer samples and a graph of corresponding GPC $M_n$ versus $T_g$ for the polymers.

Representative DSC thermograms of several separately poly(bisphenol A sulfate) samples are provided in FIG. 8 (inset), in which polymers having respective MALS $M_n$ values of 2.5 kDa, 10.6 kDa, 20 kDa, 38 kDa, and 58 kDa were evaluated, proceeding from the top curve to the bottom curve. The $T_g$ values were in the range of about 72 to 98° C. for the polymers, with the lowest $M_n$ polymer having the lowest $T_g$, and the highest $M_n$ polymer having the highest $T_g$. No crystalline melting or crystallization peaks were identified, indicating that the BPA polysulfate is amorphous. The aromatic sulfate backbone was also found to be hydrolytically stable. FIG. 8 also provides a graph of $M_n$ versus $T_g$. The data in FIG. 8 demonstrates a plateau in the $T_g$ values of about 95 to about 100° C. as the MALS $M_n$ exceeded about 20 kDa (a GPC $M_n$ of about 60 kDa). This indicates that a MALS $M_n$ of about 20 kDa (or GPC $M_n$ of about 60 kDa) for the poly(bisphenol A sulfate) polymers represents the approximate minimum molecular size to produce a fully entangled polymer. No crystalline melting or crystallization peaks were identified, indicating that the tested poly(bisphenol A sulfate) polymers are amorphous.

The 120,000 g/mol $M_n$ sample (based on GPC versus polystyrene standards) also initially was analyzed by GPC coupled with multiangle light scattering (MALS) and differential refractive index (dRI) detectors for absolute molecular weight determination using somewhat different analysis parameters and conditions than described below in Example 11. The results (analysis in DMF) indicate that the molecular weight of the polymer was $M_n$=84,740 g/mol; $M_w$=111,500 g/mol; PDI=1.31, which is a somewhat higher $M_n$ than the value of 58,000 g/mol determined as described below in Example 11. These differing results illustrate the well-known sensitivity of polymer molecular weight determinations to the specific conditions and methods used for the molecular weight determinations. Thus, the measured molecular weight parameters for the polymers described herein may vary based on the techniques used to obtain the measurements. The relative GPC molecular weights are believed to be internally consistent and suitable for routine evaluations due to the relative ease of operation and availability of equipment, suitable standards, and well developed methodologies.

Example 5. Poly(Bisphenol A Sulfate) Mechanical Property Evaluation

The bulk polymerization of 2a and 2c was scaled up to 0.5 mole scale. The reaction was performed at 120° C. for 2 hours using 1 mol % BEMP catalyst. No significant change of internal temperature was observed during the course of the reaction. BPA-PS with $M_n$ 58,000 Da (MALS) was obtained in quantitative yield (145 g). The polymer was mildly soluble in a wide range of organic solvents including chloroform, dichloromethane, and acetone, while best solubility was observed in DMSO and DMF (about 1 g per 2 mL of DMF, with heating). Treating polysulfate with 50/50 10% NaOH/EtOH solution at 80° C. for 16 hours caused no observable change in $M_n$, indicating excellent hydrolytic stability in contrast to polycarbonate.

The large scale batch of poly(Bisphenol AA sulfate) was pelletized and compression-molded for various physical and mechanical analyses. LEXAN polycarbonate samples were compression-molded under similar conditions and used for comparison. When pressed thin, substantially colorless, transparent and flexible yet stiff films were obtained. Pristine thin films/sheets were used for gas permeability measurements. Thicker samples, like those used for tensile strength measurements, exhibited an opaque tan color.

In particular, polysulfate fibers and powder were extruded through a melt flow indexer at 200° C. The thin extrudate was cooled to RT and pelletized by hand with scissors. Polysulfate pellets were compression molded into thin films and other sample molds using a Carver press set at 230° C. for 20 minutes total (10 minutes with no pressure, followed by 10 minutes at 25,000 psi). Samples were removed from the press and quenched in water. Tensile dog bones were punched from polysulfate plaques using a sharpened steel "cookie cutter" mold in the Carver press at room temperature. BPA-polycarbonate (LEXAN) of unspecified grade was prepared under the same conditions for comparison.

Figure 9:
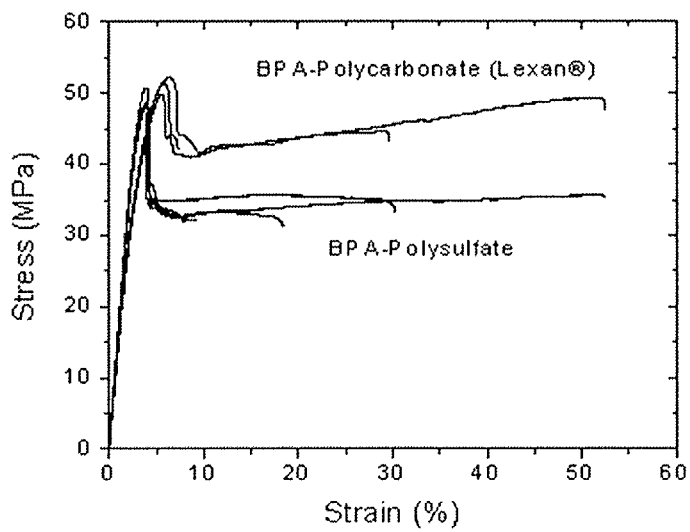
FIG. 9 provides tensile stress-strain curves for compression molded poly(bisphenol A sulfate) in comparison to commercial LEXAN polycarbonate that was compression molded in a similar manner.

Tensile properties, oxygen permeability, and density were evaluated. The engineering stress-strain behavior of both polysulfate and polycarbonate polymers are depicted in FIG. 9. The tensile properties were measured with an MTS INSIGHT 10 electromechanical test frame equipped with a 2.5 kN load cell. Tests were conducted at ambient temperature in triplicate at a strain rate of 10%/min. The density was determined using the Archimedes method at room temperature with an analytical balance. Mass was averaged over 4 measurements and recorded to 4 decimal places. Density was calculated to 3 decimal places as 1.310 g/cc. The oxygen permeability of the polymer was determined on a MOCON OX-TRAN 2/21 instrument using a continuous-flow testing cell method approved by the ASTM (D3985). Measurements were made on two separate BPA-polysulfate film samples both at 23° C. and 0% relative humidity (RH). Further details on this method care described by (a) Sekelik et al., *Journal of Polymer Science Part B: Polymer Physics* 1999; 37:847-857; and (b) Kwisnek et al., *Macromolecules* 2009, 42:7031-7041.

Similar to polycarbonate, the polysulfate exhibited yielding followed by neck formation, stabilization and propagation. Preliminarily, it appears that polysulfate has a higher modulus and slightly lower yield stress compared with the polycarbonate, at least under the specific conditions used. Strain at break for the polysulfate reached over 50%, but was limited by sample defects. True elongation may be significantly higher. Yielding and necking were generally atypical for thermoplastic amorphous polymers at ambient conditions. Polycarbonate and polysulfone are the commonly used examples. This observation implies that polysulfate exhibited a ductile-to-brittle transition at the stress beyond its yield stress, a clear indication that this polymer is ductile yet also quite rigid. Larger modulus could be related to less free volume present in polysulfate at ambient temperatures.

Gas permeability measurements (Table 3) aided in determination of the free volume. Oxygen permeability for polysulfate surprisingly was found to be approximately 5 times lower than for polycarbonate, which make the polysulfates useful in, e.g., packaging applications for oxygen sensitive materials. Decreased oxygen permeability may be due to a lower free volume. At ambient temperature the polysulfate has less excess hole free volume, stemming from a lower $T_g$. BPA-polysulfate exhibited a density of about 1.310 grams per cubic centimeter (g/cc) or roughly 9% more dense than polycarbonate. Heavy sulfur atoms in the repeat unit create a fairly dense material as is common for sulfur-containing polymers and networks. Practically speaking, polysulfate offers other potential advantages over polycarbonate. The lower $T_g$ of polysulfate may ease processing. Also, the basic stability of polysulfate is a marked improvement over polycarbonate which is known to hydrolyze.

TABLE 3

Observed properties of BPA-polysulfate and BPA-polycarbonate (LEXAN) for comparison.

| Polymer | Density (g/cc) | Oxygen Permeability at 23° C., 0% RH ($cm^3 m^{-2}$ $day^{-1}$ $atm^{-1}$) | Tensile Modulus (GPa) | Yield Stress (MPa) |
|---|---|---|---|---|
| Polysulfate | 1.310 | 1.6 | 1.95 | 50 |
| Polycarbonate | 1.210 | 9.0 | 1.66 | 51 |

Example 6. Preparation of Poly(Bisphenol A Carbonate)

Figure 10:
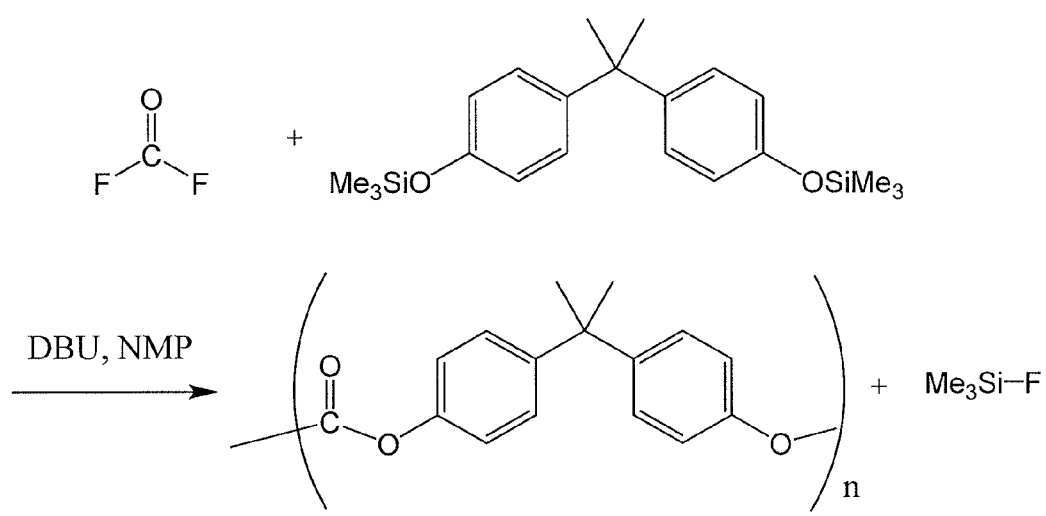
FIG. 10 schematically illustrates a preparation of poly (bisphenol A carbonate) by the polymerization methods described herein.

FIG. 10 provides a schematic illustration of the preparation of a bisphenol A polycarbonate polymer by the methods described herein. Fluorophosgene ($COF_2$) was generated from bis-trichloromethyl carbonate ("triphosgene") with potassium fluoride and 1.5 percent 18-crown-6 in acetonitrile according to the method described by Olofson, *Tetrahedron Letters*, 2002; 34:4275-4279. In particular, a solution of 18-crown-6 (200 mg) in acetonitrile (5 mL) was added dropwise into a stirring mixture of triphosgene (2 g, 6.8 mmol) and spray-dried KF (3.23 g, 55 mmol) in acetonitrile (30 mL) in a flask cooled by an ice-water bath. The flask was fitted with a dry ice/acetone cold finger condenser, and the generated $COF_2$ gas was passed into a reaction vessel containing a 1 M solution of bis-trimethylsilyl-bisphenol A (about 1 gram total) in NMP. About 0.1 mL of DBU was introduced into the NMP solution by syringe. The solution immediately turned deep purple upon addition of the DBU. The resulting mixture was stirred at ambient room temperature (about 20 to 22° C.) for about 12 hours. The reaction mixture formed a sticky gel, which was diluted in methanol to form grey, fibrous poly(bisphenol A carbonate) in approximately quantitative yield (about 690 mg). The polycarbonate was analyzed by GPC relative to polystyrene standards, which indicated a $M_w$ of about 159860, and a $M_n$ of about 70539 (PDI of about 2.27).

Example 7. Additional Polymerization Examples

Various difunctional phenols underwent end-group transformation and polymerization following a reaction scheme similar to the one shown in FIG. 2. Trifluoromethylated BPA monomers were used to form homopolymers and copolymers of good quality and high molecular weight.

The compatibility of the polymerization reaction with different functional groups was examined. Monomers 4-13 were prepared according to procedures similar to those illustrated in FIG. 2 and included Bisphenol AF (4a/b), naphthalene (5a/b), ether (6a/c), ester (9a/c and 12c), sulfide (8a/c), ketone (9a/c), amide (10a/c and 13c), and bisphenol S (sulfone, 11a/c) derivatives. The polymerization reaction was conducted at room temperature in 1M NMP with 20 mol % of DBU for 24 hrs. As Table 4 illustrates, a variety of homopolymers and BPA copolymers were obtained, demonstrating compatibility of the reaction with different functional groups. The observed molecular weights, as referenced to polystyrene standards, were in the same general range, which does not allow for conclusions to be drawn about relative reactivity of different monomer families. Among BPA-copolymers of similar structure, molecular weight decreased when para electron donating (cf. Entry 5 vs. 6, 11 vs. 12 in Table 4) or withdrawing (cf. Entry 8 vs. 9, 14 vs. 15) groups were present in the silyl ether monomer. The selectivity of the reaction is demonstrated by the successful formation of co-polysulfates containing technologically useful blocks found in other engineering polymers. Polymers were also obtained from bis-sulfonyl fluorides (Entry 23). The sulfonyl fluoride monomer 14 was directly obtained from 4,4'-biphenyl bis-sulfonyl chloride via a facile transformation using saturated aqueous $KHF_2$ solution in acetonitrile at room temperature.

TABLE 4

| Entry | Structure | Monomers | | $M_n^{PS}$ | PDI |
|---|---|---|---|---|---|
| 1 | Bis(4-R-phenyl)hexafluoropropane (F₃C, CF₃ gem-diaryl) | R = OSO₂F (4a) | 4a + 4b | 46,100 | 1.5 |
| 2 | | =OTMS (4b) | 4a + 2b | 36,000 | 1.4 |
| 3 | 2,6-bis(R)naphthalene | R = OSO₂F (5a) =OTMS (5b) | 5a + 5b | 52,000[b] | 1.6 |
| 4 | Bis(4-R-phenyl) ether | R = OSO₂F (6a) | 6a + 6c | 58,700 | 1.4 |
| 5 | | =OTBS (6c) | 6a + 2c | 67,100 | 1.4 |
| 6 | | | 2a + 6c | 46,600 | 1.4 |
| 7 | 4-R-phenyl 4-R-benzoate | R = OSO₂F (7a) | 7a + 6c | 34,700 | 1.5 |
| 8 | | =OTBS (7c) | 7a + 2c | 37,200 | 1.5 |
| 9 | | | 2a + 7c | 30,600 | 1.5 |
| 10 | Bis(4-R-phenyl) sulfide | R = OSO₂F (8a) | 8a + 6c | 80,100 | 1.4 |
| 11 | | =OTBS (8c) | 8a + 2c | 52,500 | 1.5 |
| 12 | | | 2a + 8c | 36,900 | 1.4 |
| 13 | Bis(4-R-phenyl) ketone | R = OSO₂F (9a) | 9a + 6c | 34,100[c] | 1.6 |
| 14 | | =OTBS (9c) | 9a + 2c | 41,100 | 1.6 |
| 15 | | | 2a + 9c | 21,800[d] | 1.4 |
| 16 | 4-R-phenyl 4-R-benzamide | R = OSO₂F (10a) | 10a + 6c | 81,100 | 1.4 |
| 17 | | =OTBS (10c) | 10a + 2b | 48,700 | 1.3 |
| 18 | | | 2a + 10c | 75,400 | 1.4 |
| 19 | Bis(4-R-phenyl) sulfone | R = OSO₂F (11a) | 11a + 11c | 22,100[d] | 1.3 |
| 20 | | =OTBS (11c) | 11a + 2c | 24,800 | 1.3 |
| 21 | 3,3-bis(4-R-phenyl)phthalide | R = OTBS (12c) | 2a + 12c | 53,000 | 1.5 |
| 22 | N-propyl 3,5-bis(R)benzamide | R = OTBS (13c) | 2a + 13c | 43,900 | 1.4 |

TABLE 4-continued

| Entry | Structure | Monomers | $M_n^{PS}$ | PDI |
|---|---|---|---|---|
| 23 | R—⟨⟩—⟨⟩—R | R = SO$_2$F (14)   14 + 2c | 46,500 | 1.3 |

Notes for Table 4:
[a]polymerization at 80° C.;
[b]increasing temperature to 100° C. afforded a GPC $M_n$ of 46,100 and a PDI of 1.5;
[c]oligomeric product;
[d]increasing the temperature to 100° C. afforded a GPC $M_n$ of 43,200 and a PDI of 1.4.

Figure 11:
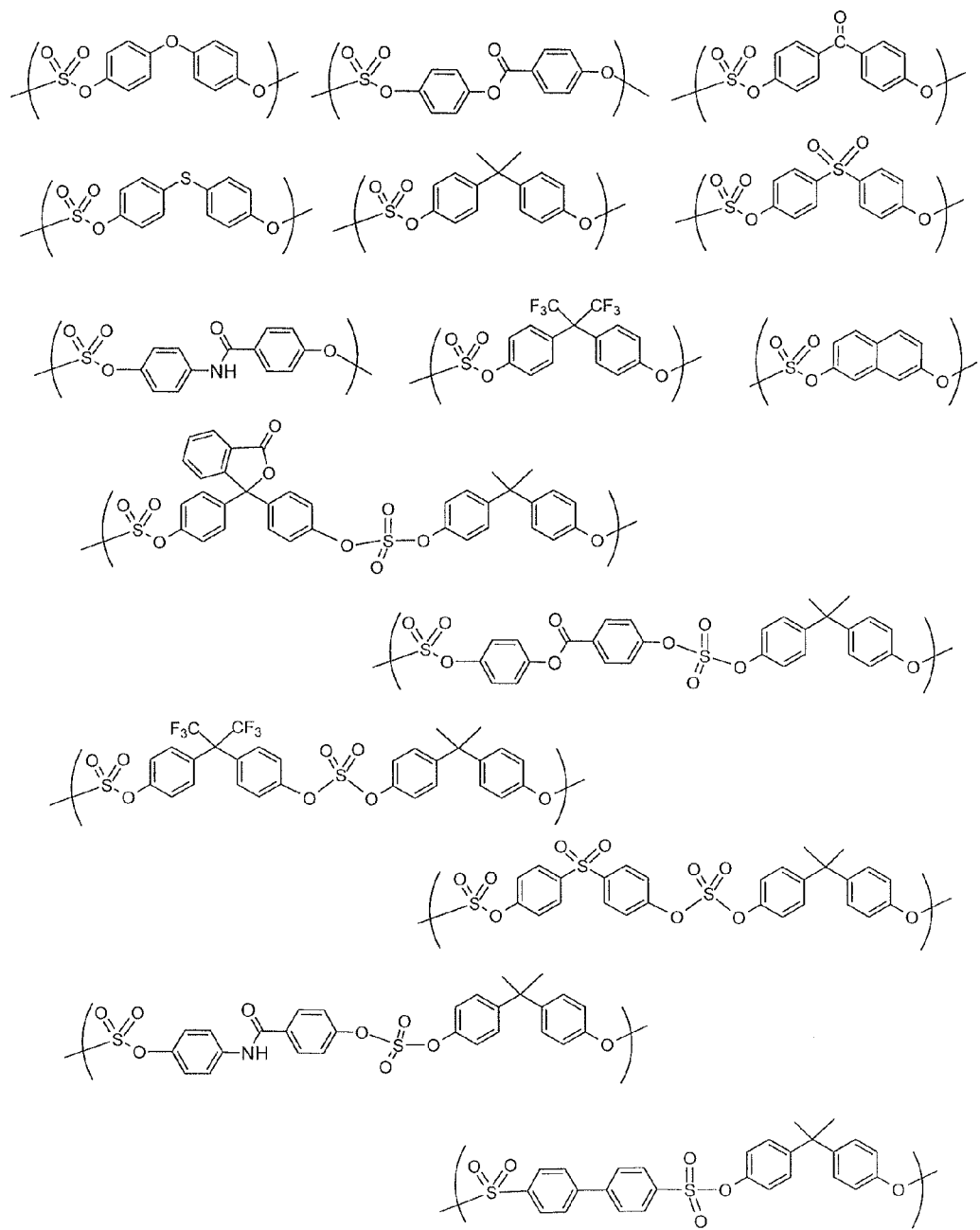
FIG. 11 illustrates chemical structural formulas for selected sulfonate and sulfate polymers synthesized from different monomer combinations, which demonstrate the broad scope of the polymerization methods described herein.

FIG. 11 provides a representative sampling of sulfonyl and sulfate polymer structures prepared by the methods described herein. In addition to providing a practical route to polymers with useful properties and diverse structural elements, the exceptionally facile synthesis of poly(organosulfates) described here highlights the underappreciated potential of the sulfate connector in organic and materials chemistry as well as unique reactivity features of sulfur(VI) oxofluorides. This new click reaction should find immediate applications across different disciplines.

Example 8. Effects of Monomer Stoichiometry

The excess of both silyl ether-functional and fluorosulfate-functional BPA monomers was varied from 0.0, or no mismatch, gradually up to 1.0, or a 100% stoichiometric imbalance in order to probe the effect of mismatches in stoichiometry when either the bis-silyl ether or the bis-fluorosulfate 2a were in excess. These results are summarized in Table 5. Excess silyl ether, in this case the bis-OTBS BPA monomer 2c, resulted in decreases in both $M_n$ and PDI, based on GPC. This decrease in $M_n$ was expected due to conventional step-growth rules. Yields over 90% were obtained in almost each case, indicative of complete consumption of the limiting monomer. At 1.0 molar excess, the yield was noticeably lower due to the loss of lower oligomers during precipitation. In the case of excess fluorosulfate monomer, a completely different effect was observed. For a 0.05 molar excess of bis-fluorosulfate, the $M_n$ was on par or better than the non-mismatched control system. The $M_n$ then proceeded to decrease from this maximum as further excess of the bis-fluorosulfate was used. In each case, however, the $M_n$ was higher than for the same molar equivalent excess of bis-silyl ether. Yields also curiously increased, reaching over 100% for polymerizations with the largest excess of bis-fluorosulfate. Thus it is evident for this polymerization that while "A-A" (bis-fluorosulfate) primarily reacts with "B-B" (bis-silyl ether), A-A also can react with A-A. Not only is this result a striking exception to traditional step-growth polymerization rules, the polymers obtained also appear to be fluorosulfate functional on both ends of linear polymer chains. In the case of traditional step-growth engineering polymers, the end groups often are statistical mixtures of A or B functionality. These groups are then either end-capped with monofunctional reagents, or are simply degraded or too weakly reactive to be useful. Ensuring stable, click-ready functional groups on the ends of a step-growth polymer without any extra manipulation or tedious transformations is one important goal for engineering polymers.

TABLE 5

BPA-polysulfate Tolerance to Stoichiometric Imbalance.

| | | 2c (TBS) excess | | | 2a (OSO$_2$F) excess | | |
|---|---|---|---|---|---|---|---|
| Entry | Equiv. | yield | $M_n$ | PDI | yield | $M_n$ | PDI |
| 1 | 0.00 | 94% | 65,500 | 1.8 | | | |
| 2 | 0.05 | 91% | 38,800 | 1.6 | 90% | 71,300 | 1.6 |
| 3 | 0.10 | 94% | 31,100 | 1.5 | 91% | 40,300 | 1.5 |
| 4 | 0.25 | 99% | 18,400 | 1.5 | 102% | 22,500 | 1.4 |
| 5 | 0.50 | 93% | 13,400 | 1.4 | 110% | 16,200 | 1.3 |
| 6 | 1.00 | 61% | 9,300 | 1.2 | 120% | 12,300 | 1.2 |

Example 9. Polymer End Group Modification

Figure 12:
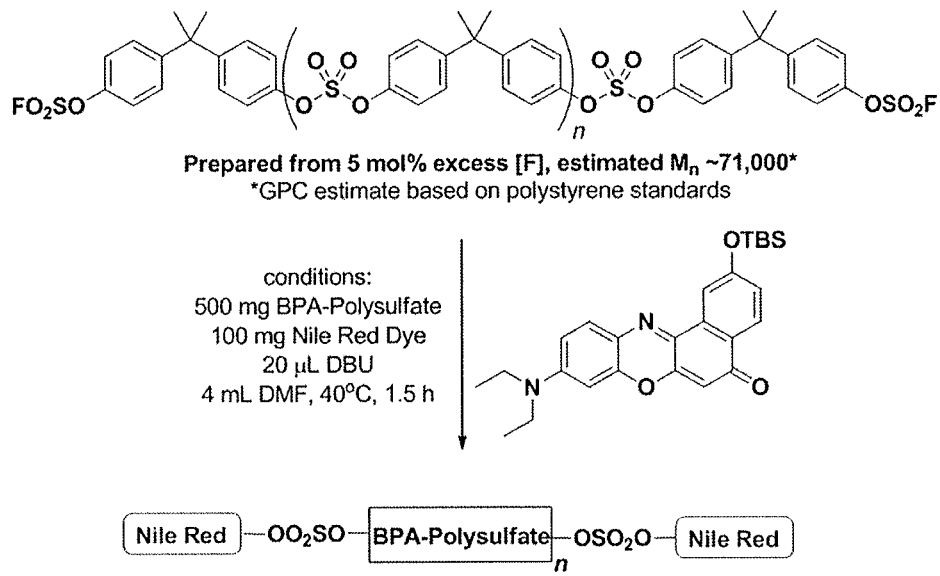
FIG. 12 illustrates modification of the fluorosulfate end groups of a poly(bisphenol A sulfate) prepared by the polymerization method described herein to attach a dye (Nile Red) to the ends of the polymer chains.
Figure 13:
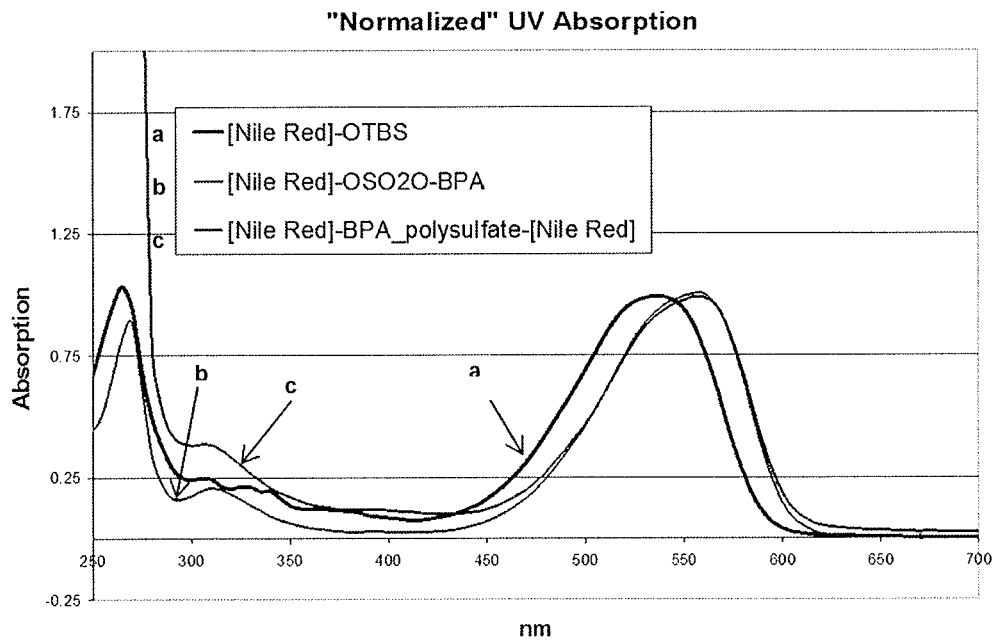
FIG. 13 provides UV/Visual spectra of the Nile Red dye end-capped poly(bisphenol A sulfate) illustrated in FIG. 12.
Figure 14:
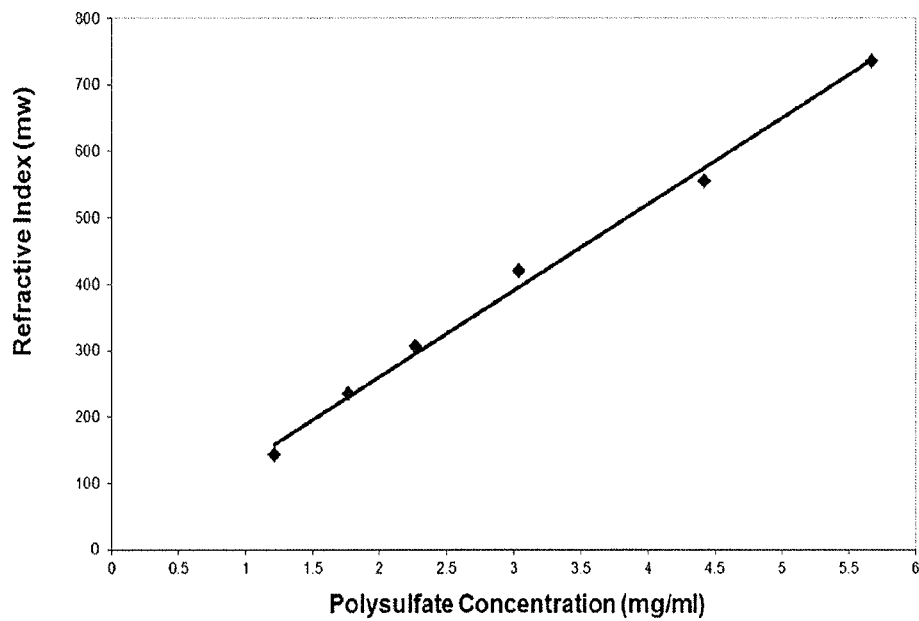
FIG. 14 provides graphs of refractive index versus concentration for determining the dn/dc of poly(bisphenol A sulfate); Panel (a) provides data for Run #1, and Panel (b) provides data for Run #2 as described in Example 11 herein.
Figure 14:
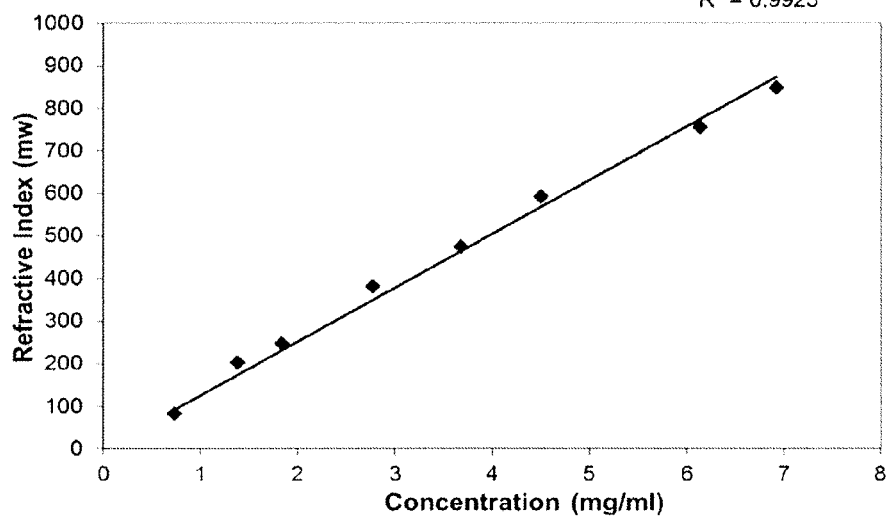

About 200 mg of poly(bisphenol A sulfate) having a GPC $M_n$ of about 71,000 g/mol prepared in Example 8 (Entry 2 from Table 5) was dissolved in about 4 mL of DMF along with about 100 mg of TBS-protected Nile Red dye and about 20 microliters of DBU as shown in FIG. 12. The mixture was stirred at about 40° C. for about 1.5 hours to afford polymer comprising Nile Red dyes attached at the polymer end groups. The dyed polymer was precipitated by dilution with about 20 mL of methanol. The resulting precipitated polymer had a characteristic magenta color due to the Nile Red end groups. Covalent attachment of the dye to the polymer was verified by re-dissolving a sample of the dyed polymer in DMF and performing a GPC separation using UV-Vis detection at multiple wavelengths from 200 to 800 nm. The GPC traces showed that the trace at 567 nm detector wavelength exhibited a peak at the same elution time as when the polymer backbone wavelength (203 nm) was used. Dye attachment to the polymer also was verified by comparison of the UV-visible spectrum of the silylated Nile Red dye with the dyed polymer and a monomeric material comprising a single Nile Red molecule attached via a sulfate linkage to a single bisphenol A compound (see FIG. 13). The polymer and the bisphenol A-Nile Red conjugated compound had virtually identical UV/Vis spectra, whereas the spectrum of silylated Nile Red was shifted hypsochromically relative to the dyed polymer and dyed monomer materials (see FIG. 14). Thus, the ability to covalently attach the dye to the polymer confirms the presence of fluorosulfate end groups on the polymer.

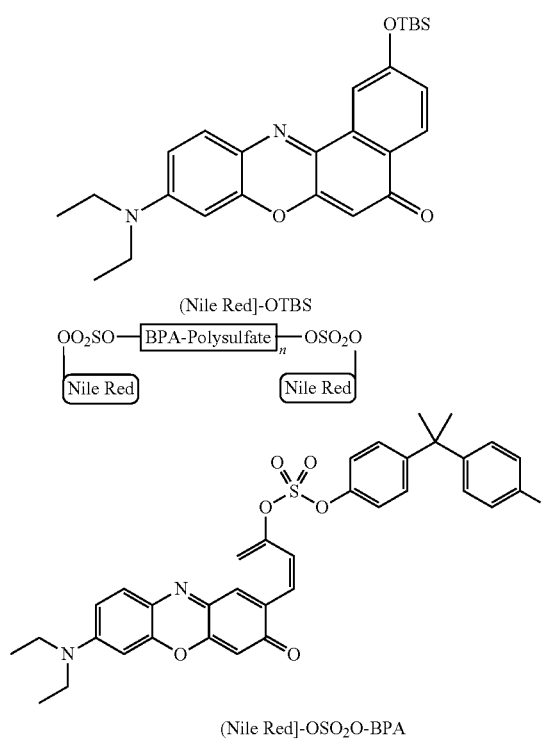

(Nile Red]-OTBS

OO₂SO—[BPA-Polysulfate]ₙ—OSO₂O

[Nile Red]　　　　　　[Nile Red]

(Nile Red]-OSO₂O-BPA

Example 10. Fluorine NMR End Group Analysis $^{19}$F NMR end group analysis was utilized to obtain an independent approximation of the degree of polymerization (DP) and thus $M_n$, for poly(bisphenol AF sulfate).

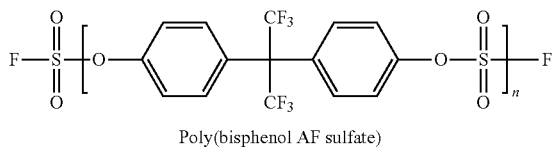

Poly(bisphenol AF sulfate)

These polymer samples were prepared in NMP as solvent and then dissolved in d7-DMF for NMR analysis. Experiments with monomer mixtures verified that the sensitivity for quantifying the end group signal for OSO₂F relative to the polymer chain CF₃ signal was at least about 1:600 (by peak integration), which corresponds to a DP (n) of about 200 assuming all of the polymer is linear and includes two OSO₂F end groups. Reactions were performed at about 1M concentration in NMP with bis(t-butyldimethylsilyl)bisphenol AF and excess bis(fluorosulfonyl)bisphenol AF in the presence of DBU as catalyst at ambient room temperature for about 16 hours. Experiments were run with five different amounts of the bis(fluorosulfonyl)bisphenol AF (5 mol %, 10 mol %, 20 mol %, 50 mol %, and 100 mol % excess). The DP values obtained from these evaluations are upper limits, since the presence of any cyclic polymer/oligomer can skew the results to higher apparent DP. A 5 mol % excess bis(fluorosulfonyl)bisphenol AF afforded a DP of >200 ($M_n$>about 78000 g/mol), i.e., no detectible end group signal; a 10 mol % excess afforded DP of about 90 ($M_n$ of about 35100); a 20 mol % excess afforded DP of about 26 ($M_n$ of about 10140), a 50 mol % excess afforded DP of about 13 ($M_n$ of about 5070), and a 100 mol % excess afforded DP of about 7 ($M_n$ of about 2730). A bulk-prepared sample of the polymer (no solvent) did not exhibit any detectible OSO₂F end group signal, indicating a DP of >200 and/or potentially a large cyclic structure.

Example 11. Detailed Description of Monomer and Polymer Syntheses

Ex. 11A. Materials and Methods $^1$H and $^{13}$C NMR spectra were recorded on AMX-400 (Bruker) and INOVA-400 (Varian) instruments at 295 K unless otherwise noted. Chemical shifts (δ) are expressed in parts per million relative to residual CHCl₃, acetone, or DMSO as internal standards. Proton magnetic resonance ($^1$NMR) spectra were recorded at 400 MHz. Carbon magnetic resonance ($^{13}$C NMR) spectra were recorded at 100 MHz. Abbreviations are: s, singlet; d, doublet; t, triplet; q, quartet; p, pentet; sex, sextet; sept, septet; app, apparent. Infrared spectra were recorded on an AVATAR 370 Fourier transform infrared spectrometer (ThermoNicolet) and are expressed in wavenumbers (cm$^{-1}$). Melting points (mp) were determined using a melting point apparatus (Thomas-Hoover) and are uncorrected. GCMS data were recorded on a 7890A GC system (Agilent) with a 5975C Inert MSD system (Agilent) operating in electron impact (EI+) mode [$T_o$=50° C. for 2.25 minutes; ramp to 300° C. at 60° C./min; hold at 300° C. for 4 minutes]. HPLC analysis was performed on a 1100 LC/MSD (Agilent) with a 1100 SL mass spectrometer (Agilent; electrospray ionization, ES) eluting with 0.1% trifluoroacetic acid in H₂O and 0.05% trifluoroacetic acid in CH₃CN. Precoated F-254 silica gel plates (Merck) were used for thin layer analytical chromatography (TLC) and visualized with short wave UV light or by potassium permanganate stain. Column chromatography was carried out employing EMD (Merck) Silica Gel 60 (40-63 μm). GPC analysis was carried out on a LC20 HPLC system (Shimadzu) equipped with a diode-array and a refractive index detector, and STYRAGEL HR-3 and HR-4 columns (Waters; 5 μm particle size, 7.2 mm diameter) connected in series and placed in a column oven. The system was calibrated with READYCAL polystyrene standards, $M_n$ range 500 g/mol to 600,000 g/mol), eluting with HPLC grade DMF with 0.1% (wt.) of LiBr as a modifier. The accuracy of calibration was verified at regular intervals. A MINIDAWN TREOS detector (Wyatt) was used for multi-angle light scattering (MALS) analysis. Unless otherwise noted, all starting materials and solvents were purchased from Aldrich, Acros Organics, Fisher, TCI, Alfa Aesar or Strem Chemicals and used as received. Dimethylformamide (DMF) and N-methyl-2-pyrrolidone (NMP) were obtained as "99.5% Extra Dry over Molecular Sieves" from Acros Organics. 1,8-Diazabicyclo[5.4.0]undec-7-ene (DBU) was obtained from Alfa Aesar and used as received. 2-tert-Butylimino-2-diethylamino-1,3-dimethylperhydro-1,3,2-diaza-phosphorine (BEMP) was obtained from Sigma Aldrich as a 1M solution in hexanes. Sulfuryl fluoride gas (SO₂F₂, commercially produced under the trade name VIKANE) was a gift from Dow Agro.

Ex. 11B. General Polymerization Procedures (a) Small Scale Bulk Polymerization—(See Table 2).

A-A (2a; 1-5 mmol) and B-B (2b-e; 1-5 mmol) monomers were combined in a 16 mL thick glass-walled, screw capped vessel containing a Teflon-coated magnetic stir bar and sealed with a PTFE/Silicone septum. This reactor was then placed into a 150° C. oil bath with stirring, and once the monomers melted, catalyst was introduced to initiate polymerization. Heating was continued for 2 hours, at which point the solidified mixture was cooled and diluted with about 1-2 mL DMF per 1 g of polymer. Dissolution was assisted by vigorous heating with a heat gun or by re-introduction to the 150° C. oil bath. Once fully dissolved, the DMF solution was poured into about 100 mL of methanol per 1 g of polymer to precipitate white BPA-polysulfate as a either a fiber or powder depending on molecular weight. The obtained polymers were then dried at 65° C. in a vacuum oven and subjected to GPC analysis.

(b) Monomer Structure Tolerance in the Polymerization Reaction—(see Table 4).

Pairs of bis(fluorosulfate) (4-11a and 14; 1-3 mmol) and bis(silyl ether) monomers (TMS 2b, 4b-5b and TBS 2c, 6-13c; 1-3 mmol) were combined in 16 mL thick glass-walled screw-capped vessels equipped with Teflon-coated magnetic stir bars and sealed with a PTFE/Silicone septa. These mixtures were dissolved in 1 mL of NMP per 1 mmol substrate (about 1 M solution with respect to each monomer) and treated with 20 mol % of DBU. Stirring was continued for 24 hour at room temperature. The reaction mixtures were then heated with a heat gun to dissolve any precipitated polymer and the resulting homogenous solution (in some cases additional DMF was necessary to achieve complete dissolution) was added directly to about 100 mL of methanol per 1 g of polymer at ambient temperature to precipitate the polysulfate copolymers.

(c) Molecular Weight Determinations.

GPC was used to determine number average molecular weight ($M_n$), weight average molecular weight ($M_w$), and polydispersity index (PDI). The system was calibrated using narrow molecular weight polystyrene standards. For several samples, multi-angle light scattering was determined using a MINIDAWN TREOS detector (Wyatt). Mobile phase was HPLC grade DMF with 0.1% (wt.) of LiBr modifier. Representative GPC traces and MALS analysis reports are provided for the key polymer samples in Table 6.

TABLE 6

(Letter designations from Table 2)

| Conditions: | | PS Standards $M_n$ (g/mol) | MALS $M_n$ (g/mol) | Dispersity |
|---|---|---|---|---|
| Bulk (TMS, 1% BEMP) | (A) | 17,000 | 2,500 | 1.3 |
| Bulk (TMS, 20% DBU) | (B) | 38,000 | 10,600 | 1.4 |
| Bulk (TBS, 20% DBU) | (C) | 66,000 | 19,600 | 1.4 |
| Bulk (TBS, 1% BEMP) | (D) | 120,000 | 58,000 | 1.7 |

For the MALS analysis, the differential index of refraction (dn/dc) was determined using batch method by plotting the refractive index of the polymer solution versus varying solution concentrations. The mobile phased used to dissolve BPA-polysulfate ("sample D", Mn=120,000 Da based on polystyrene standards) for dn/dc determination and subsequent MALS analysis was HPLC grade DMF with 0.1% LiBr (wt.). The dn/dc was obtained in duplicate. In Run #1, the dn/dc was determined to be 0.13009. In Run #2 the dn/dc was determined to be 0.12623 (see Table 7 and FIG. 14, Panels (a)-Run #1, and Panel (b)-Run #2.

TABLE 7

| | Run #1 | | Run #2 | |
|---|---|---|---|---|
| Entry | Polysulfate Conc. (mg/mL) | Refractive Index (mv) | Polysulfate Conc. (mg/mL) | Refractive Index (mv) |
| 1 | 1.22 | 144 | 0.74 | 84 |
| 2 | 1.77 | 236 | 1.38 | 203 |
| 3 | 2.27 | 306 | 1.84 | 248 |
| 4 | 3.04 | 420 | 2.77 | 381 |
| 5 | 4.42 | 556 | 3.68 | 475 |
| 6 | 5.67 | 736 | 4.50 | 593 |
| 7 | | | 6.14 | 755 |
| 8 | | | 6.92 | 848 |

Ex. 11C. Monomer Preparations

An illustrative general procedure for the preparation of the bis-fluorosulfate "AA" monomers used in Table 4 is provided below (i.e., the preparation of Compound 2a).

4,4'-(Propane-2,2-diyl)bis(4,1-phenylene) disulfofluoridate (2a). Bisphenol A (1; 20 g, 0.088 mol) and triethylamine (30 mL, 21.8 g, 0.216 mol) were dissolved in $CH_2Cl_2$ (200 mL) in a 500 mL round bottom flask equipped with a stirring bar. The headspace of the reaction vessel was evacuated and filled with sulfuryl fluoride gas introduced via a needle attached to a balloon. The reaction was stirred at room temperature for 12 hours, at which time GC-MS analysis indicated complete conversion. The reaction mixture was then concentrated in vacuo, re-dissolved in 300 mL of EtOAc and washed sequentially with 300 mL of 0.6M HCl (1×), 200 mL sat. $NaHCO_3$ (1×), 200 mL sat. NaCl (1×), and dried over $Na_2SO_4$. Removal of the volatiles produced 2a as a yellow oil that crystallized as a white solid that was subsequently dried under vacuum (33.3 g, 84.9 mmol, 98%): mp 49-52° C.; IR (neat) $\lambda_{max}$ 1499, 1441, 1409, 1368, 1229, 1186, 1137, 1083, 1015, 949, 911, 840, 812, 793, 772, 599, 564, 538, 502, 472 $cm^{-1}$; $^1H$ NMR (400 MHz, $CDCl_3$) δ 7.32-7.25 (m, 8H), 1.71 (s, 6H); $^{13}C$ NMR (100 MHz, $CDCl_3$) δ 150.6, 148.4, 128.9, 120.7, 43.1, 30.9; $^{19}F$ NMR (376 MHz, $CDCl_3$) δ 37.2; GC-MS (EI) m/z=392.1 $[M]^+$.

An illustrative general procedure for the preparation of the bis-silyl "BB" monomers used in Table 4 is presented below (i.e., the preparation of Compound 2c). Note that HCl wash used Compound 2c is replaced with an additional $NaHCO_3$ wash for the preparation of trimethylsilyl monomers).

(4,4'-(Propane-2,2-diyl)bis(4,1-phenylene))bis(oxy)bis(tert-butyldimethylsilane) (2c)

Bisphenol A (1; 50 g, 0.219 mol), imidazole (45 g, 0.662 mol) and 4-dimethylaminopyridine (1.3 g, 0.11 mol) were dissolved in a mixture of 500 mL of $CH_2Cl_2$ and 40 mL of dimethylformamide in a 3 L round bottom flask equipped with a stirring bar. tert-Butyldimethylsilyl chloride (69 g, 0.46 mol) was added portion-wise to the reaction, which quickly resulted in the generation of a white precipitate. The reaction mixture was stirred for 3 h, filtered to remove all solids (imidazole-HCl) and concentrated in vacuo. The resulting oil was dissolved in 750 mL of EtOAc and sequentially washed with 700 mL of 1M HCl (1×), 400 mL sat. $NaHCO_3$ (1×), 500 mL sat. NaCl (1×) and then dried over $Na_2SO_4$.). Removal of the volatiles gave 2c as a colorless oil that crystallized as a colorless solid and was subsequently dried under vacuum (96.3 g, 0.211 mmol, 96%): mp 84-87° C.; IR (neat) $\lambda_{max}$ 2953, 1501, 1441, 1230, 1184, 1137, 1015, 911, 828, 810, 773, 592, 563, 539 cm$^{-1}$; $^1$H NMR (400 MHz, CDCl$_3$) δ 7.07 (d, J=8.8 Hz, 4H), 6.72 (d, J=8.8 Hz, 4H), 1.62 (s, 6H), 0.98 (s, 18H), 0.19 (s, 12H); $^{13}$C NMR (100 MHz, CDCl$_3$) δ 153.4, 143.8, 127.8, 119.3, 41.9, 31.2, 25.8, 18.3, −4.3; GC-MS (EI) m/z=456.4 [M]$^+$.

(4,4'-(Propane-2,2-diyl)bis(4,1-phenylene))bis(oxy)bis (trimethylsilane) (2b) was purchased from Gelest, Inc. and used as received.

(4,4'-(Propane-2,2-diyl)bis(4,1-phenylene))bis(oxy)bis (tert-butyldiphenylsilane) (2d) was prepared from (4,4'-(propane-2,2-diyl)bis(4,1-phenylene))bis(oxy)bis(trimethylsilane) following the general procedure for the preparation of bis-silyl "BB" monomers, with substitution of tert-butyldimethylsilyl chloride with tert-butyldiphenylsilyl chloride. Purification via flash chromatography (SiO$_2$, 0→5% EtOAc-hexanes; R$_f$=0.5 at 10% EtOAc-hexanes) yielded 2d as a white crystalline solid (about 27.8 g, 39.4 mmol, 90%): mp 94-98° C.; IR (neat) λ$_{max}$ 1501, 1442, 1230, 1164, 1138, 913, 822, 797, 773, 742, 700, 594, 563, 541, 502 cm$^{-1}$; $^1$H NMR (400 MHz, CDCl$_3$) δ 7.86 (dd, J=1.6, 8.0 Hz, 8H), 7.57-7.38 (m, 12H), 7.01 (d, J=8.9 Hz, 4H), 6.79 (d, J=8.8 Hz, 4H), 1.63 (s, 6H), 1.25 (s, 18H); $^{13}$C NMR (100 MHz, CDCl$_3$) δ 153.4, 143.6, 135.7, 133.3, 129.9, 127.8, 127.6, 119.0, 41.7, 31.1, 26.7, 19.6;

(4,4'-(Propane-2,2-diyl)bis(4,1-phenylene))bis(oxy)bis (triisopropylsilane) (2e) was prepared from (4,4'-(propane-2,2-diyl)bis(4,1-phenylene))bis(oxy) bis(trimethylsilane) following the general procedure for the preparation of bis-silyl "BB" monomers, with substitution of tert-butyldimethylsilyl chloride with triisopropylsilyl chloride. 2e was isolated as a colorless, viscous oil (23.1 g, 42.5 mmol, 97%): IR (neat) λ$_{max}$ 2943, 2864, 1604, 1504, 1462, 1257, 1176, 1106, 1012, 912, 882, 833, 743, 680, 609, 559, 482 cm$^{-1}$; $^1$H NMR (400 MHz, CDCl$_3$) δ 7.07 (d, J=8.7 Hz, 4H), 6.79 (d, J=8.7 Hz, 4H), 1.64 (s, 6H), 1.36-1.18 (m, 6H), 1.13 (d, J=7.2 Hz, 36H); $^{13}$C NMR (100 MHz, CDCl$_3$) δ 153.8, 143.7, 127.8, 119.3, 41.9, 31.3, 18.1, 12.8; LRMS (EI) m/z=497.4 [M−CH(CH$_3$)$_2$]$^+$.

Bisphenol AF (2,2-bis(4-hydroxyphenol)hexafluoropropane) was obtained from Oakwood Chemicals and used as received.

4,4'-(Perfluoropropane-2,2-diyl)bis(4,1-phenylene) disulfofluoridate (4a) was prepared from Bisphenol AF following the general procedure for the preparation of bis-fluorosulfate "AA" monomers. 4a was isolated as white crystalline solid: mp 128-130° C.; IR (neat) λ$_{max}$ 1506, 1450, 1261, 1240, 1208, 1163, 1144, 1019, 968, 911, 840, 805, 768, 737, 697, 645, 575, 536 cm$^{-1}$; $^1$H NMR (400 MHz, CDCl$_3$) δ 7.53 (app d, J=9.0 Hz, 4H), 7.42 (dd, J=0.6, 9.2 Hz, 4H); $^{13}$C NMR (100 MHz, CDCl$_3$) δ 150.4, 133.6, 132.6, 123.7 (q, J=E287.5 Hz), 121.3, 64.2 (app t, J=25.8 Hz); $^{19}$F NMR (376 MHz, CDCl$_3$) δ 38.2, −64.1; LRMS (EI) m/z=500.0 [M]$^+$.

(4,4'-(Perfluoropropane-2,2-diyl)bis(4,1-phenylene))bis (oxy)bis(trimethylsilane) (4b) was prepared from Bisphenol AF following the general procedure for the preparation of bis-silyl "BB" monomers, with substitution of tert-butyldimethylsilyl chloride with trimethylsilyl chloride and omitting the HCl wash. 4b was isolated as a beige solid: mp 46-50° C.; IR (neat) λ$_{max}$ 2959, 1611, 1513, 1450, 1242, 1204, 1168, 1135, 967, 912, 828, 753, 737, 700, 545, 505 cm$^{-1}$; $^1$H NMR (400 MHz, CDCl$_3$) δ 7.25 (d, J=9.2 Hz, 4H), 6.81 (d, J=9.1 Hz, 4H), 0.29 (s, 4H); $^{13}$C NMR (100 MHz, CDCl$_3$) δ 155.9, 131.7, 126.4, 124.6 (q, J=287.8 Hz), 119.6, 63.9 (t, J=25.5 Hz), −0.32; $^{19}$F NMR (376 MHz, CDCl$_3$) δ −64.4; LRMS (EI) m/z=480.2 [M]$^+$.

(4,4'-(Perfluoropropane-2,2-diyl)bis(4,1-phenylene))bis (oxy)bis(tert-butyldimethylsilane) 4c was prepared from Bisphenol AF following the general procedure for the preparation of bis-silyl "BB" monomers. 4c was isolated as a white crystalline solid: mp 167-170° C.; IR (neat) λ$_{max}$ 2952, 2932, 2859, 1611, 1513, 1468, 1275, 1244, 1202, 1168, 1134, 968, 911, 830, 804, 777, 727, 701, 667, 556 cm$^{-1}$; $^1$H NMR (400 MHz, CDCl$_3$) δ 7.24 (d, J=8.7, 4H), 6.80 (d, J=9.0 Hz, 4H), 0.99 (s, 18H), 0.23 (s, 12H); $^{13}$C NMR (100 MHz, CDCl$_3$) δ 156.2, 131.7, 126.3, 124.6 (app d, J=285.1 Hz), 119.6, 63.8 (t, J=25.2 Hz), 25.8, 18.3, −4.3; $^{19}$F NMR (376 MHz, CDCl$_3$) δ −64.4; LRMS (EI) m/z=451.0 [M−Si(Me)$_2$t-Bu]$^+$.

Naphthalene-2,7-diol was purchased from Acros Organics and used as received.

Naphthalene-2,7-diyl disulfofluoridate 5a was prepared from naphthalene-2,7-diol following the general procedure for the preparation of bis-fluorosulfate "AA" monomers. 5a was isolated as white powder (12.3 g, 38 mmol, 87%): mp 122-124° C.; IR (neat) λ$_{max}$ 1439, 1365, 1219, 1187, 1137, 1115, 960, 922, 896, 839, 801, 637, 582, 530, 470 cm$^{-1}$; $^1$H NMR (400 MHz, DMSO-d$_6$) δ 8.36 (d, J=2.2 Hz, 2H), 8.28 (d, J=9.1 Hz, 2H), 7.82 (dd, J=2.4, 9.1 Hz, 2H); $^{13}$C NMR (100 MHz, DMSO-d$_6$) δ 148.3, 133.3, 131.6, 120.9, 119.5; $^{19}$F NMR (376 MHz, DMSO-d$_6$) δ 38.1; LRMS (EI) m/z=324.0 [M]$^+$.

2,7-Bis(trimethylsilyloxy)naphthalene 5b was prepared from naphthalene-2,7-diol following the general procedure for the preparation of bis-silyl "BB" monomers, with substitution of tert-butyldimethylsilyl chloride with trimethylsilyl chloride. 5b was isolated as a yellow oil (13.1 g, 43.5 mmol, 99%): IR (neat) λ$_{max}$ 2958, 2856, 1630, 1604, 1507, 1460, 1427, 1365, 1250, 1211, 1151, 1110, 909, 833, 743, 697, 612, 489 cm$^{-1}$; $^1$H NMR (400 MHz, CDCl$_3$) δ 7.69 (d, J=8.9 Hz, 2H), 7.12 (d, J=2.3 Hz, 2H), 6.99 (dd, J=2.3, 8.8 Hz, 2H), 0.37 (s, 18H); $^{13}$C NMR (100 MHz, CDCl$_3$) δ 153.6, 136.2, 129.3, 125.4, 120.0, 114.0, −0.42; LRMS (EI) m/z=304.1 [M]$^+$.

4,4'-Oxydiphenol was purchased from AK Scientific and used as received.

4,4'-Oxybis(4,1-phenylene) disulfofluoridate 6a was prepared from 4,4'-oxydiphenol following the general procedure for the preparation of bis-fluorosulfate "AA" monomers. 6a was isolated as white crystalline solid (8.2 g, 22.5 mmol, 75%): mp 53-55° C.; IR (neat) λ$_{max}$ 1499, 1443, 1230, 1162, 1132, 1100, 909, 839, 818, 768, 754, 602, 540, 501 cm$^{-1}$; $^1$H NMR (400 MHz, CDCl$_3$) δ 7.36 (dtd, J=0.9, 3.7, 10.6 Hz, 4H), 7.11 (dt, J=3.7, 9.3 Hz, 4H); $^{13}$C NMR (100 MHz, CDCl$_3$) δ 156.4, 145.8, 122.9, 120.6; $^{19}$F NMR (376 MHz, CDCl$_3$) δ 36.9; LRMS (EI) m/z=366.0 [M]$^+$.

(4,4'-Oxybis(4,1-phenylene)bis(oxy))bis(tert-butyldimethylsilane) (6c) was prepared from 4,4'-oxydiphenol following the general procedure for the preparation of bis-silyl "BB" monomers. 6c was isolated as a clear, colorless, viscous oil (11.9 g, 27.8 mmol, 93%): IR (neat) λ$_{max}$ 2930, 2857, 1491, 1451, 1251, 1213, 1144, 1096, 908, 871, 835, 778, 691, 504 cm$^{-1}$; $^1$H NMR (400 MHz, CDCl$_3$) δ 6.89-6.82 (m, 4H), 6.80-6.77 (m, 4H), 0.99 (s, 18H), 0.19 (s, 12H); $^{13}$C NMR (100 MHz, CDCl$_3$) δ 152.1, 151.3, 120.9, 119.6, 25.8, 18.3, −4.3; LRMS (EI) m/z=430.3 [M]$^+$.

4-Hydroxyphenyl 4-hydroxybenzoate was prepared through the condensation of hydroquinone with 4-hydroxybenzoic acid as described by Goldfinger et al. in WO2009023759 A2.

4-(Fluorosulfonyloxy)phenyl 4-(fluorosulfonyloxy)benzoate (7a) was prepared from 4-hydroxyphenyl 4-hydroxybenzoate following the general procedure for the preparation of bis-fluorosulfate "AA" monomers. Purification via flash chromatography (SiO$_2$, 5→15% EtOAc-hexanes; R$_f$=0.52 at 20% EtOAc-hexanes) yielded 7a as a white powder (1.77 g, 4.5 mmol, 45%): mp 103-105° C.; IR (neat) $\lambda_{max}$ 1740, 1497, 1443, 1260, 1230, 1135, 1068, 1015, 909, 801, 757, 689, 612, 540, 491 cm$^{-1}$; $^1$H NMR (400 MHz, CDCl$_3$) δ 8.34 (d, J=9.0 Hz, 1H), 7.52 (dd, J=0.7, 9.0, 1H), 7.47-7.40 (m, 1H), 7.36 (d, J=9.3 Hz, 1H); $^{13}$C NMR (100 MHz, CDCl$_3$) δ 163.2, 153.6, 150.3, 147.5, 132.9, 129.5, 123.7, 122.5, 121.5; $^{19}$F NMR (376 MHz, CDCl$_3$) δ 38.8, 37.24; LRMS (EI) m/z=393.8 [M]$^+$.

4-(tert-butyldimethylsilyloxy)phenyl 4-(tert-butyldimethylsilyloxy)benzoate (7c) was prepared from 4-hydroxyphenyl 4-hydroxybenzoate following the general procedure for the preparation of bis-silyl "BB" monomers. Purification via flash chromatography (SiO$_2$, 2% EtOAc-hexanes; R$_f$=0.56 at 5% EtOAc-hexanes) yielded 7c as a white powder (2.05 g, 4.4 mmol, 45%): mp 69-73° C.; IR (neat) $\lambda_{max}$ 2956, 2928, 2857, 1737, 1601, 1501, 1442, 1252, 1232, 1187, 1160, 1067, 1010, 904, 822, 782, 692, 540, 501 cm$^{-1}$; $^1$H NMR (400 MHz, CDCl$_3$) δ 8.10 (d, J=8.9 Hz, 2H), 7.06 (d, J=9.0 Hz, 2H), 6.93 (d, J=8.9 Hz, 2H), 6.87 (d, J=9.0 Hz, 2H), 1.01 (s, 9H), 1.00 (s, 9H), 0.26 (s, 6H), 0.22 (s, 6H); $^{13}$C NMR (100 MHz, CDCl$_3$) δ 165.3, 160.7, 153.3, 145.2, 132.3, 122.8, 122.6, 120.7, 120.2, 25.8, 25.8, 18.4, 18.3, −4.2, −4.3; LRMS (EI) m/z=458.2 [M]$^+$.

4,4'-Thiodiphenol was purchased from Alfa Aesar and used as received.

4,4'-Thiobis(4,1-phenylene) disulfofluoride (8a) was prepared from 4,4'-thiodiphenol following the general procedure for the preparation of bis-fluorosulfate "AA" monomers. 8a was isolated as off-white crystalline solid (17.1 g, 44.7 mmol, 98%): mp 54-56° C.; IR (neat) $\lambda_{max}$ 1485, 1442, 1230, 1177, 1139, 1101, 1014, 909, 835, 803, 769, 581, 540, 496 cm$^{-1}$; $^1$H NMR (400 MHz, CDCl$_3$) δ 7.44 (d, J=9.0 Hz, 4H), 7.32 (dd, J=0.9, 9.0 Hz, 4H); $^{13}$C NMR (100 MHz, CDCl$_3$) δ 149.3, 136.2, 133.0, 122.2; $^{19}$F NMR (376 MHz, CDCl$_3$) δ 37.7; LRMS (EI) m/z=382.0 [M]$^+$.

(4,4'-Thiobis(4,1-phenylene)bis(oxy)bis(tert-butyldimethylsilane) (9c) was prepared from 4,4'-thiodiphenol following the general procedure for the preparation of bis-silyl "BB" monomers. 9c was isolated as a clear, colorless, viscous oil (20.3 g, 46 mmol, 99%): IR (neat) $\lambda_{max}$ 2929, 2856, 1586, 1485, 1444, 1254, 1231, 1140, 1072, 1013, 907, 821, 804, 772, 739, 673, 585, 521, 498 cm$^{-1}$; $^1$H NMR (400 MHz, CDCl$_3$) δ 7.20 (d, J=8.7 Hz, 2H), 6.77 (d, J=8.7 Hz, 2H), 0.98 (s, 9H), 0.19 (s, 6H); $^{13}$C NMR (100 MHz, CDCl$_3$) δ 155.2, 132.7, 128.1, 121.0, 25.8, 18.3, −4.3; LRMS (EI) m/z=446.3 [M]$^+$.

Bis(4-hydroxyphenyl)methanone was purchased from AK Scientific and used as received.

4,4'-Carbonylbis(4,1-phenylene) disulfofluoride (9a) was prepared from bis(4-hydroxyphenyl)methanone following the general procedure for the preparation of bis-fluorosulfate "AA" monomers. 9a was isolated as white crystalline solid (11.1 g, 29.3 mmol, 98%): mp 91-94° C.; IR (neat) $\lambda_{max}$ 1672, 1591, 1440, 1409, 1268, 1231, 1138, 1015, 907, 808, 761, 667, 632, 540, 494, 466 cm$^{-1}$; $^1$H NMR (400 MHz, CDCl$_3$) δ 7.97-7.87 (m, 4H), 7.60-7.45 (m, 4H); $^{13}$C NMR (100 MHz, CDCl$_3$) δ 192.8, 152.7, 137.0, 132.3, 121.3; $^{19}$F NMR (376 MHz, CDCl$_3$) δ 38.6; LRMS (EI) m/z=378.0 [M]$^+$.

Bis(4-(tert-butyldimethylsilyloxy)phenyl)methanone (9c) was prepared from bis(4-hydroxyphenyl)methanone following the general procedure for the preparation of bis-silyl "BB" monomers. 9c was isolated as a colorless low melting solid (13.3 g, 30 mmol, 99%): IR (neat) $\lambda_{max}$ 2960, 2930, 2857, 1651, 1596, 1505, 1466, 1254, 1160, 1105, 904, 836, 803, 773, 713, 682, 494 cm$^{-1}$; $^1$H NMR (400 MHz, CDCl$_3$) δ 7.73 (app d, J=8.8 Hz, 4H), 6.90 (app d), J=8.8 Hz, 4H), 1.00 (s, 18H), 0.25 (s, 12H); $^{13}$C NMR (100 MHz, CDCl$_3$) δ 194.9, 159.7, 132.3, 131.4, 119.8, 25.7, 18.4, −4.2; LRMS (EI) m/z=442.3 [M]$^+$.

4-Hydroxy-(4-hydroxyphenyl)benzamide was prepared in four steps from with 4-hydroxybenzoic acid and 4-aminophenol as described by (a) C. H. Rohrig, C. Loch, J.-Y. Guan, G. Siegal, M. Overhand, ChemMedChem 2007, 2, 1054-1070; (b) P. W. Elsinghorst, J. S. Cieslik, K. Mohr, C. Trankle, M. Gatschow, Journal of Medicinal Chemistry 2007, 50, 5685-5695.

4-(Fluorosulfonyloxy)-N-(4-(fluorosulfonyloxy)phenyl)benzamide (10a) was prepared from 4-hydroxy-(4-hydroxyphenyl)benzamide following the general procedure for the preparation of bis-fluorosulfate "AA" monomers. Purification via flash chromatography yielded 10a as a white powder (1.86 g, 4.7 mmol, 50%): mp 160-167° C.; IR (neat) $\lambda_{max}$ 3417, 1677, 1600, 1524, 1503, 1437, 1405, 1309, 1258, 1225, 1176, 1138, 1104, 1018, 910, 864, 849, 833, 804, 775, 694, 616, 542, 510, 469 cm$^{-1}$; $^1$H NMR (400 MHz, CDCl$_3$) δ 10.70 (s, 1H), 8.15 (d, J=8.9 Hz, 2H), 7.96 (d, J=9.3 Hz, 2H), 7.80 (d, J=8.6 Hz, 2H), 7.60 (d, J=9.0 Hz, 2H); $^{13}$C NMR (100 MHz, CDCl$_3$) δ 164.5, 151.5, 145.2, 139.5, 135.4, 130.6, 121.9, 121.4; $^{19}$F NMR (376 MHz, CDCl$_3$) δ 39.6, 38.27; LRMS (EI) m/z=393.0 [M]$^+$.

4-(tert-Butyldimethylsilyloxy)-N-(4-(tert-butyldimethylsilyloxy)phenyl) benzamide (10c) was prepared from 4-hydroxy-(4-hydroxyphenyl)benzamide following the general procedure for the preparation of bis-silyl "BB" monomers. Purification via flash chromatography yielded 10c as a white powder (2.26 g, 4.9 mmol, 61%): mp 209-210° C.; IR (neat) $\lambda_{max}$ 3298, 2952, 2929, 2889, 2856, 1640, 1603, 1505, 1469, 1406, 1254, 1168, 1101, 1009, 909, 833, 777, 733, 690, 505 cm$^{-1}$; $^1$H NMR (400 MHz, CDCl$_3$) δ 7.81 (s, 1H), 7.75 (d, J=8.7 Hz, 2H), 7.46 (d, J=8.8 Hz, 2H), 6.88 (d, J=8.6 Hz, 2H), 6.81 (d, J=8.8 Hz, 2H), 0.99 (s, 9H), 0.98 (s, 9H), 0.22 (s, 6H), 0.19 (s, 6H); $^{13}$C NMR (100 MHz, CDCl$_3$) δ 165.4, 159.0, 152.5, 131.9, 128.9, 128.0, 122.0, 120.5, 120.3, 25.7, 25.7, 18.4, 18.3, 4.3, 4.3; LRMS (EI) m/z=457.3 [M]$^+$.

4,4'-Sulfonyldiphenol was purchased from Alfa Aesar and used as received.

4,4'-Sulfonylbis(4,1-phenylene) disulfofluoride (11a) was prepared from 4,4'-sulfonyldiphenol following the general procedure for the preparation of bis-fluorosulfate "AA" monomers. 11a was isolated as white powder (7.5 g, 91%): mp 118-122° C.; IR (neat) $\lambda_{max}$ 1586, 1486, 1451, 1405, 1324, 1291, 1231, 1178, 1139, 1103, 1015, 907, 850, 810, 783, 688, 589, 574, 538, 509, 466 cm$^{-1}$; $^1$H NMR (400 MHz, CDCl$_3$) δ 8.10 (d, J=9.1 Hz, 4H), 7.53 (d, J=8.3 Hz, 1H); $^{13}$C NMR (100 MHz, CDCl$_3$) δ 153.1, 141.3, 130.7, 122.5; $^{19}$F NMR (376 MHz, CDCl$_3$) δ 39.2; LRMS (EI) m/z=413.9 [M]$^+$.

(4,4'-Sulfonylbis(4,1-phenylene)bis(oxy))bis(tert-butyldimethylsilane) (11c) was prepared from 4,4'-sulfonyldiphenol following the general procedure for the preparation of bis-silyl "BB" monomers, with substitution of tert-butyldimethylsilyl chloride with trimethylsilyl chloride. 11c was isolated as a white powder (8.8 g, 92%): mp 135-137° C.; IR (neat) $\lambda_{max}$ 2930, 2857, 1587, 1492, 1469, 1314, 1273, 1151, 1105, 902, 838, 781, 757, 679, 645, 616, 574, 542 cm$^{-1}$; $^1$H NMR (400 MHz, CDCl$_3$) δ 7.79 (d, J=8.8 Hz, 4H), 6.88 (d, J=8.8 Hz, 4H), 0.96 (s, 18H), 0.2 (s, 12H); $^{13}$C NMR (100 MHz, CDCl$_3$) δ 160.0, 134.5, 129.6, 120.1, 25.6, 18.3, −4.3; LRMS (EI) m/z=478.2 [M]$^+$.

4,4'-(3-Oxo-1,3-dihydroisobenzofuran-1,1-diyl)bis(4,1-phenylene) disulfofluoridate (12a) was prepared from phenolphthalein following the general procedure for the preparation of bis-silyl "BB" monomers, with substitution of tert-butyldimethylsilyl chloride with trimethylsilyl chloride. 12a was isolated as a white solid: mp 93-98° C.; IR (neat) $\lambda_{max}$ 1761, 1500, 1443, 1410, 1288, 1229, 1139, 1081, 1016, 974, 938, 906, 846, 802, 753, 691, 638, 571, 534, 503, 476 cm$^{-1}$; $^1$H NMR (400 MHz, CDCl$_3$) δ 8.00 (ddd, J=0.8, 1.1, 7.7 Hz, 1H), 7.79 (td, J=1.2, 7.5 Hz, 1H), 7.65 (td, J=0.9, 7.5 Hz, 1H), 7.57 (dt, J=0.8, 7.8 Hz, 1H), 7.47 (d, J=9.1 Hz, 4H), 7.35 (dd, J=0.8, 9.1 Hz, 4H); $^{13}$C NMR (100 MHz, CDCl$_3$) δ 168.7, 150.4, 150.2, 141.1, 135.0, 130.4, 129.4, 126.8, 125.4, 124.0, 121.5, 89.7; $^{19}$F NMR (376 MHz, CDCl$_3$) δ 37.9; LRMS (EI) m/z=489.1 [M]$^+$.

3,5-Bis(tert-butyldimethylsilyloxy)benzoic acid was prepared by global TBS protection of 3,5-dihydroxybenzoic acid, followed by selective liberation of the acid moiety as described by M. E. El-Khouly, E. S. Kang, K.-Y. Kay, C. S. Choi, Y. Aaraki, O. Ito, *Chem. Eur. J.* 2007, 13, 2854-2863.

Butyl-3,5-bis(tert-butyldimethylsilyloxy)benzamide (13c). A 50 mL round bottom flask equipped with a stirring bar and rubber septum was charged with 3,5-bis(tert-butyldimethylsilyloxy)benzoic acid (0.76 g, 2.0 mmol) and placed under argon. 15 mL dry DCM was added followed by the addition of hydroxybenzotriazole (HOBT; 0.3 g, 2.2 mmol) and N,N'-dicyclohexylcarbodiimide (DCC; 0.45 g, 2.2 mmol) in that order by partial removal of the septum. The resulting slurry was stirred at room temperature for 10 min. Butan-1-amine (0.3 mL, 0.22 g, 3.0 mmol) was then added drop wise and the reaction mixture was stirred overnight. The resulting heterogeneous solution was then filtered over a Buchner funnel and the filtrate was further diluted with DCM and washed with 0.5 M HCl. The aqueous layer was extracted once more with DCM and the combined organics were dried over Na$_2$SO$_4$. The crude reaction mixture was then concentrated on to silica gel via rotary evaporation and subjected to flash chromatography (SiO$_2$, 10% EtOAc-hexanes; R$_f$=0.3 at 10% EtOAc-hexanes) to afford 13c as a white crystalline solid (0.76 g, 1.8 mmol): mp 114-117° C.; IR (neat) $\lambda_{max}$ 3294, 2929, 2857, 1632, 1583, 1543, 1438, 1334, 1253, 1163, 1027, 1004, 935, 829, 778, 692, 667, 486 cm$^{-1}$; $^1$H NMR (400 MHz, CDCl$_3$) δ 6.81 (d, J=2.1 Hz, 2H), 6.43 (t, J=2.1 Hz, 1H), 6.02 (app s, 1H), 3.41 (q, J=7.1 Hz, 2H), 1.58 (p, J=7.7 Hz, 2H), 1.39 (sex, J=7.2 Hz, 2H), 0.97 (s, 18H), 0.95 (t, J=7.3 Hz, 3H), 0.19 (s, 12H); $^{13}$C NMR (100 MHz, CDCl$_3$) δ 167.3, 156.8, 137.1, 114.9, 112.1, 39.9, 31.8, 25.8, 20.3, 18.3, 13.9, -4.3; LRMS (EI) m/z=437.3 [M]$^+$.

Biphenyl-4,4'-disulfonyl difluoride (14). Biphenyl-4,4'-disulfonylchloride (purchased from TCI chemicals; 5.0 g, 0.014 mol) was dissolved in 40 mL acetonitrile and 5 mL water with stirring. To this mixture was added 4 eq. of saturated aqueous KHF$_2$ (1.2 g). The reaction was allowed to proceed 3 hours. The mixture was extracted twice with 30 mL ethyl acetate. The organic fractions combined, washed with water, brine, and then dried over MgSO4. Solvent was removed under vacuum to provide 14 as a yellow solid (4.1 g, 90%): mp 194-197° C.; IR (neat) $\lambda_{max}$ 1589, 1405, 1205, 1095, 816, 771, 750, 709, 569, 535, 493 cm$^{-1}$; $^1$H NMR (400 MHz, CDCl$_3$) δ 8.16 (d, J=8.5 Hz, 4H), 7.88 (dd, J=0.7, 8.7 Hz, 4H); $^{13}$C NMR (100 MHz, CDCl$_3$) δ 145.9, 133.4 (d, J=15.2 Hz), 129.4, 128.9; $^{19}$F NMR (376 MHz, CDCl$_3$) δ 66.1; LRMS (EI) m/z=318.0 [M]$^+$.

Example 12. Catalyst Screening by Reaction of phenylfluorosulfate (15) and tert-butyldimethyl(p-tolyloxy)silane (16)

Experimental Setup:

A 0.5 M acetonitrile stock solution of the starting reagents was prepared in the following manner: phenylfluorosulfate (15) (2.667 g, 12.0 mmol), tert-butyldimethyl(p-tolyloxy) silane (16) (2.112 g, 12.0 mmol) and diphenylmethane (standard, 0.403 g, 2.4 mmol) were dissolved in enough dry acetonitrile to obtain 24 mL (combined mL) of stock solution, which was subsequently placed under the atmosphere of argon. 0.4 mL aliquots were parceled out into 1 mL scintillation vials, thereby providing sixty individual 0.2 mmol reactions. Approximately 10 or 20 mol % catalyst, as shown in Table 8, was then added to the reaction vials. The headspace was flushed with argon and the reaction mixtures were shaken for 24 hrs at room temperature. Finally, 15 μL aliquots of each reaction mixture were diluted with 1 mL EtOAc and subjected to GC/MS endpoint analysis to determine the yield, if any, of phenyl tolyl sulfate (17) and any byproduct 4-methylphenol (18). Calculated endpoints shown Table 8 were not confirmed by isolation and are considered "crude." The percentages shown in Table 8 may vary by ±5% and are meant to serve as a general overview of the effective catalysts for this reaction.

TABLE 8

| Catalyst (mol %)$^a$ | Yield of Prod. 17 | Remaining Starting Materials[c] | | Additional Information |
|---|---|---|---|---|
| 0. No Catalyst | 0% | 100% 15 | 100% 16 | |
| 1. 10% Triethylamine | 0% | 100% 15 | 100% 16 | |
| 2. 10% DMAP | 0% | 100% 15 | 100% 16 | |
| 3. 10% Pyridine | 0% | 100% 15 | 100% 16 | |
| 4. 10% DABCO | 0% | 100% 15 | 100% 16 | |
| 5. 10% 4-Cyanoquinuclidine | 0% | 100% 15 | 100% 16 | |
| 6. 10% Imidazole | 0% | 100% 15 | 100% 16 | |
| 7. 10% Proton Sponge | 0% | 100% 15 | 100% 16 | |
| 8. 10% n-Butyl amine | <1% | <95% 15 | >100% 16 | |
| 9. 10% Piperidine | ~5% | <85% 15 | >85% 16 | Contains 18 (5%) and 19 |
| 10. 10% Benzimidazole | 0% | 100% 15 | 100% 16 | |
| 11. 10% K$^+$OAc$^-$ | 0% | 100% 15 | 100% 16 | |
| 12. 10% PhO$^-$Na$^+$ · 3H$_2$0 | <1% | <90% 15 | 100% 16 | Contains 20 |
| 13. 20% NaOMe | 0% | 100% 15 | 100% 16 | |
| 14. 10% Na acetylacetate | 0% | 100% 15 | 100% 16 | |
| 15. 10% K phthalimide | >1% | >95% 15 | >95% 16 | |
| 16. 20% KOH | >1% | >95% 15 | >95% 16 | |
| 17. 10% NaCN | 0% | 100% 15 | 100% 16 | |
| 18. 10% NaN$_3$ | 0% | 100% 15 | 100% 16 | |

TABLE 8-continued

| Catalyst (mol %)[a] | Yield of Prod. 17 | Remaining Starting Materials[c] | | Additional Information |
|---|---|---|---|---|
| 19. 20% NaOH | 0% | 100% 15 | 100% 16 | |
| 20. 10% BaOH · 8H$_2$O | 0% | 100% 15 | 100% 16 | |
| 21. 10% KOtBu | <20% | ~80% 15 | ~80% 16 | |
| 22. 10% 1,2-bis(methylamino)ethane | >1% | >95% 15 | >95% 16 | |
| 23. 10% 1,2-diaminocyclohexane | 0% | 100%15 15 | 100% 16 | |
| 24. 20% NaN(CN)$_2$ | 0% | 100% 15 | 100% 16 | |
| 25. 10% Na$_2$CO$_3$ | 0% | 100% 15 | 100% 16 | |
| 26. 10% K$_3$PO4 | <5% | >90% 15 | >95% 16 | |
| 27. 10% CsF | >90% | <5% 15 | <5% 16 | |
| 28. 20% KF | ~60% | >30% 15 | <20% 16 | Contains 18 (5%) |
| 29. 10% TASF | >90% | <5% 15 | <5% 16 | |
| 30. 10% Bu$_4$N$^+$F$^-$ | >90% | <5% 15 | <5% 16 | |
| 31. 10% Bu$_4$N$^+$Cl$^-$ | 0% | 100% 15 | 100% 16 | |
| 32. 10% 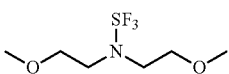 | ~40% | >50% 15 | <5% 16 | Contains 18 (25%) |
| 33. 20% NaI | 0% | 100% 15 | 100% 16 | |
| 34. 10% PPh$_3$ | 0% | 100% 15 | 100% 16 | |
| 35. 20% PMe$_2$Ph | 0% | 100% 15 | 100% 16 | |
| 36. 10% DBU | >95% | 0% 15 | 0% 16 | |
| 37. 10% DBN | >95% | <5% 15 | <5% 16 | |
| 38. 10% TMG | >95% | 0% 15 | 0% 16 | |
| 39. 10% TBD | >70% | >25% 15 | 10% 16 | Contains 18 (20%) |
| 40. 10% BEMP | >95% | 0% 15 | 0% 16 | |
| 41. 10% t-Bu-P$_4$ | >95% | 0% 15 | 0% 16 | |
| 42. 10% MeTBD | >95% | 0% 15 | 0% 16 | |
| 43. 10% 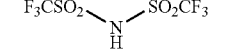 | 0% | >95% 15 | <15% 16 | Contains 18 (80%) |
| 44. 10% 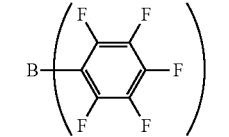 | 0% | 100% 15 | <5% 16 | Contains 18 (95%) |
| 45. 10% 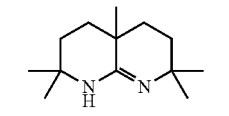 | ~80% | <20% 15 | <5% 16 | Contains 18 (10%) |
| 46. 20% Et4N$^+$OH$^-$ | ~20% | >55% 15 | <20% 16 | Contains 18 (45%) |
| 47. 20% NaBF$_4$ | 0% | 100% 15 | 100% 16 | |
| 48. 10% TiCl$_4$ · 2THF | 0% | 100% 15 | >70% 16 | Contains 18 (25%) |
| 49. 10% SnCl$_2$ · 2H$_2$O | 0% | 100% 15 | <5% 16 | Contains 18 (95%) |
| 50. 10% BF$_3$· OEt$_2$ | 0% | 100% 15 | <5% 16 | Contains 18 (90%) |
| 51. 10% ZnCl$_2$ | 0% | 100% 15 | 100% 16 | |
| 52. 10% ZnBr$_2$ | 0% | 100% 15 | 100% 16 | |
| 53. 10% AlEt$_3$ | 0% | 100% 15 | 100% 16 | |
| 54. 10% Et$_2$AlCl | 0% | 100% 15 | 100% 16 | |

In Table 8, the catalyst amount was measured as close as practically possible to 10 or 20 mol %. The percentage of product in the crude reaction mixture was calculated from a molarity-based calibration curve derived from compound 17. Yield may vary by ±5%. The remaining starting material percentage was derived from the initial reaction mixture concentration in reference to diphenylmethane (internal standard). Actual yield of 15 and 16 may vary by ±5%. Percentage of 4-methylphenol 18 is in reference to starting material 16, i.e. actual yield of 18 may vary by ±5%. In some cases the observed product was the mixed sulfate ester/sulfamoyl derivative of phenol and piperidine (Compound 19), or diphenylsulfate 20.

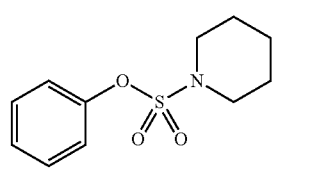

19

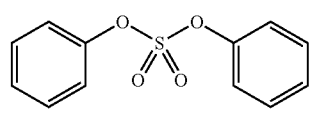

20

Example 13. Comparison of the Present Polymerization Method to the Method of Firth (U.S. Pat. No. 3,733,304) for Preparation of poly(bisphenol A sulfate)

Figure 15:
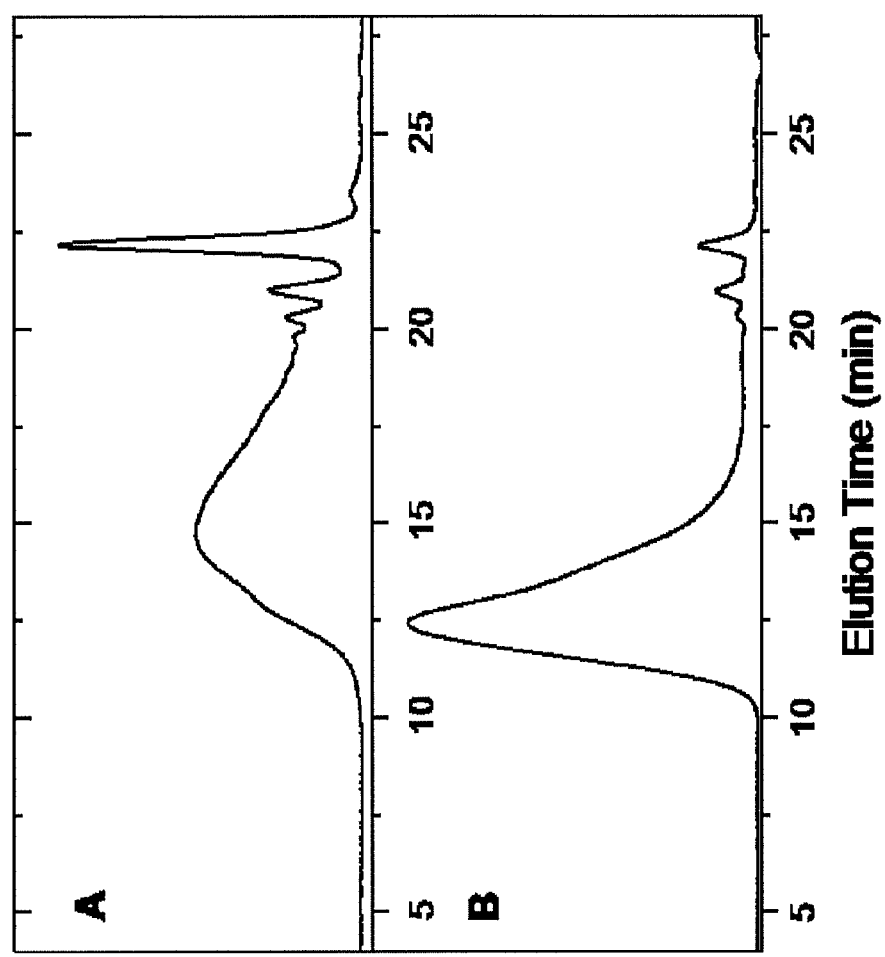
FIG. 15 provides (A) a GPC trace of poly(bisphenol A sulfate) prepared by the method of Firth (U.S. Pat. No. 3,733,304); and (B) a GPC trace of poly(bisphenol A sulfate) prepared according to the bulk polymerization method described in Example 1 herein.

Poly(bisphenol A sulfate) was prepared by the method of Firth (U.S. Pat. No. 3,733,304), i.e., by reaction of disodium bisphenol A with bisphenol A-bisfluorosulfate in chlorobenzene at about 150 to 165° C. The resulting product was precipitated into water as described by Firth, and then analyzed by GPC relative to polystyrene standards, as described herein. The GPC trace is shown in Panel A of FIG. 15. The polydispersity of the polymer prepared according to the Firth method was about 6 when integrated with the cyclic oligomer peak at about 22 minutes elution time. For comparison, a GPC of poly(bisphenol A sulfate) from the large scale preparation in Example 1 herein, prepared according to the present invention, is shown in Panel B of FIG. 15. As is evident from the two GPC traces in the present method provides a higher molecular weight product with a much narrower polydispersity and significantly less cyclic oligomeric byproduct.

Figure 16:
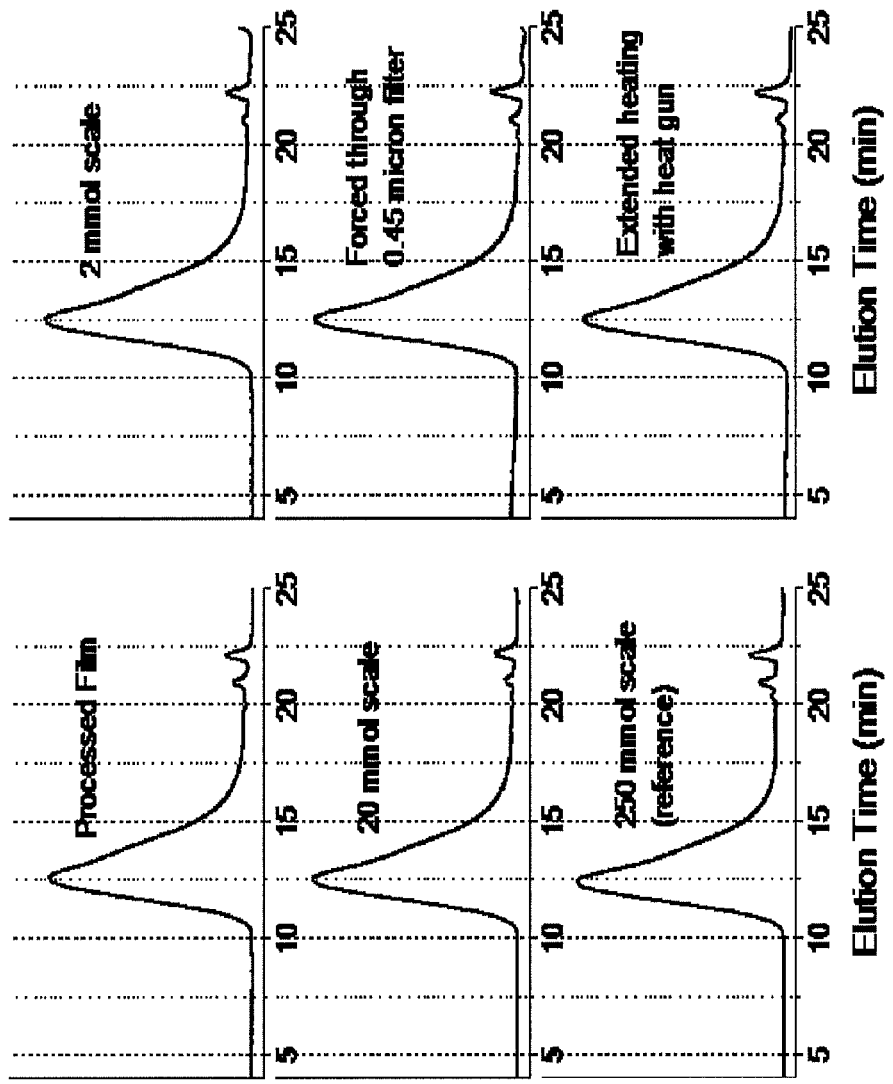
FIG. 16 provides GPC traces of poly(bisphenol A sulfate) from various batches prepared under the same target conditions at different reaction scales, as well as samples that have been heated or processed after isolation.

Example 14. Stability of poly(bisphenol A sulfate) to Various Processing Conditions Poly(bisphenol A sulfate) was prepared under bulk, solventless conditions (neat melt of monomers 2a and 2c, with no solvent using 1% BEMP catalyst at 120° C.) at 2 mmol, 20 mmol and 250 mmol scales. The polymer samples were dissolved in DMF and GPC traces of these materials were compared to a redissolved sample of the thin film from Example 5 (made from the large scale polymer of Example 1). The GPC traces are shown in FIG. 16, and clearly show that the polymers having substantially the same molecular weight profile were obtained at each scale. It is also evident that processing the polymer into a film did not significantly affect the molecular weight profile. In addition, a sample of the large scale polymer from Example 1 was heated with a heat gun for a prolonged period, and another sample was heated and forced through a 0.45 micron filter, neither of which significantly affected the molecular weight profile of the samples (see FIG. 16).

Example 15. Preparation of poly(bisphenol A sulfate) from bis-silyl-bisphenol A and sulfuryl fluoride A 100 mL Schlenk flask containing a ground glass stopcock, equipped with a stirring bar and a rubber septum, was flame-dried under vacuum (7 mm Hg). Upon cooling to room temperature, the reaction vessel was weighed (sans an internal atmosphere), charged with sulfuryl fluoride gas ($SO_2F_2$) and finally re-weighed to determine the quantity of $SO_2F_2$ (752 mg, 7.37 mmol). ((Propane-2,2-diylbis(4,1-phenylene))bis(oxy))bis(tert-butyldimethylsiane) (3.30 g, 7.22 mmol) dissolved in 7 mL anhydrous DMF and 2-tert-butylimino-2-diethylamino-1,3-dimethylperhydro-1,3,2-diazaphosphorine (BEMP; 368 µL, 101 mg, 0.368 mmol) as a 1 M solution in hexanes were then added to the reaction vessel in that order and the resulting mixture was stirred at room temperature for 20 min, as a closed (to the atmosphere) system. The reaction vessel was then placed in a 150° C. oil bath and shortly thereafter the evolution of low boiling solvents (presumably hexanes and tert-butylfluorodimethylsilane (TBSF)) was visible on walls of the reaction vessel. The reaction progressed as a closed system at 150° C. for 30 min at which point the stopcock was opened thereby releasing gaseous hexanes and TBSF, heating was then continued for an additional 2 h as an open system. The reaction mixture was then removed from the oil bath as a viscous, slightly yellow clear liquid and allowed to cool to room temperature. Direct addition of the reaction mixture to 200 mL MeOH resulted in precipitation of BPA-polysulfate as a white fibrous solid. Drying under vacuum at 80° C. for 3 h yielded 1.966 g (94%) with $M_n$ of 95,000 Da based on polystyrene standards.

Example 16. Fluorosulfonyl Monomers Prepared from Primary Amines by Reaction with Ethylene Sulfonylfluoride (ESF)

Figure 17:
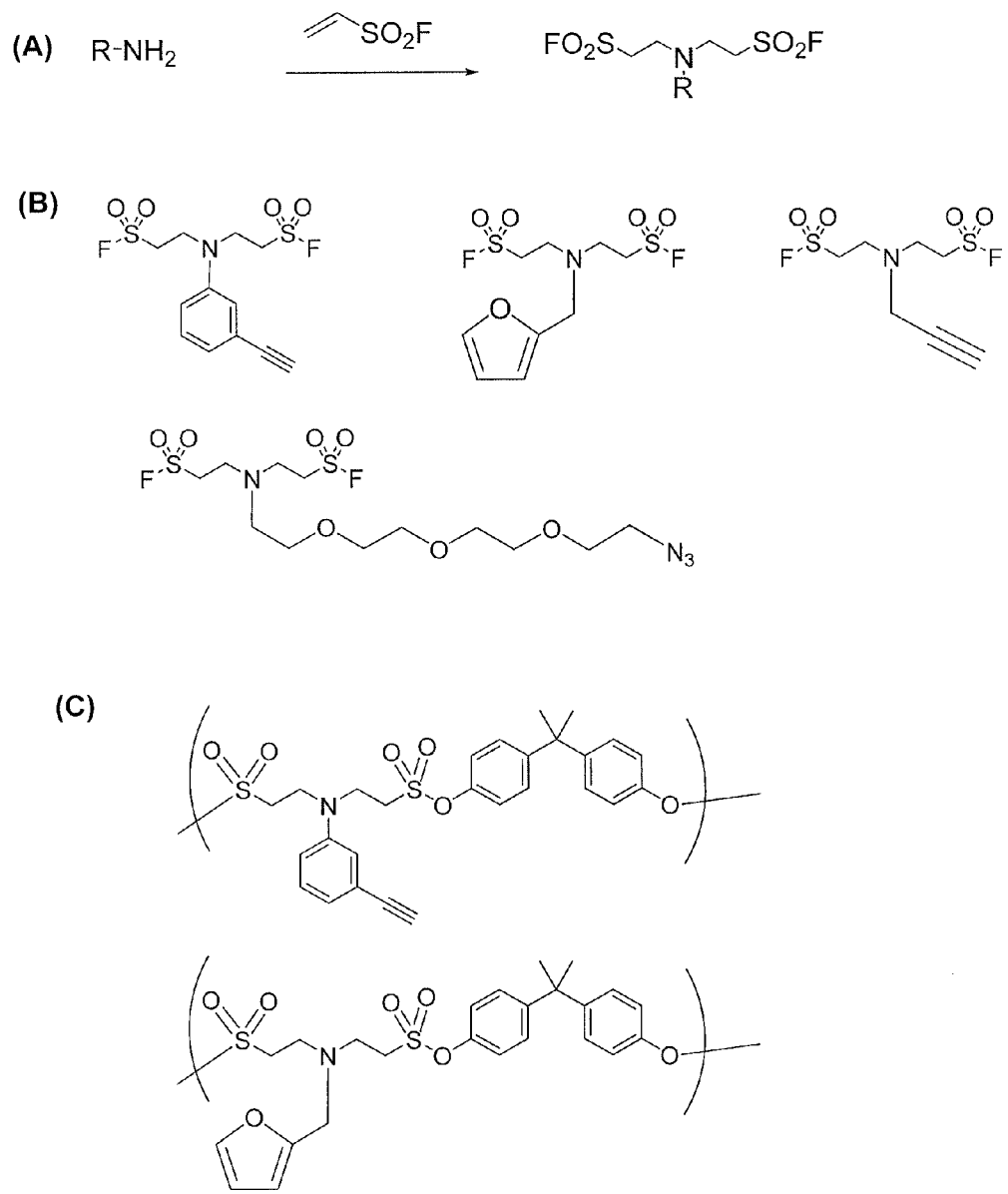
FIG. 17 illustrates (A) the synthesis of sulfonylfluoride monomers from amines by treatment with ethylene sulfonylfluoride (ESF); (b) selected monomers prepared according to the scheme in (A); and (C) selected copolymers prepared from the sulfonylfluoride monomers.

FIG. 17, Panel A, illustrates a facile synthesis of bis(2-fluorsulfonylethyl)amines by reaction of primary amines with ESF in DCM or acetic acid. Panel B of FIG. 17 illustrates four examples of such monomers prepared in this manner. FIG. 17, Panel C, illustrates some examples of polymers prepared from these monomers and a bis-silyl-bisphenol A monomer.

General Procedure for the Reaction of ESF with Primary and Secondary Amines.

Starting amine (1 equiv.) was dissolved in DCM (about 0.1 to 0.5 M in substrate) and treated with ESF (about 1 to 2.5 equiv.) following a procedure adapted from Hyatt et al. (*J. Org. Chem.*, 1979, 44:3847-3858). The reaction mixture was stirred at room temperature for several minutes to an hour, monitoring conversion by LCMS. Upon completion, DCM and excess of ESF were removed using rotary evaporator and dried, providing product virtually free of any impurities. In certain cases column chromatography can be used to obtain analytically pure samples of ESF adducts.

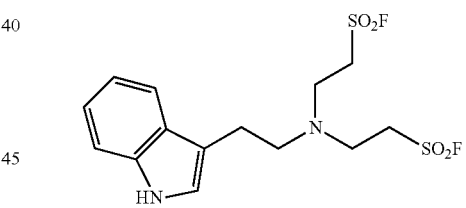

2,2'-((2-(1H-Indol-3-yl)ethyl)azanediyl)diethanesulfonyl fluoride

Following the general procedure described above with an 2 equivalents of ESF and stirring the reaction mixture at room temperature for 3 hours afforded an analytically pure sample was obtained by flash column chromatography (hexane/EtOAc-9/1 to 6/4). Product was obtained as yellow oil in quantitative yield (1.9 g). $^1$H NMR (400 MHz, CDCl$_3$) δ (ppm): 8.04 (s, 1H), 7.57 (d, J=7.8 Hz, 1H), 7.37 (d, J=7.9 Hz, 1H), 7.23 (t, J=7.5 Hz, 1H), 7.16 (t, J=7.4 Hz, 1H), 7.01 (br s, 1H), 3.48-3.39 (m, 4H), 3.15-3.05 (m, 4H), 2.96-2.89 (m, 2H), 2.89-2.80 (m, 2H); $^{13}$C NMR (101 MHz, CDCl$_3$) δ (ppm): 136.3, 127.1, 122.3, 122.2, 122.1, 119.6, 118.5, 113.0, 111.5, 54.2, 49.4 (d, J=13.2 Hz), 47.9, 23.3; $^{19}$F NMR (376 MHz, CDCl$_3$) δ (ppm): +57.9; R$_f$ (hexane/EtOAc-7/3): 0.27; ESI-MS (m/z): 381 [MH]$^+$.

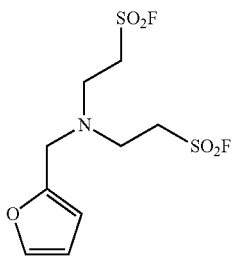 [SMILES: O=S(=O)(F)CCN(CCS(=O)(=O)F)Cc1ccco1]

2,2'-((Furan-2-ylmethyl)azanediyl)diethanesulfonyl fluoride

Following the general procedure described above in DCM (0.33 M) in presence of 2 equiv. of ESF afforded a crude product, which was purified by column chromatography (hexane/EtOAc-95/5 to 7/3). Product was obtained as yellow oil in 99% yield (1.6 g). $^1$H NMR (400 MHz, CDCl$_3$) δ (ppm): 7.41 (dd, J=1.9, 0.8 Hz, 1H), 6.37 (dd, J=3.2, 1.9 Hz, 1H), 6.28 (dd, J=3.2, 0.7 Hz, 1H), 3.81 (s, 2H), 3.53 (td, J=6.9, 3.6 Hz, 4H), 3.16 (td, J=7.0, 1.2 Hz, 4H); $^{13}$C NMR (101 MHz, CDCl$_3$) δ (ppm): 149.9, 143.1, 110.7, 110.1, 49.6, 49.4 (d, J=11.1 Hz), 47.9; $^{19}$F NMR (376 MHz, CDCl$_3$) δ (ppm): +57.9; R$_f$ (hexane/EtOAc-7/3): 0.47; ESI-MS (m/z): 340 [MNa]$^+$.

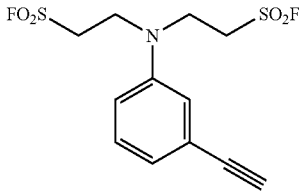

2,2'((3-Ethynylphenyl)azanediyl)diethanesulfonyl fluoride (Adapted from Hyatt Et al. *J. Org. Chem.*, 1979, 44:3847-3858)

ESF (1.8 mL; 20 mmol) was added to aniline (1.17 g; 10 mmol) in glacial acetic acid (3 mL) and reaction mixture was stirred at 50° C. for 24 hrs. Upon completion, crude product was isolated by filtration, washed with hexanes and recrystallized from CCl$_4$-DCM. Product was obtained as light brown crystals in 87% yield (2.94 g). m.p. 98-100° C. $^1$H NMR (400 MHz, CDCl$_3$) δ (ppm): 7.31 (t, J=8.0 Hz, 1H), 7.10-7.06 (m, 1H), 6.85-6.82 (m, 1H), 6.78-6.73 (m, 1H), 4.01 (t, J=6.4 Hz, 4H), 3.67-3.59 (m, 4H), 3.10 (s, 1H); $^{13}$C NMR (101 MHz, CDCl$_3$) δ (ppm): 144.0, 130.5, 124.3, 124.2, 117.6, 115.0, 83.3, 78.0, 48.3 (d, J=14.4 Hz), 46.8; $^{19}$F NMR (376 MHz, CDCl$_3$) δ (ppm): +57.2; ESI-MS (m/z): 338 [MH]$^+$.

General Procedure for the Reaction of ESF with Sulfonamides and Alcohols:

Starting material (1 equiv.) and triphenylphosphine (0.1 equiv.) were dissolved in DCM (0.33M in substrate) and treated with ESF (about 1 to 2.5 equiv.). Reaction mixture was stirred at room temperature overnight, monitoring conversion by LCMS/GCMS/TLC. Upon completion, DCM and an excess of ESF were removed using rotary evaporator and crude product was purified by short column chromatography.

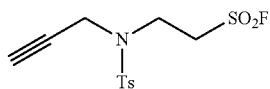 [SMILES: C#CCN(CCS(=O)(=O)F)S(=O)(=O)c1ccc(C)cc1]

Following the general procedure for reaction of ESF with sulfonamides, 2-(4-Methyl-N-(prop-2-yn-1-yl)phenylsulfonamido)ethanesulfonyl fluoride was obtained as a white solid in 78% yield (251 mg). R$_f$ (hexane/EtOAc-5/1): 0.25; m.p. 125-126° C.; $^1$H NMR (400 MHz, CDCl$_3$) δ (ppm): 7.74 (d, J=8.3 Hz, 2H), 7.35 (d, J=8.5 Hz, 2H), 4.15 (d, J=2.5 Hz, 2H), 3.87-3.80 (m, 2H), 3.71-3.65 (m, 2H), 2.45 (s, 3H), 2.19 (t, J=2.5 Hz, 1H); $^{13}$C NMR (101 MHz, CDCl$_3$) δ (ppm): 144.8, 134.5, 130.1, 127.9, 76.2, 75.0, 50.4 (d, J=16.0 Hz), 41.9, 38.8, 21.8; $^{19}$F NMR (376 MHz, CDCl$_3$) δ (ppm): 55.9; ESI-MS (m/z): 320 [MH]$^+$.

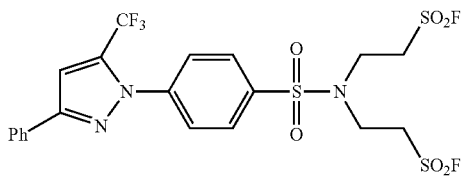 [SMILES: O=S(=O)(F)CCN(CCS(=O)(=O)F)S(=O)(=O)c1ccc(-n2nc(-c3ccccc3)cc2C(F)(F)F)cc1]

Following the general procedure for reaction of ESF with sulfonamides, 2,2'-(((4-(3-Phenyl-5-(trifluoromethyl)-1H-pyrazol-1-yl)phenyl)sulfonyl)azanediyl)-diethanesulfonyl fluoride was obtained as a white solid in 60% yield (175 mg). R$_f$ (hexane/EtOAc-5/1): 0.21; m.p. 135-137° C.; $^1$H NMR (400 MHz, CDCl$_3$) δ (ppm): 7.84 (d, J=8.6 Hz, 2H), 7.58 (d, J=8.6 Hz, 2H), 7.47-7.43 (m, 1H), 7.43-7.39 (m, 1H), 7.28-7.23 (m, 3H), 6.80 (s, 1H), 3.86-3.80 (m, 4H), 3.71-3.66 (m, 4H); $^{13}$C NMR (101 MHz, CDCl$_3$) δ (ppm): 145.4, 144.8 (d, J=38.3 Hz), 143.9, 135.7, 130.0, 129.4, 129.0, 128.8, 128.6, 117.4 (d, J=336.3 Hz), 107.2, 50.7, 50.6 (d, J=16.1 Hz), 45.6; $^{19}$F NMR (376 MHz, CDCl$_3$) δ (ppm):+59.4, −62.8; ESI-MS (m/z): 588 [MH]$^+$.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A polymerization method comprising the step of contacting a liquid monomer composition with a basic catalyst, wherein the monomer composition comprises at least one compound of formula F—X—Z—Si(R$^1$)$_3$; wherein:

each $R^1$ independently is a hydrocarbyl group;
X has the formula $-A(-R^2-A)n-$;
each A independently is $SO_2$, C(=O), or Het;
$R^2$ comprises a first organic moiety;
n is 0 or 1;
Het is an aromatic heterocycle comprising at least two carbon atoms and at least one nitrogen atom in a heteroaromatic ring thereof, and when A is Het, the F substituent is attached to a carbon atom of the heteroaromatic ring thereof;
Z has the formula $-L-R^3-L-$;
each L independently is O, S, or $N(R^4)$;
$R^3$ comprises a second organic moiety;
each $R^4$ independently is H or a third organic moiety; and
wherein the F and $(R^1)_3Si$ substituents form a silyl fluoride byproduct of formula $(R^1)_3Si—F$ as monomers present in the monomer composition condense to form an X—Z polymer chain; and wherein the basic catalyst comprises at least one material selected from the group consisting of an amidine, a guanidine, a phosphazene, a nitrogen heterocyclic carbene, a tertiary alkoxide, and a fluoride salt.

2. The method of claim 1 wherein:
each $R^1$ independently is an alkyl or aryl group;
X has the formula $-A(-R^2-A)n-$;
each A is $SO_2$;
$R^2$ comprises a first organic moiety;
n is 0 or 1;
Z has the formula $-L-R^3-L-$;
each L independently is O; and
$R^3$ comprises a second organic moiety comprising at least one aryl or heteroaryl group directly bonded to each L.

3. The method of claim 1 wherein the n is 0.

4. The method of claim 1 wherein Het is a 1,3,5-triazine.

5. The method of claim 1 wherein the monomer composition includes a compound in which X includes an additional F substituent on a sulfonyl, carbonyl, or heteroaryl activating group, such that the additional F substituent also reacts with a $(R^1)_3Si$ substituent on an oxygen, sulfur or nitrogen atom linking group, to form a silyl fluoride, and the activating group condenses with the linking group to introduce a branch point in the polymer.

6. The method of claim 1 wherein the monomer composition includes a compound in which Z includes an additional silyl substituent, $(R^1)_3Si$, on an oxygen, sulfur or nitrogen atom linking group, such that the additional silyl substituent also reacts with a F substituent on a sulfonyl, carbonyl, or heteroaryl activating group, to form a silyl fluoride and the linking group condenses with the activating group to introduce a branch point in the polymer.

7. The method of claim 1 wherein n is 1; $R^2$ is $-L^1-R^5-L^1-$; independently is selected from the group consisting of O, S, and $N(R^4)$; and each $R^4$ independently is H or the third organic moiety, and $R^5$ comprises an organic moiety.

8. The method of claim 1 wherein the basic catalyst is a phosphazene.

9. The method of claim 1 wherein the basic catalyst is a guanidine.

10. The method of claim 1 wherein the basic catalyst is a nitrogen-heterocyclic carbene.

11. The method of claim 1 wherein each A is $SO_2$.

12. The method of claim 1 wherein each $R^2$ comprises an aryl or heteroaryl moiety either directly bonded to A or bonded to A via an oxygen atom attached to the aryl or heteroaryl moiety.

13. The method of claim 1 wherein the X—Z polymer chain is represented by a formula selected from the group consisting of:

$(-A(-R^2-A)n-L-R^3-L)x-$;  Formula (I):

$(-A-R^2-A-L-R^3-L)y-$;  Formula (II):

$(-A-L^1-R^5-L^1-A-L-R^3-L)z-$;  Formula (III):

$(-A-L^1-R^5-A-L-R^3-L)m-$;  Formula (IV):

$(-A-L-R^3-L)p-$; and  Formula (V):

$(-A-R^2-A-L-R^3-L)a-(-A-L^1-R^5-L^1-A-L-R^3-L)b-(-A-L^1-R^5-A-L-R^3-L)c-(-A-L-R^3-L)d-$;  Formula (VI):

wherein:
each A independently is $SO_2$, C(=O), or Het;
each L and $L^1$ independently is O, S, or $N(R^4)$;
each $R^2$ and $R^5$ independently comprises a first organic moiety;
each $R^3$ comprises a second organic moiety;
each $R^4$ independently is H or a third organic moiety;
each n independently is 0 or 1;
each Het independently is an aromatic heterocycle comprising at least two carbon atoms and at least one nitrogen atom in a heteroaromatic ring thereof, and when A is Het, the F substituent is attached to a carbon atom of the heteroaromatic ring thereof;
each of x, y, z, m, and p is the average number of repeating units in the X—Z polymer chain and has a value of at least 10; and
each of a, b, c, and d is the average number of respective repeating units, and independently can be 0 or greater, provided the sum of a, b, c, and d is at least 10.

14. The method of claim 1 wherein one or more of the $R^2$, $R^3$, $R^4$, and $R^5$, comprises a moiety selected from the group consisting of a hydrocarbon, a heterocycle, a carbohydrate, an amino acid, a polypeptide, a peptide analog, and a combination of two or more thereof.

15. The method of claim 1 wherein one or more of $R^1$, $R^2$, $R^3$, $R^4$, and $R^5$ is substituted by at least one substituent selected from the group consisting of hydroxyl, halogen, nitro, $—C(O)R^6$, $—C(O)OR^6$, $—C(O)N(R^6)_2$, —CN, $—SO_vR^6$, $—SO_vN(R^6)_2$, $R^6SO_vN(R^6)—$, $—N(R^6)SO_vR^6$, $—SO_3R^6$, $—N(R^6)_2$, $—N(R^6)OR^6$, $—N(R^6)C(O)R^6$, $—N(R^6)C(O)OR^6$, $—N(R^6)C(O)N(R^6)_2$, $—OC(O)N(R^6)_2$, $—OC(O)OR^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

16. The method of claim 1 wherein the liquid monomer composition comprises (a) two or more different compounds of formula $F—X—Z—Si(R^1)_3$, or (b) at least one compound of formula $F—X—Z—Si(R^1)_3$, at least one compound of formula $(R^1)_3Si—Z—Si(R^1)_3$, and at least one compound of formula $F—X—F$.

17. The method of claim 16 wherein the two or more different compounds of formula $F—X—Z—Si(R^1)_3$ differ by the selection of $R^1$, Z, or both $R^1$ and Z.

18. The method of claim 16 wherein the $F—X—F$ monomer comprises sulfuryl fluoride ($FSO_2F$).

19. The method of claim 18 wherein the $F—X—F$ monomer comprises a bisfluorosulfonyl monomer of formula $F—SO_2—CH_2CH_2—N(R^{11})—CH_2CH_2—SO_2—F$, wherein $R^{11}$ comprises an organic moiety.

20. The method of claim 19 wherein $R^{11}$ comprises a moiety selected from the group consisting of a hydrocarbon, a heterocycle, a carbohydrate, an amino acid, a polypeptide, a peptide analog, and a combination of two or more thereof.

21. The method of claim 19 wherein $R^{11}$ is substituted by at least one substituent selected from the group consisting of hydroxyl, halogen, nitro, —C(O)$R^6$, —C(O)O$R^6$, —C(O)N($R^6$)$_2$, —CN, —SO$_v$$R^6$, —SO$_v$N($R^6$)$_2$, $R^6$SO$_v$N($R^6$)—, —N($R^6$)SO$_v$$R^6$, —SO$_3$$R^6$, —N($R^6$)$_2$, —N($R^6$)O$R^6$, —N($R^6$)C(O)$R^6$, —N($R^6$)C(O)O$R^6$, —N($R^6$)C(O)N($R^6$)$_2$, —OC(O)N($R^6$)$_2$, —OC(O)O$R^6$, azido, alkyl, cycloalkyl, alkenyl, alkynyl, alkoxy, fluoroalkyl, fluoroalkoxy, aryl, aryloxy, heteroaryl, poly(ethyleneoxy), alkynyl-terminated poly(ethyleneoxy), a fatty acid, a carbohydrate, an amino acid, and a polypeptide; wherein each $R^6$ independently is H, alkyl, or aryl, and v is 0, 1, or 2.

22. The method of claim 1 wherein the liquid monomer composition comprises at least one compound of Formula VII and at least one compound of Formula VIII:

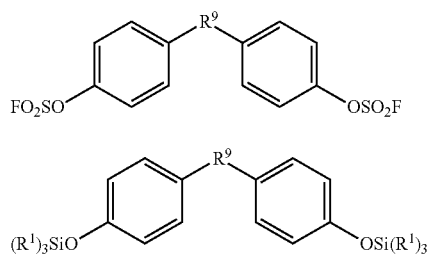

VII

VIII wherein each $R^1$ independently is an alkyl or aryl group, and each $R^9$ independently is a covalent bond, C(CH$_3$)$_2$, C(CF$_3$)$_2$, or SO$_2$.

23. The method of claim 1 wherein the liquid monomer composition comprises a mixture of the monomers dissolved in a solvent.

24. The method of claim 1 wherein the liquid monomer composition comprises a melted mixture of the monomers.

25. The method of claim 1 wherein the basic catalyst is selected from the group consisting of:
  (a) 1,8-diazabicyclo[5.4.0]undec-7-ene (DBU);
  (b) at least one phosphazene selected from the group consisting of 2-tert-butylimino-2-diethylamino-1,3-dimethylperhydro-1,3,2-diazaphosphorine (BEMP) and 1-tert-butyl-4,4,4-tris-(dimethylamino)-2,2-bis[tris(dimethylamino)-phosphoranylidenamino]-2$\lambda^5$,4$\lambda^5$-catenadi(phosphazene) (P$_4$-t-Bu);
  (c) at least one guanidine selected from the group consisting of 1,1,3,3-tetramethylguanidine (TMG), 1,5,7-triazabicyclo[4.4.0]dec-5-ene (TBD), and 7-methyl-1,5,7-triazabicyclo-[4.4.0]dec-5-ene (MTBD); and
  (d) at least one nitrogen-heterocyclic carbene selected from the group consisting of an imidazole-2-ylidene, a 1,2,4-triazole-5-ylidene, a thiazole-2-ylidene, and an imidazolin-2-ylidene.

* * * * *

UNITED STATES PATENT AND TRADEMARK OFFICE
CERTIFICATE OF CORRECTION

PATENT NO. : 9,896,547 B2
APPLICATION NO. : 15/484523
DATED : February 20, 2018
INVENTOR(S) : Jiajia Dong et al.

Page 1 of 1

It is certified that error appears in the above-identified patent and that said Letters Patent is hereby corrected as shown below:

In the Specification

Column 27,
Line 35, "$F^-/F_2^-$" should be -- $F^-/HF_2^-$ --.

Columns 47-48, TABLE 8-continued
Line 44, first column, the formula should be depicted as follows:

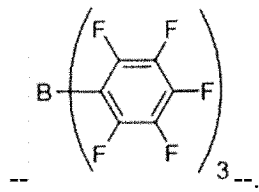

Signed and Sealed this
Second Day of October, 2018

Andrei Iancu
*Director of the United States Patent and Trademark Office*